(12) United States Patent
Meuris et al.

(10) Patent No.: US 6,665,849 B2
(45) Date of Patent: Dec. 16, 2003

(54) METHOD AND APPARATUS FOR SIMULATING PHYSICAL FIELDS

(75) Inventors: Peter Meuris, Mechelen (BE); Wim Schoenmaker, Genk (BE); Wim Magnus, Waver (BE)

(73) Assignee: Interuniversitair Microelektronica Centrum vzw, Leuven (BE)

( * ) Notice: Subject to any disclaimer, the term of this patent is extended or adjusted under 35 U.S.C. 154(b) by 13 days.

(21) Appl. No.: 09/888,868

(22) Filed: Jun. 25, 2001

(65) Prior Publication Data

US 2002/0042698 A1 Apr. 11, 2002

Related U.S. Application Data

(63) Continuation-in-part of application No. 09/328,882, filed on Jun. 9, 1999
(60) Provisional application No. 60/213,765, filed on Jun. 23, 2000.

(30) Foreign Application Priority Data

May 30, 2001 (EP) ................................................ 0113039

(51) Int. Cl.[7] ............................................... G06F 17/50
(52) U.S. Cl. ................................. 716/7; 703/1; 703/102
(58) Field of Search ............................... 716/1; 703/2, 3, 703/14

(56) References Cited

U.S. PATENT DOCUMENTS

| | | | | |
|---|---|---|---|---|
| 6,051,027 A | * | 4/2000 | Kapur et al. | 703/5 |
| 6,064,810 A | | 5/2000 | Raad et al. | 703/2 |
| 6,137,492 A | | 10/2000 | Hoppe | 345/418 |
| 6,266,062 B1 | | 7/2001 | Rivara | 345/220 |
| 6,453,275 B1 | * | 9/2002 | Schoenmaker et al. | 703/2 |

OTHER PUBLICATIONS

Grosso et al., "The multilevel finite element method for adaptive mesh optimization and visualization of volume data", *Proceedings Visualization97*, pp. 387–394 (1997).
Hoppe, H., "Smooth view–dependent level–of–detail control and its application to terrain rendering", *Proceedings Visualization 98*, pp. 35–42 (1998).
Klingbell, et al., "A local mesh refinement algorithm for the FDFD method using a polygonal grid", *IEEE Microwave and Guided Wave Letters*, 6(1):52–54 (1996).
Kulke, et al., "Multigrid technique with local grid refinement for solving static field problems [RF circuits]", *IEEE MTT–S International Microwave Symposium Digest*, vol. 1, pp. 29–32 (1998).
Monorchio, et al., "A novel subgridding scheme based on a combination of the finite–element and finite–difference time–domain methods". *IEEE Transactions on Antennas and Propagation*, 46(9):1391–1393 (1998).

(List continued on next page.)

*Primary Examiner*—John F. Niebling
*Assistant Examiner*—Stacy A Whitmore
(74) *Attorney, Agent, or Firm*—Knobbe, Martens, Olson & Bear, LLP

(57) ABSTRACT

In order to design on-chip interconnect structures in a flexible way, a CAD approach is advocated in three dimensions, describing high frequency effects such as current redistribution due to the skin-effect or eddy currents and the occurrence of slow-wave modes. The electromagnetic environment is described by a scalar electric potential and a magnetic vector potential. These potentials are not uniquely defined, and in order to obtain a consistent discretization scheme, a gauge-transformation field is introduced. The displacement current is taken into account to describe current redistribution and a small-signal analysis solution scheme is proposed based upon existing techniques for static fields in semiconductors. In addition methods and apparatus for refining the mesh used for numerical analysis is described.

11 Claims, 29 Drawing Sheets

OTHER PUBLICATIONS

E.M. Buturla, et al., "Finite–Element Analysis of Semiconductor Devices: The Fielday Progam", IBM Journal on Research and Development, vol. 25, No. 4, pp. 218–231, Jul. 1981.

A. De Mari, "An Accurate Numerical One–Dimensional Solution of the p–n Junction Under Arbitrary Transient Conditions", Solid State Electronics, vol. 11, pp. 1021–1053, 1968.

H.K. Dirks, "Quasi–Stationary Fields for Microelectronic Applications", Electrical Engineering, vol. 79, pp. 145–155, 1996.

A. F. Franz, et al., "Finite Boxes– A Generation of the Finite–Difference Method Suitable for Semiconductor Device Simulation", IEEE Trans. On Electronic Devices, vol. ED–30, No. 9, Sep. 1983.

H. Hasegawa, et al., "Properties of Microstrip Line on Si–SiO System", IEEE Trans. On Microwave Theory and Techniques, vol. MTT–19, No. 11, Nov. 1971.

S.E. Laux, "Technique for Small Signal Analysis of Semiconductor Devices" IEEE Trans. On Computer Aided Design, vol. CAD–4, No. 4, Oct. 1985.

D.L. Scharfetter, et al., "Large–Signal Analysis of Silicon Read Diode Oscillator", IEEE Trans. on Electronic Devices, vol. ED–16, No. 1, Jan. 1969.

K.G. Wilson, "Confinement of Quarks", Physical Review, vol. D, No. 8, Oct. 15, 1974.

Albanese, R., et al., "Numerical Procedures for the Solution of Nonlinear Electromagnetic Problems", IEEE Transactions on Magnetics, vol. 28, No. 2, Mar. 1992. XP–002181720.

Zheng, Ji, et al., "CAD–Oriented Equivalent–Circuit Modeling of Off–Chip Interconnects on Lossy Silicon Substrate", IEEE Transactions on Microwave Theory and Techniques, vol. 48, No. 9, Sep. 2000. XP–002181721.

Nyka, K., et al., "Combining Function Expansion and Multigrid Method for Efficient Analysis of MMIC's", $11^{th}$ International Microwave Conference, Warsaw, Poland, May 1996. XP–001033645.

* cited by examiner

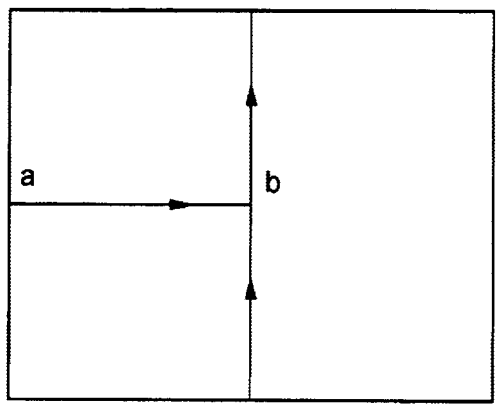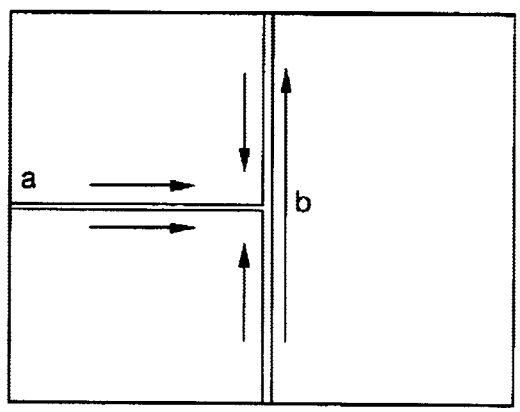
FIG. 20A          FIG. 20B
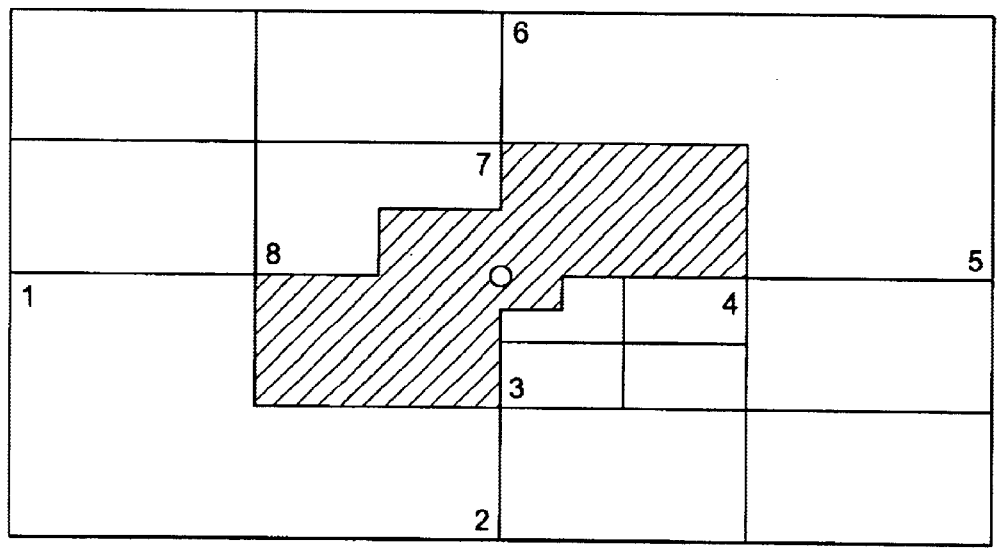
FIG. 21

METHOD AND APPARATUS FOR SIMULATING PHYSICAL FIELDS

RELATED APPLICATIONS

This is a continuation-in-part application of U.S. application Ser. No. 09/328,882, titled "A METHOD FOR LOCALLY REFINING A MESH", filed Jun. 9, 1999. The present application also claims priority to and incorporates by reference, in their entirety, U.S. application Ser. No. 60/213,764, titled "METHOD AND APPARATUS FOR SIMULATING ELECTROMAGENTIC FIELDS", filed Jun. 23, 2000 and United Kingdom Application No. 0113039.2, titled "AB INITIO ELECTRODYNAMIC MODELING OF ON-CHIP BACK-END STRUCTURES", filed May 30, 2001.

FIELD OF THE INVENTION

The present invention relates to a method and apparatus for simulating fields especially electromagnetic fields, particularly useful in the context of analysis of interconnect structures, is presented.

BACKGROUND OF THE INVENTION

Many problems in engineering, physics and chemistry require solving systems of partial differential equations of the type:

$$\vec{\nabla} \cdot \vec{J}^{(k)} + \frac{\partial \rho^{(k)}}{\partial t} = S^{(k)};$$

k being a positive whole number

In this equation (equation 1), J represents a flux of a substance under consideration whose density is given by $\rho$ and S represents some external source/sink of the substance. To mention a few examples:

Electrical engineering:
  $\rho$ is the charge density,
  J is the current density,
  S is the external charge source (recombination, generation, . . . )
Structural engineering
Computational Fluid Dynamics:
  $\rho^{(i)} = u^{(i)}$ the components of the fluid velocity field, $$J^{(i)} = P - \frac{\mu}{3} \vec{\nabla} \cdot u^{(i)} \text{ the pressure tensor,}$$

$$S^{(i)} = \frac{\mu}{\rho} \nabla^2 u^{(i)} + \frac{F^{(i)}}{m} \text{ the external force,}$$

$$\frac{\partial \rho}{\partial t} \rightarrow \frac{\partial \rho}{\partial t} + \vec{\nabla} \cdot \vec{u} \text{ the convective derivative.}$$

The list is not exhaustive and there exist many examples where problems are reformulated in such a form that their appearance is as in equation (1). An important example is the Laplace equation and Poisson equation, in which $$\vec{J} = \vec{\nabla} \psi$$

is the derivative of a scalar field.

There have been presented a number of methods for solving a set of partial differential equations as given above. All numerical methods start from representing the continuous problem by a discrete problem on a finite set of representative nodes in the domain where one is interested in the solution. In other words a mesh is generated in a predetermined domain. The domain can be almost anything ranging from at least a part of or a cross-section of a car to at least a part of or a cross-section of a semiconductor device. For clarification purposes, the discussion is limited here to two-dimensional domains and two-dimensional meshes. This mesh comprises nodes and lines connecting these nodes. As a result, the domain is divided into two-dimensional elements. The shape of the elements depends amongst others on the coordinate system that is chosen. If for example a Cartesian coordinate system is chosen, the two-dimensional elements are e.g. rectangles or triangles. Using such a mesh, the domain can be introduced in a computer aided design environment for optimization purposes. Concerning the mesh, one of the issues is to perform the optimization using the appropriate amount of nodes at the appropriate location. There is a minimum amount of nodes required in order to ensure that the optimization process leads to the right solution at least within predetermined error margins. On the other hand, if the total amount of nodes increases, the complexity increases and the optimization process slows down or even can fail. Because at the start of the optimization process, the (initial) mesh usually thus not comprise the appropriate amount of nodes, additional nodes have to be created or nodes have to be removed. Adding nodes is called mesh refinement whereas removing nodes is called mesh coarsening. Four methods are discussed. As stated above, for clarification and simplification purposes the 'language' of two dimensions is used, but all statements have a translation to three or more dimensions.

The finite-difference method is the most straightforward method for putting a set of partial differential equations on a mesh. One divides the coordinate axes into a set of intervals and a mesh is constructed by all coordinate points and replaces the partial derivatives by finite differences. The method has the advantage that it is easy to program, due to the regularity of the mesh. The disadvantage is that during mesh refinement many spurious additional nodes are generated in regions where no mesh refinement is needed.

The finite-box method, as e.g. in A. F. Franz, G. A. Franz, S. Selberherr, C. Ringhofer and P. Markowich "Finite Boxes-A Generalization of the Finite-Difference Method Suitable for Semiconductor Device Simulation" IEEE Trans. on Elec. Dev. ED-30, 1070 (1983), is an improvement of the finite-difference method, in the sense that not all mesh lines need to terminate at the domain boundary. The mesh lines may end at a side of a mesh line such that the mesh consists of a collection of boxes, i.e. the elements. However, numerical stability requires that at most one mesh line may terminate at the side of a box. Therefore mesh refinement still generates a number of spurious points. The issue of the numerical stability can be traced to the five-point finite difference rule that is furthermore exploited during the refinement.

The finite-element method is a very popular method because of its high flexibility to cover domains of arbitrary shapes with triangles. The choice in favor of triangles is motivated by the fact that each triangle has three nodes and with three points one can parameterize an arbitrary linear function of two variables, i.e. over the element the solution is written as $\psi(x,y) = a + b.x + c.y$ In three dimensions one needs four points, i.e. the triangle becomes a tetrahedron. The assembling strategy is also element by element. Sometimes for CPU time saving reasons, one performs a geometrical preprocessing such that the assembling is done link-wise, but this does not effect the element-by-element discretization and assembling. The disadvantage is that programming requires a lot of work in order to allow for submission of arbitrary complicated domains. Furthermore, adaptive meshing is possible but obtuse triangles are easily generated and one must include algorithms to repair these deficiencies, since numerical stability and numerical correctness suffers from obtuse triangles. As a consequence, mesh refinement and in particular adaptive meshing, generates in general spurious nodes.

The finite-element method is not restricted to triangles in a plane. Rectangles (and cubes in three dimensions) have become popular. However, the trial functions are always selected in such a way that a unique value is obtained on the interface. This restriction makes sense for representing scalar functions $\psi(x,y)$ on a plane.

In the box-integration method, each node is associated with an area (volume) being determined by the nodes located at the closest distance from this node or in other words, the closest neighbouring node in each direction. Next, the flux divergence equation is converted into an integral equation and using Gauss theorem, the flux integral of the surface of each volume is set equal to the volume integral at the right hand side of the equation, i.e. equation 1 becomes $$\int_{\partial \Omega_n} \vec{J}^{(i)} \cdot \vec{ds} = \int_{\Omega_n} \left( S^{(i)} - \frac{\partial \rho^{(i)}}{\partial t} \right) d^n x$$

The assembling is done node-wise, i.e. for each node the surface integral is decomposed into contributions to neighboring nodes and the volume integral at the right-hand side is approximated by the volume times the nodal value. The spatial discretization of the equation then becomes $$\sum_k J_{1k} \frac{\partial \Omega_{1k}}{h_{1k}} = \left( S_1^{(i)} - \frac{\partial \rho_1^{(i)}}{\partial t} \right) \Delta \Omega_1$$

The advantages/disadvantages of the method are similar as for the Finite element method because the control volumes and the finite elements are conjugate or dual meshes. Voronoi tessellation with the Delaunay algorithm is often exploited to generate the control volumes.

However, forming and refining the mesh is not the only problem facing the skilled person in the solution of field theory problems. For instance, the on-chip interconnect structure in modern ULSI integrated circuits is a highly complex electromagnetic system. The full structure may connect more than one million transistors that are hosted on a silicon substrate, and containing up to seven metallization layers, and including interconnect splittings, curves, widenings, etc. A structure results with a pronounced three-dimensional character. As a consequence, analytic solution methods have only limited applicability and numerical or computer-aided design methods need to be used. The continuous down-scaling of the pitch implies that parasitic effects become a major design concern. Furthermore, interconnect delay will soon become the main bottleneck for increasing the operation frequencies of the fully integrated circuit. These observations justify an in-depth analysis of the interconnect problem based on the basic physical laws underlying the description of these systems. Whereas in the past it sufficed to extract the parasitic behavior from the low-frequency values of the characteristic parameters, such as the resistance (R), capacitance (C) and inductance (L), knowledge about the modifications of these parameters due to fast variations in time of the fields, i.e. at high frequency, becomes mandatory. A generic method that allows one to obtain the frequency dependence of the characteristic parameters for an interconnect (sub-) system has been a requirement for some time.

The highest frequency in which is currently of interest is 50 GHz, which corresponds to a shortest wavelength of the order of one centimeter. However, this is only a current limit. For most of the interconnects with sub-micron widths the characteristic width (length) of the structure is therefore much smaller than the wavelengths under consideration. In this regime one normally neglects the full displacement current, but this view must be refined depending upon the materials used [H. K. Dirks, Quasi-Stationary Fields for Microelectronic Applications, Electrical Engineering, 79, 145–155, 1996]. Interconnect lines are typically parallel to the axes of a Cartesian grid Manhattan like geometry. Although this is no longer true for widenings and splittings in the lines and the vertical connections, i.e. cylindrical vias, most of the structure can be regarded in a first order approximation as consisting of straight orthogonal lines or bricks. The skin effect becomes important for the upper metallization levels where the width of the structures is larger than the skin depth for aluminum or copper, especially at the high frequency part of the spectrum. Eddy currents play an important role in the lossy semiconductor silicon substrate. It is desirable to formulate the equations for the interconnect system in a language that is familiar to the interconnect-designer community. In particular, variables such as the Poisson field should have their usual meaning. For time-dependent fields it can be achieved by selecting a specific gauge fixing. In particular, in the Coulomb gauge, the Poisson equation remains unaltered. The natural choice for the description of interconnect systems is the one that uses the electric scalar potential and the magnetic vector potential. Small signal analysis (AC analysis) has been a successful tool for extracting compact model parameters for devices [S. E. Laux, Techniques for Small-Signal Analysis of Semiconductor devices, IEEE trans. on computer-aided design, 4, 472–481, 1985]. Recently good results were obtained in using small-signal analysis [S. Jenei, *private communication*, 2000] for the extraction of compact model parameters for the Hasagawa system [H. Hasegawa et al. IEEE Trans. on Microwave Theory and Techniques vol. MTT-19, 869, 1971] and similar methods are currently exploited for the design of spiral inductors.

Numerical analysis is well known to the skilled person, e.g. "The finite element method", Zienkiewicz and Taylor, Butterworth-Heinemann, 2000 or "Numerical Analysis", Burden and Faires, Brooks/Cole, 2001. Conventional finite difference numerical analysis solves three-dimensional field theory problems that contain the magnetic vector potential by superimposing three scalar fields, representing this vector potential, whereby each scalar value is located at a node of a mesh. Finite difference methods convert partial differential equations into algebraic equations for each node based on finite differences between a node of interest and a number of neighbours. These methods introduce three types of errors. Firstly, there is the error caused by solving for a discrete mesh, which is only an approximation to a continuum. The smaller the mesh the higher the accuracy. Secondly, the finite difference methods require an iterative solution, which is terminated after a certain time—this implies a residual error. Thirdly, the superposition of three scalar fields is only an accurate representation of vector fields when the mesh size is so small that moving from one node to the next in one direction is associated with a negligible change in the field values in the other two dimensions. In such a case small changes of dimension in one direction may be considered as if the values of the field in the other two are constant. Where there are strongly varying fields this criterion can only be met where the mesh spacing is very small, i.e. there are a large number of nodes. Computational intensity increases rapidly with the number of nodes. To a certain extent the computational intensity can be reduced by modifying the size of mesh so that a tight mesh is only used where the divergence of the field requires this. However, varying mesh sizes places limitations on the continuity of the solution resulting in unnecessary nodes being created to provide sufficiently gradual changes. Hence, conventionally a large amount of storage space and high-powered computers are required to achieve an accurate result in a reasonable amount of time.

AIM OF THE INVENTION

It is an aim of the present invention to provide numerically stable methods and apparatus implementing these methods for simulating (i.e. calculating) field problems, e.g. electromagnetic fields.

It is a further aim of the present invention to provide numerically stable methods and apparatus implementing these methods for simulating (i.e. calculating) field problems, e.g. electromagnetic fields which requires less storage space and preferably less computational intensity.

SUMMARY OF THE INVENTION

The present invention provides a consistent solution scheme for solving field problems especially electromagnetic modeling that is based upon existing semiconductor techniques. A key ingredient in the latter ones is the numerical solutions method based on a suitable finite difference method such as the Newton-Raphson technique for solving non-linear systems. This technique requires the inversion of large sparse matrices, and of course numerical stability demands that the inverse matrices exist. In particular, the finite difference matrix, e.g. a Newton-Raphson matrix should be square and non-singular. The present invention provides a generic method for solving field problems, e.g. simulating electromagnetic fields, and is designed for numerical stability, in particular the solution of partial differential equations by numerical methods.

It is an aspect of the invention that it is recognized that in order to obtain a consistent discretization scheme, meaning leading to numerical fit calculations, a dummy transformation field, also denoted gauge transformation field or auxiliary gauge field can be introduced as a dummy field and can ease computation. The dummy field can be introduced due to the non-uniqueness of the electric and magnetic potentials describing the underlying physical phenomena.

It is an aspect of the invention that it is recognized that in order to obtain a consistent discretization scheme special caution is taken in the translation of the continuous field equations onto the discrete lattice, comprising of nodes and links.

With the generic method high-frequency parasitic effects and the frequency dependence of the characteristic parameters for an interconnect (sub-) system can be studied but the method is not limited thereto.

The present invention provides a method for numerical analysis of a simulation of a physical system, the physical system being describable by field equations in which a parameter is identifiable as a one-form and solving for a field equation corresponding to the parameter results in a singular differential operation, the method comprising:

directly solving the field equations modified by addition of a dummy field by numerical analysis, and outputting at least one parameter relating to a physical property of the system.

The method can be formalized as follows: a method for simulating fields in or about a device, said method comprising the steps of:

modifying the set of field equations expressed in terms of the vector potential of said fields to a set of modified field equations expressed in terms of the vector potential of said inductive fields and a dummy field; and directly solving the set of modified field equations in order to obtain the vector potential and said dummy field. The output of the method is a field related parameter of the device, e.g. an electromagnetic parameter of the device such as a field strength, a resistivity, an inductance, a magnetic field strength, an electric field strength, an energy value. The field equations of the above method may be the Maxwell equations. The dummy field is preferably a scalar field.

The present invention also provides a method for numerical analysis of a simulation of a physical system, the physical system being describable by Maxwell's field equations of which the following is a representation:

$$\nabla \times \left(\frac{1}{\mu}\nabla \times A\right) = J - \epsilon\frac{\partial}{\partial t}\left(\nabla V + \frac{\partial A}{\partial t}\right) \quad (1)$$

$$\nabla \cdot A = 0 \quad (2)$$

$$-\nabla(\epsilon\nabla V) = \rho \quad (3)$$

$$E = -\nabla V - \frac{\partial A}{\partial t} \quad (4)$$

$$B = \nabla \times A \quad (5)$$

Where J and ρ are generic functions of the fields, i.e.

$$J=J(E,B,t) \quad (6)$$

$$\rho=\rho(E,B,t) \quad (7)$$

the method comprising:

directly solving the field equations modified by addition of a dummy field by numerical analysis, the dummy field removing a singularity in the numerical analysis, and outputting at least one parameter relating to a physical property of the system.

The physical property may be any of the following non-limiting list: an electric current, a current density, a voltage difference, an electric field value, a plot of an electric field, magnetic field value, a plot of a magnetic field, a resistance or a resistivity conductance or a conductivity, a susceptance or a suceptibility, an inductance, an admittance, a capacitance, a charge, a charge density, an energy of an electric or magnetic field, a permittivity, a heat energy, a noise level induced in any part of a device caused by electromagnetic fields, a frequency.

The above methods also include a step refining a mesh used in the numerical analysis in accordance with an embodiment of the present invention.

The present invention may provide an apparatus for numerical analysis of a simulation of a physical system, the physical system being describable by field equations in which a parameter is identifiable as a one-form and solving for a field equation corresponding to the parameter results in a singular differential operation, the apparatus comprising: means for solving by numerical analysis a modification of the field equations, the modification being an addition of a dummy field, and means for outputting at least one parameter relating to a physical property of the system.

The present invention may also provide an apparatus for numerical analysis of a simulation of a physical system, the physical system being describable by Maxwell's field equations of which the following is a representation:

$$\nabla \times \left(\frac{1}{\mu} \nabla \times A\right) = J - \epsilon \frac{\partial}{\partial t}\left(\nabla V + \frac{\partial A}{\partial t}\right)$$

$$\nabla \cdot A = 0$$

$$-\nabla(\epsilon \nabla V) = \rho$$

$$E = -\nabla V - \frac{\partial A}{\partial t}$$

$$B = \nabla \times A$$

where $J=J(E,B,t)$ $\rho=\rho(E,B,t)$ the apparatus comprising:
  means for directly solving the field equations modified by addition of a dummy field by numerical analysis, the dummy fieled being added to remove a singularity during the numerical analysis, and
  means for outputting at least one parameter relating to a physical property of the system.

The present invention may include a data structure for use in numerical analysis of a simulation of a physical system, the physical system being describable by field equations in which a parameter is identifiable as a one-form and solving for a field equation corresponding to the parameter results in a singular differential operation, the field equations being modified by addition of a dummy field, wherein the data structure comprises the simulation of the physical system as a representation of an n-dimensional mesh in a predetermined domain of the physical system, the mesh comprising nodes and links connecting these nodes thereby dividing said domain in n-dimensional first elements whereby each element is defined by $2^n$ nodes, the data structure being stored in a memory and comprising representations of the nodes and the links between nodes, the data structure also including definitions of a parameter of the dummy field associated with the nodes of the mesh.

A data structure for use in numerical analysis of a simulation of a physical system, the physical system being describable by Maxwell's field equations of which the following is a representation:

$$\nabla \times \left(\frac{1}{\mu} \nabla \times A\right) = J - \epsilon \frac{\partial}{\partial t}\left(\nabla V + \frac{\partial A}{\partial t}\right)$$

$$\nabla \cdot A = 0$$

$$-\nabla(\epsilon \nabla V) = \rho$$

$$E = -\nabla V - \frac{\partial A}{\partial t}$$

$$B = \nabla \times A$$

where $J=J(E,B,t)$ $\rho=\rho(E,B,t)$ the field equations being modified by addition of a dummy field, wherein the data structure comprises the simulation of the physical system as a representation of an n-dimensional mesh in a predetermined domain of the physical system, the mesh comprising nodes and links connecting these nodes thereby dividing said domain in n-dimensional first elements whereby each element is defined by $2^n$ nodes, the data structure being stored in a memory and comprising representations of the nodes and the links between the nodes, the data structure also including definitions of the vector potential A associated with the links of the mesh.

The present invention also includes a program storage device readable by a machine and encoding a program of instructions for executing any of the methods of the present invention.

The present invention also includes a computer program product for numerical analysis of a simulation of a physical system, the physical system being describable by field equations in which a parameter is identifiable as a one-form and solving for a field equation corresponding to the parameter results in a singular differential operation, the computer program product comprising:
  code for solving the field equations modified by addition of a dummy field by numerical analysis, and
  code for outputting at least one parameter relating to a physical property of the system.

The present invention also includes a computer program product for numerical analysis of a simulation of a physical system, the physical system being describable by Maxwell's field equations of which the following is a representation:

$$\nabla \times \left(\frac{1}{\mu} \nabla \times A\right) = J - \epsilon \frac{\partial}{\partial t}\left(\nabla V + \frac{\partial A}{\partial t}\right)$$

$$\nabla \cdot A = 0$$

$$-\nabla(\epsilon \nabla V) = \rho$$

$$E = -\nabla V - \frac{\partial A}{\partial t}$$

$$B = \nabla \times A$$

where $J=J(E,B,t)$ $\rho=\rho(E,B,t)$ the computer program product comprising:
  code for solving the field equations modified by addition of a dummy field by numerical analysis, and
  code for outputting at least one parameter relating to a physical property of the system.

The present invention also includes a method for numerical analysis of a simulation of a physical system, comprising: transmitting from a near location a description of the physical system to a remote location where a processing engine carries out any of the method in accordance with the present invention, and receiving at a near location at least one physical parameter related to the physical system.

The modified field equations are:

$$\nabla \times \left(\frac{1}{\mu} \nabla \times A\right) - \gamma \nabla \chi = J - \epsilon \frac{\partial}{\partial t}\left(\nabla V + \frac{\partial A}{\partial t} + \frac{\partial \nabla \chi}{\partial t}\right) \quad (8)$$

$$\nabla \cdot A + \nabla^2 \chi = 0 \quad (9)$$

$$-\nabla(\epsilon \nabla V) = \rho \quad (10)$$

$$E = -\nabla\left(V + \frac{\partial \chi}{\partial t}\right) - \frac{\partial A}{\partial t} \quad (11)$$

$$B = \nabla \times (A + \nabla \chi) \quad (12)$$

where $\gamma$ is non-zero a scaling factor, which guarantees matching of dimensions.

In the present invention the introduction of the dummy field represented by $\chi$ preferably does not modify the vector potential A found from the solution of the modified field equations when compared with the vector potential found from solution of the unmodified field equations. The accuracy of the method may be checked by comparing known algebraic solutions of simple fields with the solution of the method according to the present invention.

In the method the step of directly solving the set of modified field equations is performed by discretizing the set of modified field equations onto a mesh with nodes and links between said nodes. For example, the mesh can be a Cartesian mesh. In particular, in the method the vector potential is defined on the links of the mesh. The advantage of associating a field vector with the links and not with the nodes results from the fact that links define a direction given inherently by the form of the mesh. Hence, a field vector field is associated with an atomic vector element of the mesh. This is a more accurate simulation than using the superposition of scalar fields to simulate a field vector, the present invention makes advantageous use of vector elements in the mesh to solve the field equations more accurately. This reduces the number of nodes required to achieve a certain accuracy. This also means that the amount of memory required is reduced as well as speeding up the calculation time.

In the method the dummy field is also defined on the nodes of the mesh as it is a scalar field. That is in the finite difference method the nodes are used as the reference points for values of the dummy field. In the method other terms in the modified field equations are expressed in terms of the vector potential and the dummy field. In the method the curl—curl operation on a vector potential on a link is expressed in function of the vector potential on the link and the vector potentials on neighboring links of this link. The curl—curl operation on a vector potential on a link is expressed in function of the vector potential on the link and the vector potentials on links, defined by wings with said link.

In the method the step of directly solving can exploit a Newton-Raphson procedure for solving nonlinear equations. In this case it is preferred to select the dummy field in order to have square non-singular matrices in the Newton-Raphson procedure.

In the method the boundary conditions may be determined by solving a Maxwell equation in a space with 1 dimension less than the space in which the original field equations are solved.

In a further aspect of the invention a method, i.e. the so-called Cube-Assembling Method (CAM), is disclosed for locally refining a n-dimensional mesh in a predetermined domain, wherein the mesh comprises nodes and n-1 planes connecting these nodes thereby dividing said domain in n-dimensional first elements. This method may be advantageously combined with other embodiments of the invention for the solution of field theory equations. The domain can be almost anything ranging from at least a part of a car to at least a part of a semiconductor device. For clarification purposes, the present invention will be described with reference to two-dimensional domains and two-dimensional meshes but the present invention is not limited thereto. The shape of the elements depends amongst others on the coordinate system, which is chosen. By applying a mesh on a domain, the domain can be introduced in a computer aided design environment for optimization purposes. Concerning the mesh, one of the issues is to perform the optimization using the appropriate amount of nodes at the appropriate location. There is a minimum amount of nodes required in order to ensure that the optimization process leads to the right solution at least within predetermined error margins. On the other hand, if the total amount of nodes increases, the complexity increases and the optimization process slows down or even can fail. Because at the start of the optimization process, the (initial) mesh usually thus not comprise the appropriate amount of nodes, additional nodes have to be created or nodes have to be removed during the optimization process. Adding nodes is called mesh refinement whereas removing nodes is called mesh coarsening. The method of the present invention succeeds in adding or removing nodes locally. The assembling is done over the elements, being e.g. squares or cubes or hypercubes dependent of the dimension of the mesh. Like the finite-box method, the CAM method is easy to program, even in higher dimensions. However, the CAM method does not suffer from the restriction that only one line may terminate at the side of a box.

According to this aspect of the invention, a method is disclosed for locally refining a n-dimensional mesh in a predetermined domain, wherein the mesh comprises nodes and n-1 planes connecting these nodes thereby dividing said domain in n-dimensional first elements whereby each element is defined by $2^n$ nodes, said method comprising at least the steps of:

creating a first additional node inside at least one of said first elements by completely splitting said first element in exactly $2^n$ n-dimensional second elements in such a manner that said first additional node forms a corner node of each of said second elements which results in the replacement of said first element by said $2^n$ n-dimensional second elements; and creating a second additional node inside at least one of said second elements by completely splitting said second element in exactly $2^n$ n-dimensional third elements in such a manner that said second additional node forms a corner node of each of said third elements which results in the replacement of said second element by said $2^n$ n-dimensional third elements.

In an embodiment of the invention after the mesh is locally refined, this mesh is locally coarsened.

In another embodiment of the invention, the refinement is based on an adaptive meshing strategy.

In another aspect of the invention, a program storage device is disclosed storing instructions that when executed by a computer perform the method for locally refining a n-dimensional mesh in a predetermined domain, wherein the mesh comprises nodes and n-1 planes connecting these nodes thereby dividing said domain in n-dimensional first elements whereby each element is defined by $2^n$ nodes, said method comprising at least the steps of:

creating a first additional node inside at least one of said first elements by completely splitting said first element in exactly $2^n$ n-dimensional second elements in such a manner that said first additional node forms a corner node of each of said second elements which results in the replacement of said first element by said $2^n$ n-dimensional second elements; and creating a second additional node inside at least one of said second elements by completely splitting said second element in exactly $2^n$ n-dimensional third elements in such a manner that said second additional node forms a corner node of each of said third elements which results in the replacement of said second element by said $2^n$ n-dimensional third elements.

In an aspect of the invention a method is disclosed for optimizing of a predetermined property of a n-dimensional structure, said method comprising the steps of:

creating a n-dimensional mesh on at least a part of said structure; said mesh containing nodes and n-1 planes connecting these nodes thereby dividing said domain in n-dimensional first elements whereby each element is defined by $2^n$ first element;

refining said n-dimensional mesh by creating a first additional node inside at least one of said first elements by completely splitting said first element in exactly $2^n$ n-dimensional second elements in such a manner that said first additional node forms a corner node of each of said second elements which results in the replacement of said first element by said $2^n$ n-dimensional second elements;

further refining said n-dimensional mesh by creating a second additional node inside at least one of said second elements by completely splitting said second element in exactly $2^n$ n-dimensional third elements in such a manner that said second additional node forms a corner node of each of said third elements which results in the replacement of said second element by said $2^n$ n-dimensional third elements; and where said n-dimensional mesh is used to create an improved structure.

In an embodiment of the invention said structure improvements are based on extracting said property from structure characteristics, determined at a subset of said nodes of said mesh.

In a further embodiment of the invention said structure characteristics are determined by solving the partial differential equations, describing the physical behavior of said structure, on said mesh.

The present invention will now be described with reference to the following drawings.

BRIEF DESCRIPTION OF THE DRAWINGS

FIG. 20 depicts the assembling strategy, according to an embodiment of the invention. The flux in link ab is composed of two parts: a contribution from the lower rectangle (element) and a contribution from the upper rectangle (element).

FIG. 21 depicts a mesh according to an embodiment of the invention, wherein each node is associated with an area, i.e. the black area, being determined by the nodes located at the closest distance from this node or in other words, the closest neighbouring node in each direction Each node is connected to at most eight different nodes in the mesh.

DETAILED DESCRIPTION OF ILLUSTRATIVE EMBODIMENTS

Figure 1:
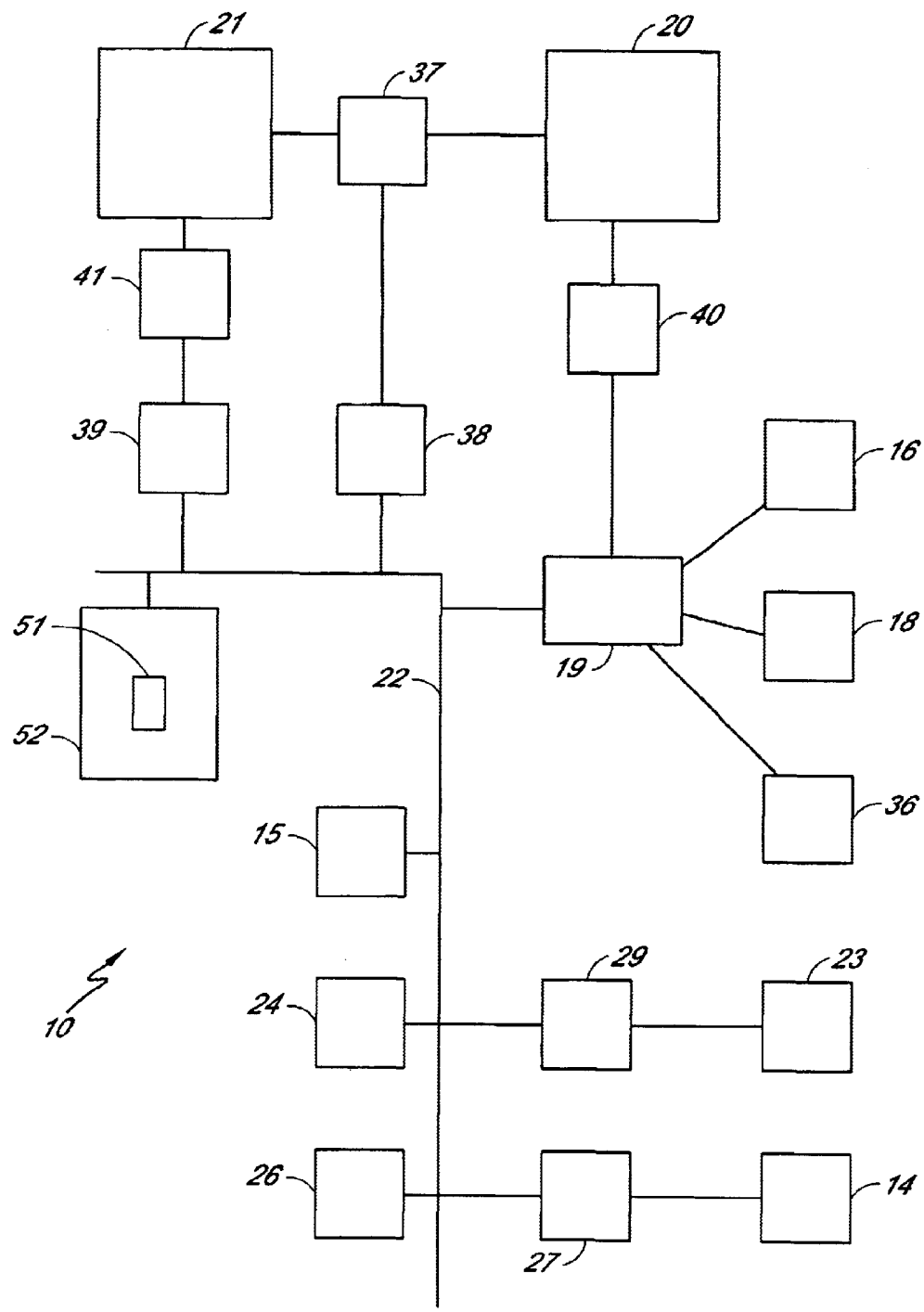
FIG. 1 shows a schematic representation of a computing device which may be used with the present invention.

The present invention will be described with reference to certain embodiments and drawings but the present invention is not limited thereto but only by the claims. In particular, the present invention will be described with reference to the solution of electromagnetic field problems especially those associated with semiconductor devices but the skilled person will appreciate that the present invention has application to the solution of field theory problems in general and to the solution of partial differential equations in general.

Without being limited by theory, embodiments of the present invention relating to the solution of electromagnetic field equations are based on the following observations. The Maxwell equations formulated in terms of E and B allow for a geometrical interpretation analogous to fluid dynamics. In this picture the electric field E is a one-form, in other words a numerical value is assigned to each path in space. The numerical value corresponds to the work done by the electric field when a charge would move along the path. The magnetic field B is a two-form i.e. a numerical value is assigned to each area element that counts the number B-field flux lines (flows) that pass through the area element.

There is a different and more abstract geometrical interpretation of electrodynamics. The fields E and B can be expressed as derivatives of a scalar V and vector potential A:

$$E = -\nabla V - \frac{\partial A}{\partial t}$$
$$B = \nabla \times A$$

Now the fields E and B can be viewed as the curvature of a space. This is the space of phases that may be assigned to quantum fields. This curvature interpretation is lacking in the older geometrical picture of electrodynamics.

In order to detect the strength of the electromagnetic field it suffices to go around an infinitesimal loop and measure the mismatch between the starting value of the phase factor and the end value of the phase factor. In analytic calculations this interpretation has no serious consequences because these calculations are based comparing infinitesimal changes in the variables going from one position to another. Therefore, the vector potential can be regarded as a field i.e. its dependence on the space-time variables is only local. However, in a computer calculations are made using a grid or mesh of nodes and links and neighboring positions (grid nodes) are always a finite distance apart. Therefore, the round trip along a closed loop for detecting the electromagnetic field consists of line segments that are also of finite length. The phase factor of each line segment depends on the details of the path and therefore the assignment of the vector potential, in accordance with an aspect of the present invention, is done to these paths. In fact, the exact connection between the phase factor, the path C and the vector potential reads as:

$$\varphi[\text{path } C, A] = \exp \frac{i}{\hbar} \int_C A \cdot dx$$

Only in the limit of the mesh size going to zero are there no serious consequences. However, the use of very small mesh sizes increases the memory requirement as well as the time for processing all these nodes in a finite difference scheme. Determining the limit as the mesh size goes to zero is not practical in numerical analysis. The present invention presents new solutions of the Maxwell equations arising from the new geometrical interpretation (and any other field equations having similar singularity problems) using the numerical analysis of finite mesh sizes.

The new geometrical interpretation of electrodynamics requires assignment of the vector potential A to the links which are the path segments of the grid in the following way:

$$A_{ij} \approx A \cdot \Delta x$$

where ij refers to the link between the two neighboring nodes i and j. The vector A is represented by its projections onto the three axes x, y, z and a value is assigned to each mesh link in these directions. Hence, the vectorial nature of A is maintained by assigning it to a link which itself is a vector. The present invention therefore makes advantageous use of the inherent vectorial nature of a grid of nodes and links in numerical analysis.

In general, if a parameter can be defined as a one-form, i.e. a mapping from a line segment to a number, then this parameter should be represented in the computer code as a variable assigned to the links of the grid. This observation can be widened even more: If a parameter can be identified as a two-form it should be assigned to the area elements (plaquettes) of the grid, and if a parameter can be identified as a three-form it should be assigned to volume elements of the grid. A reference providing technical background information of the above geometrical representations is "The Geometry of Physics", Theodore Frankel, Cambridge Univ. Press, 1997.

However, there remains a serious difficulty. The Maxwell equations formulated in terms of the potentials V and A, exhibit a singular behavior with respect to the inversion of the full differential operators. The fact that the differential operator is singular indicates an underlying symmetry. This symmetry is eliminated in accordance with an aspect of the present invention by symmetry breaking conditions. In the present invention a method based on a dummy or auxiliary field ($\chi$), is described to convert the singular behavior of the differential operator into a regular differential operator without altering the physical content of the system of equations.

Summarizing: if a parameter can be identified as a one-form and the corresponding coupling between nearest neighbor nodes of a mesh used for numerical analysis results in a singularity problem, the singularity may be alleviated by the inclusion of an auxiliary parameter without altering the physical realization (solution) of the inversion problem.

FIG. 1 is a schematic representation of a computing system which can be utilized with the methods and in a system according to the present invention. A computer 10 is depicted which may include a video display terminal 14, a data input means such as a keyboard 16, and a graphic user interface indicating means such as a mouse 18. Computer 10 may be implemented as a general purpose computer, e.g. a UNIX workstation.

Computer 10 includes a Central Processing Unit ("CPU") 15, such as a conventional microprocessor of which a Pentium III processor supplied by Intel Corp. USA is only an example, and a number of other units interconnected via system bus 22. The computer 10 includes at least one memory. Memory may include any of a variety of data storage devices known to the skilled person such as random-access memory ("RAM"), read-only memory ("ROM"), non-volatile read/write memory such as a hard disc as known to the skilled person. For example, computer 10 may further include random-access memory ("RAM") 24, read-only memory ("ROM") 26, as well as an optional display adapter 27 for connecting system bus 22 to an optional video display terminal 14, and an optional input/output (I/O) adapter 29 for connecting peripheral devices (e.g., disk and tape drives 23) to system bus 22. Video display terminal 14 can be the visual output of computer 10, which can be any suitable display device such as a CRT-based video display well-known in the art of computer hardware. However, with a portable or notebook-based computer, video display terminal 14 can be replaced with a LCD-based or a gas plasma-based flat-panel display. Computer 10 further includes user interface adapter 19 for connecting a keyboard 16, mouse 18, optional speaker 36, as well as allowing optional physical value inputs from physical value capture devices such as sensors 40 of an external system 20. The sensors 40 may be any suitable sensors for capturing physical parameters of system 20. These sensors may include any sensor for capturing relevant physical values required for solution of the field problems, e.g. temperature, pressure, fluid velocity, electric field, magnetic field, electric current, voltage. Additional or alternative sensors 41 for capturing physical parameters of an additional or alternative physical system 21 may also connected to bus 22 via a communication adapter 39 connecting computer 10 to a data network such as the Internet, an Intranet a Local or Wide Area network (LAN or WAN) or a CAN. This allows transmission of physical values or a representation of the physical system to be simulated over a telecommunications network, e.g. entering a description of a physical system at a near location and transmitting it to a remote location, e.g. via the Internet, where a processor carries out a method in accordance with the present invention and returns a parameter relating to the physical system to a near location.

The terms "physical value capture device" or "sensor" includes devices which provide values of parameters of a physical system to be simulated. Similarly, physical value capture devices or sensors may include devices for transmitting details of evolving physical systems. The present invention also includes within its scope that the relevant physical values are input directly into the computer using the keyboard 16 or from storage devices such as 23.

A parameter control unit 37 of system 20 and/or 21 may also be connected via a communications adapter 38. Parameter control unit 37 may receive an output value from computer 10 running a computer program for numerical analysis in accordance with the present invention or a value representing or derived from such an output value and may be adapted to alter a parameter of physical system 20 and/or system 21 in response to receipt of the output value from computer 10. For example, the dimension of one element of a semiconductor device may be altered based on the output, a material may be changed, e.g. from aluminium to copper, or a material may be modified, e.g. a different doping level in a semiconductor layer, based on the output.

Computer 10 also includes a graphical user interface that resides within machine-readable media to direct the operation of computer 10. Any suitable machine-readable media may retain the graphical user interface, such as a random access memory (RAM) 24, a read-only memory (ROM) 26, a magnetic diskette, magnetic tape, or optical disk (the last three being located in disk and tape drives 23). Any suitable operating system and associated graphical user interface (e.g., Microsoft Windows) may direct CPU 15. In addition, computer 10 includes a control program 51 which resides within computer memory storage 52. Control program 51 contains instructions that when executed on CPU 15 carry out the operations described with respect to any of the methods of the present invention.

Those skilled in the art will appreciate that the hardware represented in FIG. 1 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already described. In the example depicted in FIG. 1, the computer program product (i.e. control program 51) can reside in computer storage 52. However, it is important that while the present invention has been, and will continue to be, that those skilled in the art will appreciate that the mechanisms of the present invention are capable of being distributed as a program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links.

In one embodiment, the computer 10 includes certain components that can comprise hardware, software, or a combination thereof. For example, the computer 10 includes a solving component for solving equations and an outputting for outputting data.

Maxwell Equations

The interconnect modeling directly relies upon the Maxwell equations, that describe the temporal and spatial evolution of the electromagnetic fields in media.

Gauss' Law $$\nabla \cdot D = \rho \tag{13}$$

Absence of Magnetic Monopoles $$\nabla \cdot B = 0 \tag{14}$$

Maxwell-Faraday $$\nabla \times E = -\frac{\partial B}{\partial t} \tag{15}$$

Maxwell-Ampère $$\nabla \times H = J + \frac{\partial D}{\partial t} \tag{16}$$

where D, E, B, H, J and $\rho$ denote the electrical induction, the electric field, the magnetic induction, the magnetic field, the current density and the charge density, respectively.

Constitutive Laws

The following constitutive equations relate the inductances to the field strengths $$B = \mu H \tag{17}$$

$$D = \epsilon E \tag{18}$$

The constitutive equation that relates the current J to the electric field and the current densities, is determined by the medium under consideration. For a conductor the current J is given by Ohm's law.

$$J = \sigma E \tag{19}$$

where the current density satisfies the current-continuity equation:

$$\nabla \cdot J + \frac{\partial \rho}{\partial t} = 0 \quad (20)$$

In a dielectric there are no free charges. As a simplifying approximation, the case will be considered of a dielectric medium whose lossy effects can be neglected. In this case, no current continuity equations need to be solved in the dielectric materials and their dielectric constants may be assumed to be real. Although this is a severe restriction, the dielectric materials that are used in back-end processing of semiconductor devices are sufficiently robust against energy absorption, in order to preserve signal integrity at the frequencies under consideration [A. Von Hippel, Dielectric materials and applications, Artech House, Boston, 1995]. In the semiconducting regions, the current J consists of negatively and positively charged carrier currents obeying the current continuity equations.

$$\nabla \cdot J_n - q\frac{\partial n}{\partial t} = U(n, p) \quad (21)$$

$$\nabla \cdot J_p + q\frac{\partial p}{\partial t} = -U(n, p) \quad (22)$$

In here, the charge and current densities are $$\rho = q(p - n + N_D - N_A) \quad (23)$$

$$J_n = q\mu_n nE + kT\mu_n \nabla n \quad (24)$$

$$J_p = q\mu_p pE - kT\mu_p \nabla p \quad (25)$$

$$J = J_n + J_p \quad (26)$$

and U(n,p) is the generation/recombination of charge carriers. The current continuity equations provide the solution of the variables n and p. Note that the permittivity $\epsilon$ in equation 18 is real whereas, for the applications envisaged, it may be safely assumed in the following that the structure is non-magnetic, i.e. $\mu$ may be assumed to be equal to $\mu_0$).

Potential Description

In order to implement the equations into software algorithms, an electric scalar potential V and a magnetic vector potential A is introduced in the following way. From equation 14 the magnetic induction B may be written as $$B = \nabla \times (A + \nabla \chi) \quad (27)$$

where $\chi$ is an arbitrary scalar field. The presence of the field $\chi$ is clearly mathematically redundant since $\nabla \times (\nabla \chi) = 0$. Moreover, $\nabla \chi$ can be absorbed in the vector potential A.

As will demonstrated in section on the discretization scheme, the field $\chi$ is a key ingredient to set up a consistent discretization scheme. Inserting equation 27 into equation 15 yields:

$$\nabla \times \left(E + \frac{\partial A}{\partial t} + \frac{\partial \nabla \chi}{\partial t}\right) = 0 \quad (28)$$

whence $$E = -\nabla V - \frac{\partial A}{\partial t} - \frac{\partial \nabla \chi}{\partial t} \quad (29)$$

-continued $$= -\nabla\left(V + \frac{\partial \chi}{\partial t}\right) - \frac{\partial A}{\partial t}$$

where the last equality reflects the arbitrariness in the definition of the scalar potential V. Insertion of equations 27 and 29 into the remaining Maxwell equations 13 and 16 gives:

$$-\nabla \cdot \left(\epsilon \nabla V + \epsilon \frac{\partial A}{\partial t} + \epsilon \frac{\partial \nabla \chi}{\partial t}\right) = \rho \quad (30)$$

$$\frac{1}{\mu} \nabla \times (\nabla \times A) - \gamma \nabla \chi = J - \epsilon \frac{\partial}{\partial t}\left(\nabla V + \frac{\partial A}{\partial t} + \frac{\partial \nabla \chi}{\partial t}\right) \quad (31)$$

where $\gamma$ is a scaling factor, which should be non-zero, e.g. 1 or -1. Since A is not uniquely determined, an appropriate gauge still has to be chosen. In order to maintain a connection to the usual language and syntax of the static modeling of interconnects, a generalized Coulomb gauge such that Poisson's equation is recovered may be chosen:

$$\nabla \cdot A + \nabla^2 \chi = 0 \quad (32)$$

The basic equations can now be summarized as $$\nabla \cdot (\epsilon \nabla V) = -\rho \quad (33)$$

$$\frac{1}{\mu} \nabla \times (\nabla \times A) - \gamma \nabla \chi = J - \epsilon \frac{\partial}{\partial t}\left(\nabla V + \frac{\partial A}{\partial t} + \frac{\partial \nabla \chi}{\partial t}\right) \quad (34)$$

It should be stressed that so far no approximations have been made. The regular Coulomb gauge corresponds to $\chi = 0$ and is convenient for analytic calculations. In particular, after manipulating the term $\nabla \times \nabla \times A$ as $-\nabla^2 A + \nabla(\nabla \cdot A)$, the last term vanishes and equation 34 becomes $$-\nabla^2 A = \mu_0 (J + J_D) \quad (35)$$

where $J_D$ is the displacement current. Analytic solution schemes address equation 35 as a three-fold Poisson equation. This approach is usually sustained in numerical solution schemes, distributing the three components $A_x$, $A_y$, $A_z$, over the nodes of the discrete lattice.

As indicated above there are strong arguments to associate the field A to links. First of all, from a gauge-theoretical point of view, the field A is the Lie algebra element that describes the phase factor of a path in real space. A successful discretization of gauge theories assigns the group elements, and therefore the gauge fields to links [K. G. Wilson, Confinement of Quarks, *Phys. Rev.* D10, 2445, 1974]. Another argument in favor of this association is that the vector potential can be identified in differential geometry with a one-form, i.e. a function on vectors, where in accordance with the present invention the vectors are connecting two adjacent grid nodes [T. Frankel, The Geometry of Physics, Cambridge University Press, 1997]. With these arguments in mind a gauge field variable $A_{ij} = A \cdot \hat{e}_{ij}$ is associated to each link where $\hat{e}_{ij}$ is a unit vector in the direction of the link between nodes i and j.

The time evolution can be described either in real time or in the Fourier domain. In one aspect of the present invention the solution to the field equations will be performed in the Fourier domain. In order to smooth the transition in going from the static to the dynamic description, a calculation scheme is provided that generates the usual characteristic parameters (R,C,L,G) that now become dependent on the operation frequency ω. In the Fourier domain the potential description becomes for the selected gauge:

$$\nabla \cdot (\epsilon \nabla V) = -\rho \quad (36)$$

$$\frac{1}{\mu_0} \nabla \times (\nabla \times A) - \gamma \nabla \chi = J - j\omega\epsilon \nabla V + \epsilon\omega^2 A + \epsilon\omega^2 \nabla \chi \quad (37)$$

$$\nabla \cdot A + \nabla^2 \chi = 0 \quad (38)$$

Solution Scheme

Analogous to the time-dependent analysis of devices, the interconnect system is treated as a multi-port device with a number of 'stand-by' operation conditions at the terminals. In particular, these conditions can be imposed as constant voltage biases or as constant current injections. The stand-by conditions are assumed to be static and therefore, firstly, the static or lowest-order solution is found. The frequency dependent solution is then obtained by superposition of the input signals and the stand-by conditions. Since the magnetic field part plays an essential role in the high-frequency analysis, the magnetic field is preferably included from the start such that the appropriate distribution of electric and magnetic energy is present in the lowest order solution. Starting with the equations 36–38, let ω→0. This static solution ($V_0, A_0$) will correspond to the stand-by conditions. Starting with the static solution, the different independent variables $\xi(=A, V, \chi, \rho, n, p)$ may be rewritten as a static part (with subscript index $_0$) and a non-static part, denoted with a superscript hat ^ i.e. $\xi = \xi_0 + \hat{\xi}e^{j\omega t}$. Performing a Taylor series expansion and keeping only the linear terms, the result is a linearized system that can be solved to give the next order solution for the charge and current distributions.

Static Approach

The electrostatic field, $V_0$, is obtained by solving the Poisson equation $$\nabla \cdot (\epsilon \nabla V_0) = -\rho(V_0) \quad (39)$$

and the corresponding charge distribution $\rho(V_0)$ must be calculated self-consistently for (a) bounded surface charges on the boundary surfaces of the dielectric regions taking into account the appropriate boundary conditions, (b) free surface charges on the boundaries of a conductor and (c) space charge in the doped semiconductor volume. The current density $J_0$, gives rise to the vector potential $A_0$, being the solution of $$\frac{1}{\mu} \nabla \times (\nabla \times A_0) - \gamma \nabla \chi_0 = J_0(V_0) \quad (40)$$

and submitted to the gauge condition $$\nabla \cdot A_0 + \nabla^2 \chi_0 = 0. \quad (41)$$

For conducting media the latter equation is supplemented by $$\nabla \cdot J_0 = 0 \quad (42)$$

$$J_0 - \sigma E_0 = 0 \quad (43)$$

$$E_0 + \nabla V = 0 \quad (44)$$

whereas in the semiconducting regions the following equations apply:

$$\rho_0 = q(p_0 - n_0 + N_D - N_A) \quad (45)$$

$$J_{n0} = q\mu_n n_0 E_0 + kT\mu_n \nabla n_0 \quad (46)$$

$$J_{p0} = q\mu_p p_0 E_0 - kT\mu_p \nabla p_0 \quad (47)$$

$$\nabla J_{n0} = U(n_0, p_0) \quad (48)$$

$$\nabla J_{p0} = -U(n_0, p_0) \quad (49)$$

Linearization

In order to extract the RCLG parameters of some interconnect sub-structure, its response to a small harmonic perturbation around a given bias operating point is considered. The bias operation point is a solution of the static set of equations. The equations that determine the amplitudes and phases of the harmonic perturbations are obtained by linear perturbation of the full system. Returning to equations 36–38:

$$\nabla \cdot (\epsilon \nabla \hat{V}) - \hat{\rho} = 0 \quad (50)$$

$$\frac{1}{\mu} \nabla \times (\nabla \times \hat{A}) - \gamma \nabla \hat{\chi} - \hat{J} + j\omega\epsilon \nabla \hat{V} - \epsilon\omega^2 \hat{A} - \epsilon\omega^2 \nabla \hat{\chi} = 0 \quad (51)$$

$$\nabla \cdot \hat{A} + \nabla^2 \hat{\chi} = 0 \quad (52)$$

where the sources $\hat{J}$ and $\hat{\rho}$ must be determined by the constitutive equations. For metals, the following equations are appropriate:

$$\nabla \cdot \hat{J} + j\omega\hat{\rho} = 0 \quad (53)$$

$$\hat{J} - \sigma\hat{E} = 0 \quad (54)$$

$$\hat{E} + \nabla \hat{V} + j\omega\hat{A} + j\omega\hat{\chi} = 0 \quad (55)$$

For semiconductors:

$$\hat{\rho} - q\hat{p} + q\hat{n} = 0 \quad (56)$$

$$\hat{E} + \nabla \hat{V} + j\omega\hat{A} + j\omega\nabla\hat{\chi} = 0 \quad (57)$$

$$\hat{J}_n - q\mu_n E_0 \hat{n} - q\mu_n n_0 \hat{E} + kT\mu_n \nabla\hat{n} = 0 \quad (58)$$

$$\hat{J}_p - q\mu_p E_0 \hat{p} - q\mu_p p_0 \hat{E} - kT\mu_p \nabla\hat{p} = 0 \quad (59)$$

$$\nabla \cdot \hat{J}_n - jq\omega\hat{n} - \frac{\partial U}{\partial n}\bigg|_0 \hat{n} - \frac{\partial U}{\partial p}\bigg|_0 \hat{p} = 0 \quad (60)$$

$$\nabla \cdot \hat{J}_p - jq\omega\hat{p} + \frac{\partial U}{\partial n}\bigg|_0 \hat{n} + \frac{\partial U}{\partial p}\bigg|_0 \hat{p} = 0 \quad (61)$$

Figure 2:
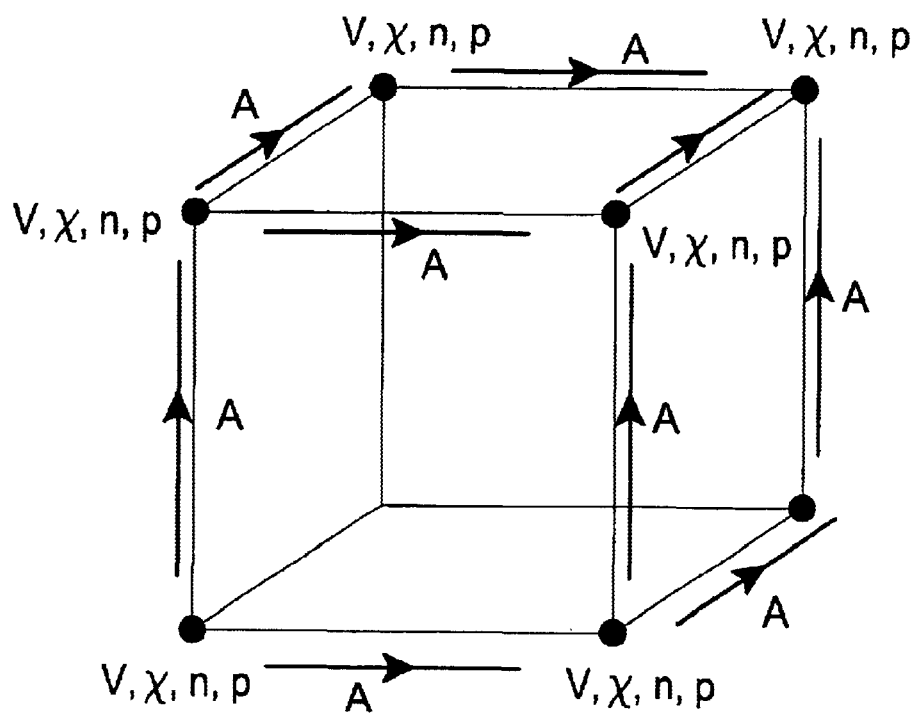
FIG. 2 shows placement of field variables to be solved on a Cartesian grid in accordance with an embodiment of the present invention.

Here, the electric field dependence of U has been suppressed but this can easily be taken into account. The equations describe the deviation of the system from the static solution, using the potential fields V and A, the gauge transformation field $\chi$ and the densities n en p, as independent variables, as is illustrated in FIG. 2.

Discretization Scheme

Because of the specific geometry of the problem, the set of equations is discretized on a regular Cartesian grid having N nodes in each direction. The total number of nodes in D dimensions is $M_{nodes} = N^D$. To each node may be associated D links along the positive directions, and therefore the grid has roughly $D N^D$ links. This is 'roughly' because nodes at side walls will have less contributions. In fact, there are 2 D sides with each a number of $N^{(D-1)}$ nodes. Half the fraction of side nodes will not contribute a link in the positive direction. Therefore, the precise number of links in the lattice is $M_{links} = D N^D (1 - 1/N)$.

As far as the description of the electromagnetic field is concerned, the counting of unknowns for the full lattice results in $M_{links}$ variables ($A_{ij}$) for the links, and $M_{nodes}$ variables ($V_i$) for the nodes. Since each link (or node) gives rise to one equation, the naive counting is consistent. However, the gauge condition has not yet implemented. The regular Coulomb gauge $\nabla \cdot A = 0$, constrains the link degrees of freedom and therefore not all link fields are independent. There are $3N^3(1-1/N)$ link variables and $3N^3(1-1/N)+N^3$ equations, including the constraints. As a consequence, at first sight it seems that one is confronted with an overdetermined system of equations, since each node provides an extra equation for A. However, the translation of the Maxwell-Ampère equation on the lattice leads to a singular matrix, i.e. not all rows are independent. The rank of the corresponding matrix is $3N^3(1-1/N)$, whereas there are $3N^3(1-1/N)+N^3$ rows and $3N^3(1-1/N)$ columns. Such a situation is highly inconvenient for solving non-linear systems of equations. This arises because the source terms are themselves dependent on the fields. The application of the Newton-Raphson method requires that the matrices in the Newton equation be non-singular and square. In accordance with an aspect of the present invention, the non-singular and square form of the Newton matrix can be recovered by introducing the more general gauge $\nabla \cdot A + \nabla^2 \chi = 0$, where an additional field $\chi$, i.e. one unknown per node, is included. Then the number of unknowns and the number of equations match again. In the continuum limit ($N \to \infty$), the field $\chi$ and one component of A can be eliminated. However, on a discrete finite lattice the auxiliary field is essential for numerical stability. It may be concluded that the specific gauge only serves as a tool to obtain a consistent discretization scheme.

It should be emphasized that the inclusion of the gauge-fixing field $\chi$ should not lead to unphysical currents. As a consequence, the $\chi$-field should be a solution of $\nabla \chi = 0$.

To summarize: instead of solving the static problem $$\nabla \times (\nabla \times A) = \mu_0 J(A)$$

$$\nabla A = 0 \tag{62}$$

the following system of equations is solved:

$$\nabla \times (\nabla \times A) - \gamma \nabla \chi = \mu_0 J(A)$$

$$\nabla A + \nabla^2 \chi = 0 \tag{63}$$

The implementation of the gauge condition results in a unique solution and simultaneously arrives at a system containing the same number of equations and variables. Hence a square Newton-Raphson matrix is guaranteed while solving the full set of non-linear equations.

Differential Operators in Cartesian Grids

The div-operator integrated over a test volume $\Delta V_i$ surrounding a node i can be discretized as a combination of 6 neighboring links.

$$\int_{\Delta V_i} \nabla \cdot A \, dv = \int_{\partial(\Delta V_i)} A \cdot dS \sim \sum_{k}^{6} S_{ik} A_{ik} \tag{64}$$

The symbol $\sim$ represents the conversion to the grid formulation.

The grad-operator for a link ij can be discretized as a combination of 2 neighboring nodes. Integrating over a surface $S_{ij}$ perpendicular to the link ij gives $$\int_{\Delta S_{ij}} \nabla V \cdot dS \sim \frac{V_j - V_i}{h_{ij}} S_{ij} \tag{65}$$

The grad operator for a link ij integrated along the link ij is given by:

$$\int_{\Delta L_{ij}} \nabla V \cdot dl \sim V_j - V_i \tag{66}$$

Figure 3:
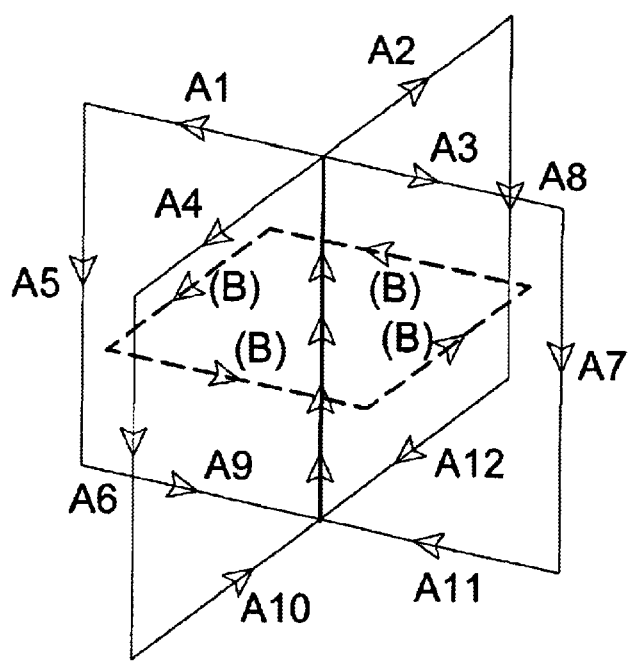
FIG. 3. shows the assembly of the curl—curl-operator using 12 contributions of neighboring links in accordance with an embodiment of the present invention.

The curl—curl operator can be discretized for a link ij as a combination of 12 neighboring links and the link ij itself. As indicated in FIG. 3, the field in the dual mesh, can be constructed by taking the line integral of the vector potential for the four 'wings'. Integration over a surface $S_{ij}$ perpendicular to the link ij gives $$\frac{1}{\mu_0} \int_{\Delta S_{ij}} \nabla \times \nabla \times A \cdot dS = \frac{1}{\mu_0} \int_{\partial(\Delta S_{ij})} \nabla \times A \cdot dl \tag{67}$$

$$= \frac{1}{\mu_0} \int_{\partial(\Delta S_{ij})} B \cdot dl$$

$$\sim \frac{\Lambda_{ij}}{\mu_0} A_{ij} + \sum_{kl}^{12} \frac{\Lambda_{ij}^{kl}}{\mu_0} A_{kl}$$

Figure 4:
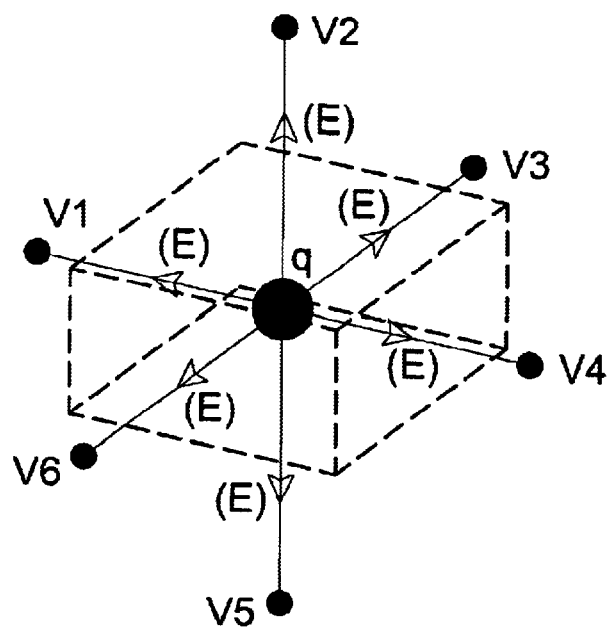
FIG. 4 shows the assembly of the div-grad-operator using 6 contributions of neighboring nodes in accordance with an embodiment of the present invention.

The div-grad-operator can be discretized (FIG. 4) integrated over a test volume $\Delta V_i$ surrounding a node i as a combination of 6 neighboring nodes and the node i itself.

$$\int_{\Delta V_i} \nabla \cdot (\epsilon \nabla V) dv = \int_{\partial(\Delta V_i)} \epsilon \nabla V \cdot dS \sim \sum_{k}^{6} S_{ik} \epsilon_{ik} \frac{V_k - V_i}{h_{ik}} \tag{68}$$

Discretized Equations

The fields (V, A, $\chi$) need to be solved throughout the simulation domain, i.e. for a semiconductor device: conductors, semiconducting regions, dielectric regions. The discretization of these equations by means of the box/surface-integration method gives $$\int_{\Delta S} (\nabla \times \nabla \times A - \gamma \nabla \chi - \mu_0 J + j\mu_0 \epsilon \omega \nabla V - \mu_0 \epsilon \omega^2 [A + \nabla \chi]) \cdot \tag{69}$$
$$dS = 0$$

$$\int_{\nabla S} (\nabla \cdot (\epsilon \nabla V) - \rho) \cdot dv = 0 \tag{70}$$

$$\int_{\nabla S} (\nabla \cdot J + j\omega \rho) \cdot dv = 0 \tag{71}$$

$$\int_{\nabla S} (\nabla \cdot A + \nabla^2 \chi) \cdot dv = 0 \tag{72}$$

leading for the independent variables A, V, $\chi$ to $$(\Lambda_{ij} - \mu_0 \epsilon_{ij} \omega^2) A_{ij} + \sum_{kl}^{12} \Lambda_{ij}^{kl} A_{kl} - \mu_0 S_{ij} J_{ij} + \tag{73}$$

$$j\mu_0 \omega \epsilon_{ij} S_{ij} \frac{V_j - V_i}{h_{ij}} - (\gamma + \mu_0 \epsilon_{ij} \varpi^2) S_{ij} \frac{\chi_j - \chi_i}{h_{ij}} = 0$$

-continued $$\sum_{k}^{6} S_{ik}\epsilon_{ik} \frac{V_k - V_i}{h_{ik}} - Q_i = 0 \tag{74}$$

$$\sum_{k}^{6} S_{ik} J_{ik} + j\omega Q_i = 0 \tag{75}$$

$$\sum_{k}^{6} S_{ik}\left(A_{ik} + \frac{\chi_k - \chi_i}{h_{ik}}\right) = 0 \tag{76}$$

Depending on the region under consideration, the source terms $(Q_i, J_{ij})$ differ.

In a conductor Ohm's law, $J=\sigma E$ applies, or integrated along a link ij:

$$J_{ij} = -\sigma_{ij}\left(\frac{V_j - V_i}{h_{ij}} + j\omega\omega_{ij} + j\omega \frac{\chi_j - \chi_i}{h_{ij}}\right) \tag{77}$$

and $Q_i$ is determined by charge conservation.

For the semiconductor environment the Scharfetter-Gummel scheme can be followed [D. L. Scharfetter, H. K. Gummel, Large scale analysis of a silicon Read diode oscillator, *IEEE Trans. Elec. Devices*, ED, 16, 64–77, 1969]. In this approach, the diffusion equations:

$$J = q\mu cE \pm kT\mu\nabla c \tag{78}$$

with a plus (minus) sign for negative (positive) particles are considered. It is assumed that the current J and vector potential A are constant along a link and that the potential V and the gauge transformation $\chi$ are linearly varying along the link. A local coordinate axis u, is considered with u=0 corresponding with node i, and u=$h_{ij}$ corresponding to node j. Integrating the equation along the link ij gives:

$$J_{ij} = q\mu_{ij}c\left(\frac{V_i - V_j}{h_{ij}} + j\omega\left(\frac{\chi_i - \chi_j}{h_{ij}}\right) - j\omega A_{ij}\right) \pm kT\mu_{ij}\frac{dc}{du} \tag{79}$$

a first-order differential equation in c, that is solved using the aforementioned boundary conditions, provides a non-linear carrier profile. The current $J_{ij}$ can be rewritten as $$\frac{J_{ij}}{\mu_{ij}} = -\frac{\alpha}{h_{ij}}B\left(\frac{-\beta_{ij}}{\alpha}\right)c_i + \frac{\alpha}{h_{ij}}B\left(\frac{\beta_{ij}}{\alpha}\right)c_j \tag{80}$$

using the Bernoulli function $$B(x) = \frac{x}{e^x - 1} \tag{81}$$

and $$\alpha = \pm kT \tag{82}$$

$$\beta_{ij} = q[V_i - V_j + j\omega(\chi_i - \chi_j) - j\omega A_{ij} h_{ij}] \tag{83}$$

The full set of equations that need to be solved is $$-\int_{\Delta V} [\nabla \cdot J_n - qj\omega n - U(n, p)]dv = 0 \tag{84}$$

$$\int_{\nabla V} [\nabla \cdot J_p + qj\omega p + U(n, p)]dv = 0 \tag{85}$$

that become after discretization $$-\sum_{j}^{6} S_{ij}J_{nij} + qj\omega n_i \Delta V_i - U(n_i, p_i)\Delta V_i = 0 \tag{86}$$

$$\sum_{j}^{6} S_{ij}J_{pij} + qj\omega p_i \Delta V_i + U(n_i, p_i)\Delta V_i = 0 \tag{87}$$

where all $J_{ij}$'s are explicitly given as a function of $A_{ij}$, V, $\chi$, n and p.

Boundary Conditions

The simulation domain consists of an interconnect (sub-) system possibly extended with a region of air surrounding it. Therefore, a distinction has to be made between boundary conditions for the simulation domain and boundary conditions for the device. For the latter, it is clear that the electric potential V is defined on the metal terminals provided that voltage boundary conditions are used. The boundary conditions for simulation domain are more subtle.

Figure 5A:
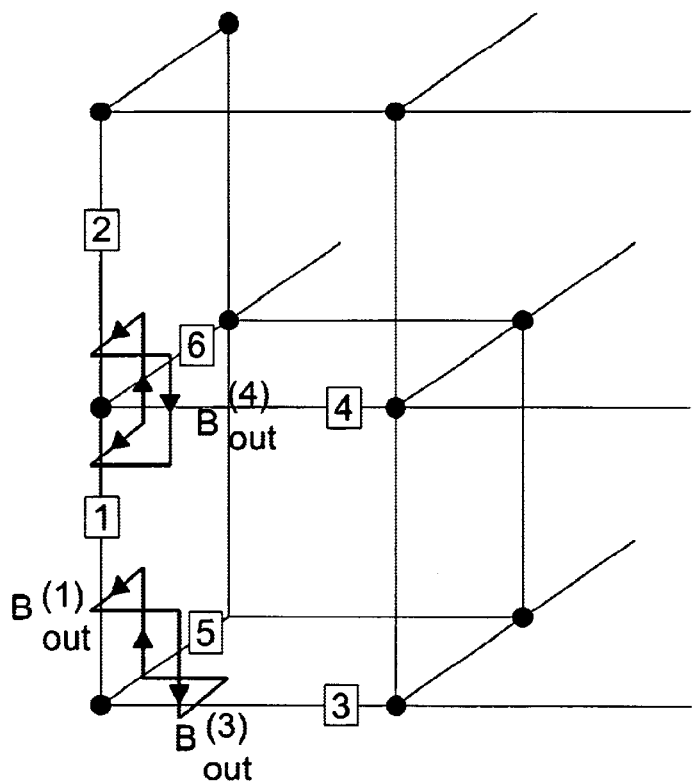
FIGS. 5a and 5b sows how the boundary conditions of the B-field outside the simulation domain is determined in accordance with an embodiment of the present invention.
Figure 5B:
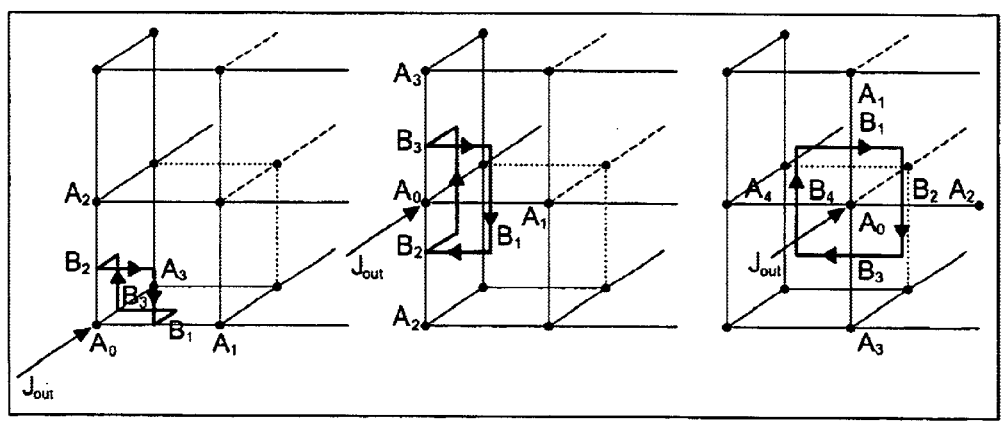

The vector potential A, needs a specific approach. It can easily be seen that just solving equation 40 is not possible. Indeed, the left-hand side of the equation is divergence-less, whereas the right hand side has a non-vanishing divergence on the terminals, where current is entering or leaving the structure. In order to solve this paradox, the analogous situation of a continuity equation is considered. In the latter case, the paradox is lifted by explicitly including the external current into the balance equation. For the curl—curl equation it is necessary to explicitly keep track of the external B-field, i.e. by assigning to every link at the surface of the simulation domain, a variable $B_{out}$. At edges of the domain this field replaces two missing 'wings' of the curl—curl operator, whereas at the other links of the domain surface the B-field stands for one missing 'wing' (FIGS. 5a, b). The magnetic field outside the simulation region $B_{out}$ must be consistent with the external current distribution $J_{out}$ over the surface of the simulation domain. Moreover, if it is assumed that $B_{out}$ is fully generated by the currents that are present in the simulation problem and no external magnets are nearby a unique solution to equation 40 should be obtained. For this purpose, an external $B_{out}$ perpendicular to that link is associated with the link. Applying Ampère's law for contours as indicated in FIGS. 5a, b, the line-integral along the contour equals the total current crossing it, i.e. for each node $$\frac{1}{\mu_0}\oint_{\partial(\Delta A_i)} B_{out} \cdot dl = \int_{\partial(\Delta A_i)} J_{out} \cdot dS = I_i \tag{88}$$

Furthermore, the magnetic field must be constructed in such a way that its divergence vanishes. For each plaquette on the simulation boundary it implies that $$\nabla \cdot B_{out} = 0 \tag{89}$$

As indicated in the case study, assembling the different matrices gives:

$$\nabla \cdot B_{out} = I_0 \tag{90}$$

$$\nabla \times B_{out} = 0 \tag{91}$$

where the differential operators are acting on the link variables $B_{out}$ and act on the two-dimensional boundary of the simulation domain. It should be noted that a Maxwell problem in two dimensions can be converted into a Laplace/Poisson problem, since the vector potential has only one component. As a consequence, in order to solve the external field problem use can be made of the methods that were developed for transmission lines. Note that the number of outside links of a regular grid with N points in each direction, is given by $M_{links}^{out}=12\ (N-1)^2$, whereas the number of nodes is given by $M_{nodes}^{out}=6\ N^2-12\ N+8$ and the number of surfaces is given by $M_{faces}^{out}=6\ (N-1)^2$. This leaves $M_{nodes}^{out}+M_{faces}^{out}$ equations and two more ($M_{links}^{out}$) unknowns. However, the outside surface is closed and hence expressing the solenoidal character of $B_{out}$ implies one redundant equation. On the other hand, expressing Ampère's law for closed paths, will result in another redundant equation, and hence a unique solution for $B_{out}$ is obtained.

For $\chi$ it is clear from comparing equation 62 with 63 that $\nabla\chi$ must vanish. This leaves one extra degree of freedom, so that the value of $\chi$ can be chosen as equal to 0 in one point. With this choice, the values of $\chi$ for the other points are considered as dynamical variables, but will result in $\chi=0$ everywhere.

Case Studies

In order to be able to construct the differential operator matrices, a choice must be made for the numbering of nodes, edges, surfaces and volumes. A straightforward node numbering is chosen. The numbering starts at the corner of the box with the lowest x, y and z indices, following its neighbor nodes along the x-axis, then jumping back to the lowest x index, incrementing the y-value, and finally when the first plane is numbered, z is incremented.

For edges, surfaces and volumes, the number associated with each number is given by the number of the node with the smallest node index. Furthermore, $S_{ij}$ is set to 1, and $h_{ij}$ is set to 1, in the following examples.

2×2×2 Cube

Figure 6:
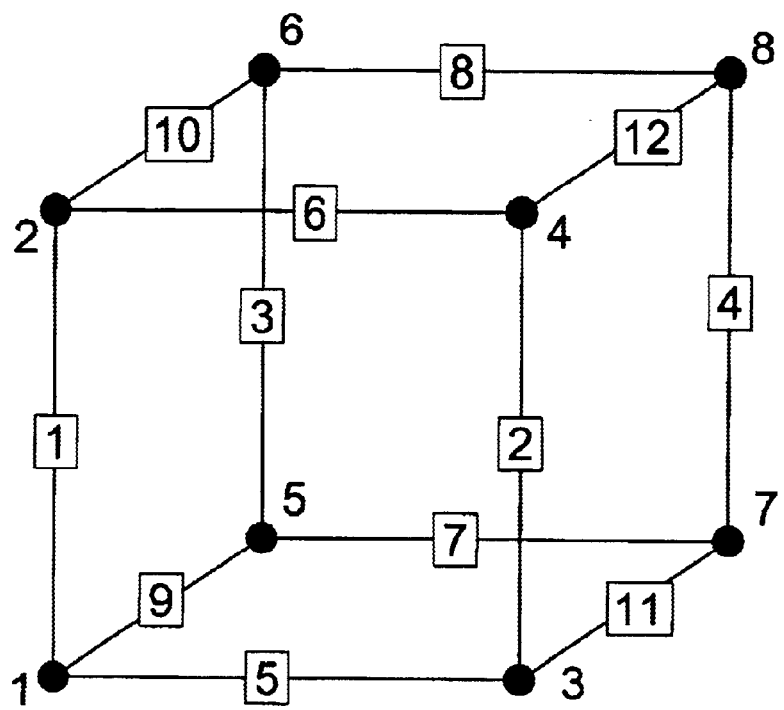
FIG. 6 shows the numbering applied in a 2×2×2 cube case in accordance with an embodiment of the present invention.

A simple 8 node cube is shown in FIG. 6, where node 1 is at potential V=1 and node 8 is at potential V=0. The following matrices representing the differential operators can be written as $$\nabla \to \begin{pmatrix} 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \\ 1 & 0 & -1 & 0 & 0 & 0 & 0 & 0 \\ 0 & 1 & 0 & -1 & 0 & 0 & 0 & 0 \\ 0 & 0 & 0 & 0 & 1 & 0 & -1 & 0 \\ 0 & 0 & 0 & 0 & 0 & 1 & 0 & -1 \\ 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \end{pmatrix}$$

$$\nabla\times\nabla\times \to \begin{pmatrix} 2 & -1 & -1 & 0 & -1 & 1 & 0 & 0 & -1 & 1 & 0 & 0 \\ -1 & 2 & 0 & -1 & 1 & -1 & 0 & 0 & 0 & 0 & -1 & 1 \\ -1 & 0 & 2 & -1 & 0 & 0 & -1 & 1 & 1 & -1 & 0 & 0 \\ 0 & -1 & -1 & 2 & 0 & 0 & 1 & -1 & 0 & 0 & 1 & -1 \\ -1 & 1 & 0 & 0 & 2 & -1 & -1 & 0 & -1 & 0 & 1 & 0 \\ 1 & -1 & 0 & 0 & -1 & 2 & 0 & -1 & 0 & -1 & 0 & 1 \\ 0 & 0 & -1 & 1 & -1 & 0 & 2 & -1 & 1 & 0 & -1 & 0 \\ 0 & 0 & 1 & -1 & 0 & -1 & -1 & 2 & 0 & 1 & 0 & -1 \\ -1 & 0 & 1 & 0 & -1 & 0 & 1 & 0 & 2 & -1 & -1 & 0 \\ 1 & 0 & -1 & 0 & 0 & -1 & 0 & 1 & -1 & 2 & 0 & -1 \\ 0 & -1 & 0 & 1 & 1 & 0 & -1 & 0 & -1 & 0 & 2 & -1 \\ 0 & 1 & 0 & -1 & 0 & 1 & 0 & -1 & 0 & -1 & -1 & 2 \end{pmatrix}$$

$$\nabla\cdot\nabla \to \begin{pmatrix} 3 & -1 & -1 & 0 & -1 & 0 & 0 & 0 \\ -1 & 3 & 0 & -1 & 0 & -1 & 0 & 0 \\ -1 & 0 & 3 & -1 & 0 & 0 & -1 & 0 \\ 0 & -1 & -1 & 3 & 0 & 0 & 0 & -1 \\ -1 & 0 & 0 & 0 & 3 & -1 & -1 & 0 \\ 0 & -1 & 0 & 0 & -1 & 3 & 0 & -1 \\ 0 & 0 & -1 & 0 & -1 & 0 & 3 & -1 \\ 0 & 0 & 0 & -1 & 0 & -1 & -1 & 3 \end{pmatrix}$$

$$\nabla \rightarrow \begin{pmatrix} -1 & 0 & 0 & 0 & -1 & 0 & 0 & 0 & -1 & 0 & 0 & 0 \\ 1 & 0 & 0 & 0 & 0 & -1 & 0 & 0 & 0 & -1 & 0 & 0 \\ 0 & -1 & 0 & 0 & 1 & 0 & 0 & 0 & 0 & 0 & -1 & 0 \\ 0 & 1 & 0 & 0 & 0 & 1 & 0 & 0 & 0 & 0 & 0 & -1 \\ 0 & 0 & -1 & 0 & 0 & 0 & -1 & 0 & 1 & 0 & 0 & 0 \\ 0 & 0 & 1 & 0 & 0 & 0 & 0 & -1 & 0 & 1 & 0 & 0 \\ 0 & 0 & 0 & -1 & 0 & 0 & 1 & 0 & 0 & 0 & 1 & 0 \\ 0 & 0 & 0 & 1 & 0 & 0 & 0 & 1 & 0 & 0 & 0 & 1 \end{pmatrix}$$

Note that the diagonal elements of the curl—curl-operator, have the value 2, because from the 4 'wings' of FIG. 3, only 2 remain (the two other are outside the simulation domain). The current can be found by solving equations 42–44. In order to find expressions for $B_{out}$, Ampère's equation is used for the contour integrals for $B_{out}$. For node 1 for instance the result is that $B_{out}^{(1)} + B_{out}^{(5)} + B_{out}^{(9)} = 1^{(1)}$. The same kind of equations for all nodes gives formally $\nabla \cdot B_{out} = 1$. Gauss' law for the outside magnetic field becomes for the front surface of the cube in FIG. 6, $B_{out}^{(1)} - B_{out}^{(2)} - B_{out}^{(5)} + B_{out}^{(6)} = 0$ or formally for all surfaces: $\nabla \times B_{out} = 0$. This system of equations results in a unique solution for $B_{out}$.

16×16×2 Cube

Figure 7:
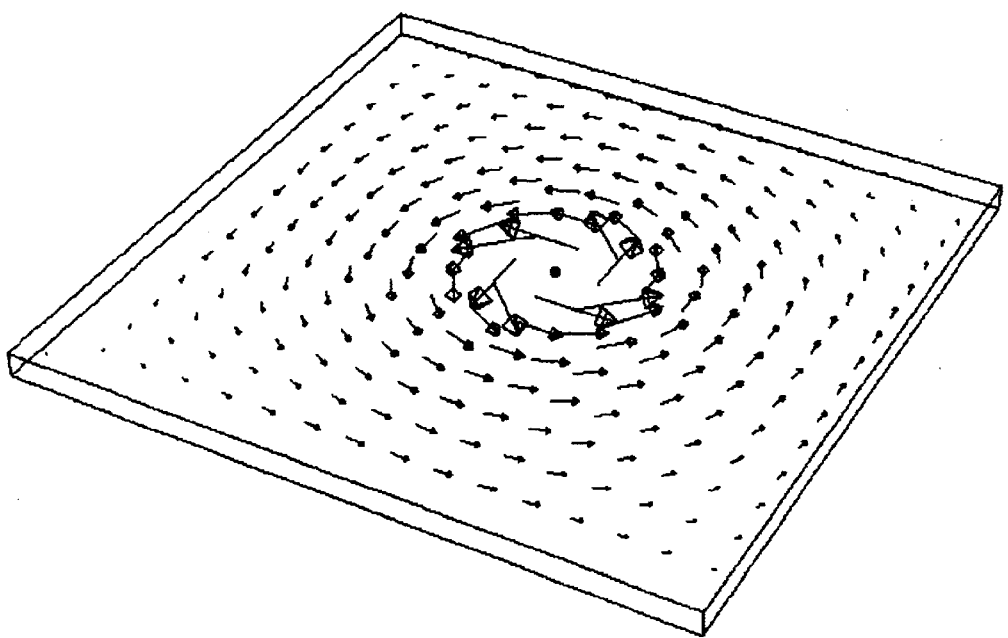
FIG. 7 shows the B-field of a current on a wire.
Figure 8:
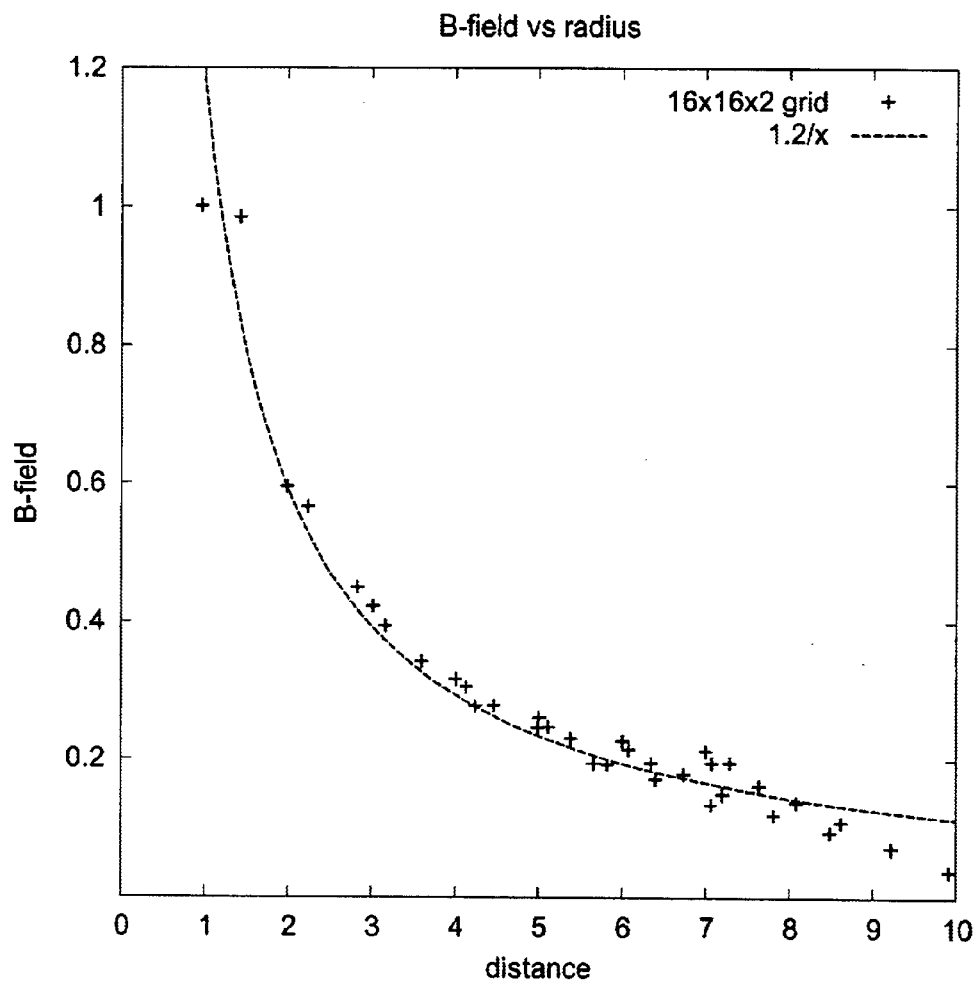
FIG. 8 shows a magnetic field around a straight conductor, as calculated numerically (+) in accordance with an embodiment of the present invention, compared with the exact (−) algebraic solution.

In order to check the physical consequences of the way the method deals with boundary conditions, a 16×16×2-node cube is simulated in which a conductor box of one volume element is implemented. At four nodes at one side of the conductor the voltage V=1 is applied, while at the other side the voltage is kept V=0. Hence a current will flow, characterized by the solution of equations 42–44 in the conducting area. This solution of $J_0$ determines $J_{out}$ and $B_{out}$ can be found as a solution of equations 90–91. Next it is possible to calculate the magnetic vector potential in the simulation domain by solving equation 40 (FIG. 7). The magnetic field in the simulation domain which is expected to change as 1/r, (r representing the distance to the conductor center). A good correspondence with the theory is recovered as shown in FIG. 8.

The skilled person will appreciate certain aspects of the above embodiments of the present invention. A method is provided for the description and the analysis of the electromagnetic behavior of on-chip interconnect structures, by using small-signal analysis. This avoids solving Helmholtz equations and still gives us information on the structure to describe effects like the current redistributions, the impact of high frequencies on the characteristic parameters, slow wave modes etc. A formulation of the Maxwell equations is used that is based on a potential approach. Furthermore, the potential fields are assigned to links. This approach has severe consequences for solving the field equations, which are resolved by the method in accordance with the present invention. In order to solve the Maxwell equations a square and non-singular Newton-Raphson matrix is needed, and such matrices are provided by including an extra dummy potential field $\chi$. This field however will not change the physical solution. In fact, a dedicated gauge fixing procedure has been presented to accommodate for the numerical stability. The magnetic vector potential is calculated by solving a curl—curl operator equation. This task has been carried out in a box-like example of a current carrying wire. The simulated magnetic field shows the behavior of a magnetic field generated by a wire and demonstrates the consistency and correctness of the proposed method.

Another interesting result concerns the boundary conditions. The inclusion of the latter is dictated by the conversion of the continuum equations to the discretized equations. Consistency of the boundary conditions demands that a separate Maxwell problem be solved in a domain of dimension D−1=2.

Figure 9:
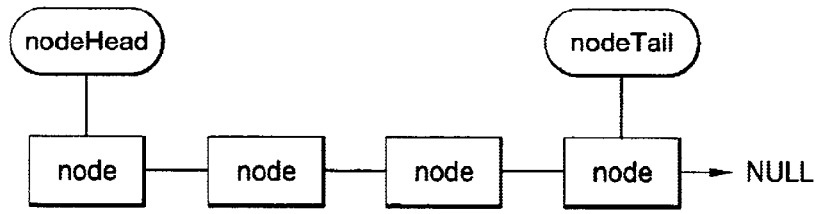
FIG. 9 shows how the node pointers are arranged logically in a data structure according to an embodiment of the present invention.

One aspect of the present invention is the efficient use of memory space. In accordance with an embodiment of the present invention data structures are created in a memory of a computer system which are closely associated with the numerical analysis methods described above. One possible implementation of such data structures is given below. The data structures are a representation of a mesh having links connecting nodes in a mesh structure. The implementation is based on a mesh formed by cubes but the present invention is not limited to cubes. The implementation makes use of pointers however the present invention is not limited to pointer based systems but may include any method of referring to other memory locations.

node (see FIG. 9)

This structure is used to stock nodes in a list.

```
struct node
{
    double x;
    double y;
    double z;
    struct node *next;
    unsigned int nPointers;
    unsigned int number;
};
```

All properties of the nodes (x, y, z, . . . ) are stored in this structure. The properties can be: V, the Poisson potential, $\rho$ the charge density, N the dopant concentration, n and p the electron and hole concentration, T the temperature and $\chi$ the dummy field. In accordance with an aspect of the present invention the zero-forms and three-forms are associated with the nodes of the mesh. The nodes are internally placed in a linked list, where each node points to the next node and the last node points to NULL.

Figure 10:
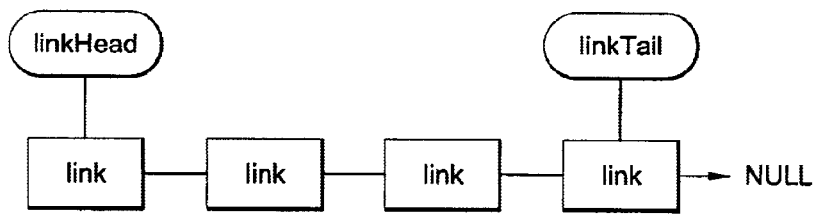
FIG. 10 shows how the link pointers are arranged logically in a data structure according to an embodiment of the present invention.

| | Fields |
|---|---|
| x | Position on the X-axis. |
| y | Position on the Y-axis. |
| z | Position on the Z-axis. |
| next | Pointer to the next node in the list. |
| nPointers | Number of cubes that point to this node. |
| number | The nodenumber. | link (FIG. 10)

This structure is used to stock links in a list.

```
struct link
{
    struct node *node1;
    struct node *node2;      //Pointer to node2
    struct link *link1;      //Pointer to child link1
    struct link *link2;      //Pointer to child link2
    struct link *next;       //Pointer to next link
    unsigned int nPointers;  //Number of cubes that point to this link.
    Unsigned int number;
};
```

All properties of the links are stored in this structure. In particular values for those elements of the fields such as the vector potential A which are associated with links are stored in this structure. The properties can be: A the magnetic vector potential, J, the current density (carrier density in semiconductor substrates), E the electric field. The links are identified by 2 nodes. In accordance with an aspect of the present invention, the one-forms are associated with the links. The links are internally placed in a linked list, where each link points to the next link and the last link points to NULL. A link can have 2 childLinks. The pointers link1 and link2 point to these children. If these pointers are NULL, the link doesn't have any children.

Figure 11:
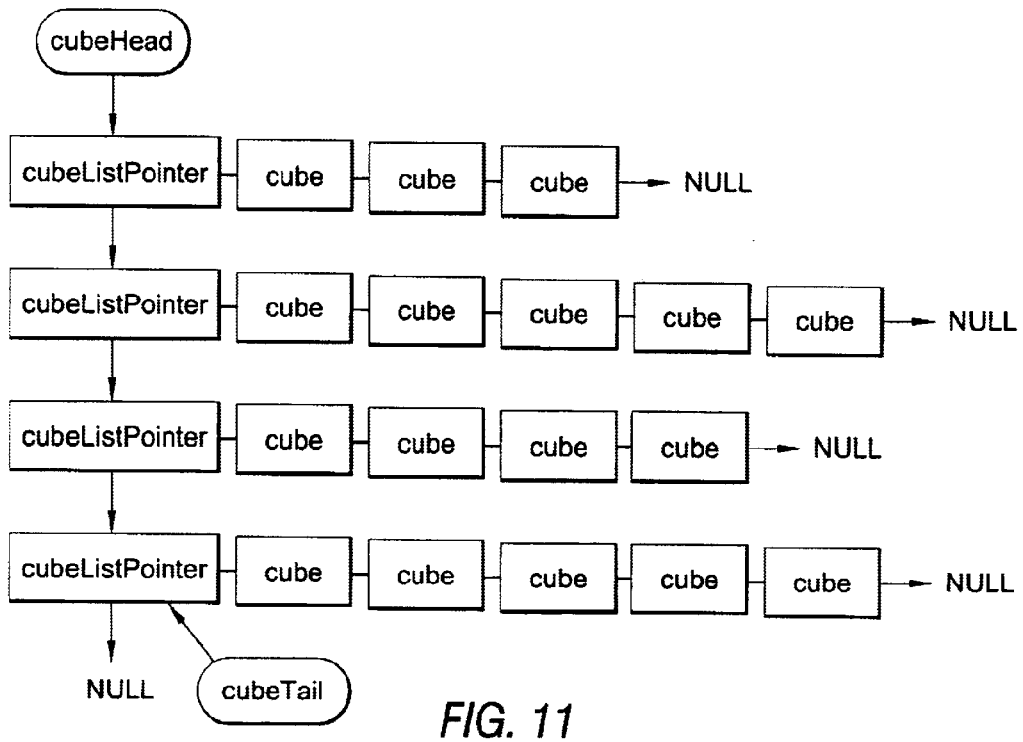
FIG. 11 shows how the cube pointers are arranged logically in a data structure according to an embodiment of the present invention.

| | Fields |
|---|---|
| node1 | Pointer to the first node of a link. |
| node2 | Pointer to the second node of a link. |
| link1 | Pointer to the first of the childLinks. |
| link2 | Pointer to the second of the childLinks. |
| next | Pointer to the next node in the list. |
| nPointers | Number of cubes that point to this link. |
| number | The linknumber. | cube (see FIG. 11)

This structure is used to stock cubes in a list.

```
struct cube
{
    unsigned int number;
    struct cube *cube[8];
    struct node *node[8];
    struct link *link[12];
    struct cube *next;
    struct cube *parent;
};
```

The links are identified by number. This is the number of the cube. Internally, the cubes are organized in several linked lists. All cubes with the same generation are stored in the same linked list.

| | Fields |
|---|---|
| number | The cubenumber. |
| cube [8] | An array of 8 pointers to childCubes. Either a cube has eight childs, or it has none. If the pointers are set to NULL, the cube doesn't have childs. |
| node [8] | An array of 8 pointers to the nodes of a cube. Every cube has 8 nodes, to identify it's boundaries. |

| | Fields |
|---|---|
| link [12] | An array of pointers to the 12 main links of a cube. Since links can have 2 children, a cube can have more than 12 indirect links. |
| next | Pointer to the next cube in the list. If it is NULL, this is the last cube in the list for this generation. |
| parent | Pointer to the parent of the cube. If the pointer is set to NULL, this is the "biggest cube", and doesn't have a parent, since it is no child. | cubeListPointer

This structure is used to point to a cubeList.

```
struct cubeListPointer
{
    cube *cube;
    struct cubeListPointer *next;
}
```

Internally, cubes are organised in several linked lists. All cubes with the same generation are stored in the same linked list. Something is required to point to all these lists. This is what a cubeListPointer does, it points to a cubeList and to the next cubeListPointer. So the first cubeListPointer points to the cubeList generation 1, the next to the list with generation 2, . . . and so on.

| | Fields |
|---|---|
| cube | A pointer to the first cube in a cubeList. If it is set to NULL, there is no list appended to the cubeListPointer yet. |
| next | A pointer to the next cubeListPointer. If it's NULL, this is the last cubeListPointer in the list. | lastNumbers

This structure is used to keep track of the last nodenumber, linknumber and cubenumber.

```
struct lastNumbers
{
    unsigned int lastNodeNr;
    unsigned int lastLinkNr;
    unsigned int lastCubeNr;
};
```

The last nodenumber, linknumber and cubenumber are stored here, so that nodes/links/cubes can easily be appended and the nodenumber/linknumber/cubenumber can be filled in.

| | Fields |
|---|---|
| lastNodeNr | The highest nodenumber at a certain moment. |
| lastLinkNr | The highest linknumber at a certain moment. |
| lastCubeNr | The highest cubenumber at a certain moment. |

The calculation method for the pointers is given below.

In the following a detailed description of practical applications of the methods of the present invention are described.

In order to extract the RCLG parameters of an interconnect sub-structure, its response to a small harmonic perturbation around a given bias operating point is considered, which is a solution of the static set of equations. The equations that determine the amplitudes and phases of the harmonic perturbations are obtained as linear perturbations of the full system. Returning to equations (36–38), one obtains $$\nabla(\epsilon \nabla V_R - \epsilon \omega A_I - \epsilon \omega \nabla \chi_I) + \rho_R = 0 \quad (92)$$

$$\nabla(\epsilon \nabla V_I - \epsilon \omega A_R - \epsilon \omega \nabla \chi_R) + \rho_I = 0 \quad (93)$$

$$\nabla \times \nabla \times A_R - \mu_0 \epsilon \omega^2 A_R - \mu_0 J_R - \mu_0 \epsilon \omega \nabla V_I - (\gamma + \mu_0 \epsilon \omega^2) \nabla \chi_R = 0 \quad (94)$$

$$\nabla \times \nabla \times A_I - \mu_0 \epsilon \omega^2 A_I - \mu_0 J_I + \mu_0 \epsilon \omega \nabla V_R - (\gamma + \mu_0 \epsilon \omega^2) \nabla \chi_I = 0 \quad (95)$$

$$\nabla^2 \chi_R + \nabla A_R = 0 \quad (96)$$

$$\nabla^2 \chi_I + \nabla A_I = 0 \quad (97)$$

where the sources $J_R$, $J_I$, $\rho_R$ and $\rho_I$ must be determined by the non-linear constitutive equations.

Boundary Conditions

Continuing the discussion on boundary conditions above, the vector potential A, needs a specific approach. It can easily be seen that just solving equation 40 is not possible. Indeed, the left hand side of the equation is $\nabla^2 \chi$, whereas the right hand side has a non-vanishing divergence on the terminals, where current is entering or leaving the structure. However, as was argued above the dummy field $\chi=0$ is part of the solution. In order to solve this paradox the analogous situation of a continuity equation is considered. In the latter case, the paradox is lifted by explicitly including the external current into the balance equation.

The external currents, impinging perpendicular on the boundary surface of the simulation domain, carry their own circular magnetic field. Such a magnetic field is described by a component of the vector potential parallel to the impinging current. Therefore the boundary condition for the vector potential will be equal to zero for all links that are in the boundary surface, $\partial \Omega$, of the simulation domain, $\Omega$, whereas links pointing orthogonally inwards from the enclosing surface are part of the set of the unknown variables that should be solve, $$A_{ij} = 0 \quad i,j \in \partial \Omega \quad (98)$$

The boundary condition for the $\chi$-field will be that $\chi=0$ at the enclosing surface. The Laplace problem on a closed surface with these boundary conditions guarantees that $\chi=0$, everywhere.

The boundary conditions for the scalar potential V are a mixture of Dirichlet and Neumann boundary conditions. At the contacts Dirichlet boundary conditions are assumed whereas at the remaining part of the enclosing surface Neumann boundary conditions are assumed. This assumption implies that no perpendicular electric field exists for these parts of $\partial \Omega$. If a contact is placed on a semi-conducting region, it is assumed that this contact is also ohmic. Therefore, the boundary condition for a semiconductor contact is $$\phi_n|_c = \phi_p|_c = V|_c \quad (99)$$

where $\phi_p$ and $\phi_n$ are the quasi-fermi level for the hole and electron concentrations at the contact. Furthermore, it is assumed that charge neutrality holds at the contact, i.e. p−n+N=0 and np=$n_i^2$. Strictly speaking, these assumptions are valid only for contacts attached to highly-doped regions, otherwise one would have to deal with Schottky contacts. However, within the framework of back-end structure simulations, this assumption is valid since the contacts to semiconducting regions usually are connected to highly-doped source or drain regions or polysilicon gates.

Interface Conditions

In general, the structures consist of insulating, semiconducting and metallic regions. As a consequence, there will be four types of interface nodes, i.e.
  insulator/metal interface nodes
  insulator/semiconductor interface nodes
  metal/semiconductor interface nodes
  insulator/semiconductor/metal 'triple' points At the metal/semiconductor interface nodes, the idealized interface Schottky contact condition is implemented, as for a boundary condition for a semiconductor region, by setting $\phi_p = \phi_n = V_{metal}$, where $V_{metal}$ is the value of the Poisson potential at the metal side of the interface. The Poisson potential at the semiconductor side of the interface is $V_{semi} = V_{metal} - \delta V$, where $\delta V$ represents the contact potential between the two materials. Using $$n = n_i \exp \frac{q}{kT}(V - \phi_p) \quad (100)$$

$$p = n_i \exp \frac{q}{kT}(\phi_p - V)$$

and applying the neutrality condition p−n−N=0, where N=$N_D$−$N_A$ for p-type semiconductor regions (N<0) results in:

$$\delta V = \log\left(-\frac{N}{2n_i}\left(1 + \sqrt{1 + \frac{4n_i^2}{N^2}}\right)\right) \quad (101)$$

and for n-type semiconductor regions (N>0)

$$\delta V = -\log\left(\frac{N}{2n_i}\left(1 + \sqrt{1 + \frac{4n_i^2}{N^2}}\right)\right) \quad (102)$$

At a metal/semiconductor interface node there is one variable ($V_{metal}$) that needs to be solved. The equation for this variable assigned to the node i is the current-continuity equation, $$\sum_j J_{ij} S_{ij} = 0 \quad (103)$$

where $J_{ij}$ is the current density in discretized form for the link (ij) from node i to node j, and $S_{ij}$ the perpendicular cross section of the link (ij). Note that for an idealized Schottky contact the Poisson potential is double-valued.

At metal/insulator interface nodes continuity of the Poisson potential is assumed. For these nodes there is, apart from the variables A and $\chi$, one unknown $V_i$, and the corresponding equation is the current-continuity equation. The Poisson equation determines the interface charge, $\rho_i$ and can be obtained by post-processing, once V is determined.

At insulator/semiconductor interface nodes there are three unknowns to be determined, V, n and p. These variables are treated in the usual way as is done in device simulation tools, i.e. the Poisson equation is solved self-consistently with the current-continuity equations for n and p, while V is continuous at the insulator/semiconductor interface.

At triple point nodes, the Poisson potential is triple-valued. One arrives at different values depending on the material in which one approaches the node. For computational convenience the value of the Poisson potential in the insulator at the midpoint between $V_{metal}$ and $V_{semi}$ is taken, i.e.

$$\lim_{x \to x_{ir}} V_{insul}(x) = V_{metal}(x_{ir}) - \frac{1}{2}\delta V \quad (104)$$

The interface conditions for the vector field A and the ghost field $\chi$ are straightforward. The choice of the gauge condition, equation 38, is independent of specific material parameters. During assembling of equation 37, the current associated to each link is uniquely determined in an earlier iteration of the Gummel loop and therefore for the vector potential (as well as $\chi$) is single-valued.

Scaling Considerations

In order to program the equations on a computer, an appropriate scaling must be performed. A generalization of the 'de Mari' scaling, as described in A. de Mari, An Accurate Numerical Steady-State One Dimensional Solution of the PN-Junction, *Solid-State Electronics*, 11, 33–58, 1968 is adopted. Let $\lambda$ be the scaling parameter for lengths, $n_i$ the scaling parameter for doping and carrier concentrations and let the thermal voltage $V_T=[kT/q]$ act as a scaling parameter for the Poisson field and the fermi levels. Then from Poisson's equation one obtains that $$\lambda = \sqrt{\frac{\epsilon_0 V_T}{q n_i}} \quad (105)$$

From the constitutive equations for the carrier currents the scaling factor for the mobility, $\sigma_\mu$ is obtained:

$$\sigma_\mu = \frac{\sigma_D}{V_T} \quad (106)$$

There is still the freedom to set one scaling parameter. The scaling parameter for the diffusion constant, $\sigma_D=1$ [(m²)/sec] is fixed. Then the scaling parameter for the time, $\tau$, is given by $$\tau = \frac{\lambda^2}{\sigma_D} \quad (107)$$

Furthermore, from the scaling factor for the diffusivity the scaling factor for the current density is obtained:

$$\sigma_J = \frac{q n_i \sigma_D}{\lambda} \quad (108)$$

The frequency scaling factor is inverse to the time scaling factor, i.e. $\sigma_{107} = [1/(\tau)]$. The scaling factor for A and $\chi$ follows from the generalized formula for the electric field, $$\sigma_A = \frac{\tau V_T}{\lambda} \quad (109)$$

$$\sigma_\chi = \tau V_T$$

The scaling of the curl—curl equation for A leads to the dimensionless constant, $K=[1/(c^2)]([(\lambda)/(\tau)])^2$, where c is the speed of light in vacuum. From table I, K is a rather small number that makes it suitable for using it as a perturbation expansion parameter.

TABLE I

Generalized 'de Mari' scaling factors.

| Variable | Name | Value | Unit |
|---|---|---|---|
| Temperature | T | 300 | K |
| Poisson field | $V_T$ | $2.5852 \times 10^{-2}$ | V |
| Concentration | $n_i$ | $10^{16}$ | $m^{-3}$ |
| Length | $\lambda$ | $1.1952 \times 10^{-5}$ | m |
| Diffusion constant | $\sigma_D$ | 1 | [(m²)/sec] |
| Mobility | $\sigma_\mu$ | 38.6815 | [(m²)/V sec] |
| Current density | $\sigma_J$ | 134.0431 | [C/(m² sec)] |
| Time | $\tau$ | $1.4286 \times 10^{-10}$ | sec |
| Electric field | $\sigma_E$ | 2162.8670 | [V/m] |
| Frequency | $\sigma_\omega$ | $6.9994 \times 10^9$ | $sec^{-1}$ |
| Conductance | $\sigma_\sigma$ | $6.1974 \times 10^{-2}$ | [C/Vmsec] |
| Velocity | $\sigma_V$ | $8.3662 \times 10^4$ | [m/sec] |
| Chi-scaling | $\sigma_\chi$ | $3.6934 \times 10^{-12}$ | V sec |
| A-scaling | $\sigma_A$ | $3.0900 \times 10^{-7}$ | [V sec/m] |
| K-factor | K | $7.7879 \times 10^{-8}$ | dimensionless |

After scaling the curl—curl equation takes the following form $$\nabla \times \nabla \times \tilde{A} - \gamma \nabla \chi = K (\tilde{J} - j\epsilon_r \omega \nabla V + \epsilon_r \omega^2 A + \epsilon_r \omega^2 \nabla \chi) \quad (110)$$

The constant $\gamma$ can be used as a tuning parameter to improve convergence of the linear solvers. It should be noted that $\gamma$ may not be zero, since for $\gamma=0$, the equations for A and $\chi$ decouple such that the matrix block for A becomes singular.

Numbering Schemes

The novelty of the new approach for solving the equations for the scalar and the vector potentials is the association of the vector potential variables to the links or connections of the discretization grid. This requires that not only the grid nodes receive a unique pointer, but also the grid links. In order to become familiar with this new situation, a method for assigning unique pointers to the grid nodes and the grid links in Cartesian grids is presented.

For a Cartesian grid with $N_{node}=k_x \times k_y \times k_z$ nodes, a unique node pointer is obtained by $$L_{node}=n_x+(n_y-1) \times k_x+(n_z-1) \times k_x \times k_y \quad (111)$$

where $n=(n_x,n_y,n_z) \in IN^3$ points to a specific node in the grid and $1 \le n_x \le k_x$, $1 \le n_y \le k_y$ and $1 \le n_z \le k_z$. Given a node pointer $L_{node}$, the vector n can be reconstructed using the following algorithm

```
if (L_node = N_node) then
    n_x = k_x, n_x = k_x, n_x = k_x
else
    J_0 = INT((L_node − 1)/(k_x × k_y))
    n_z = J_0−1
    K_0 = L_node−J_0×k_x×k_y
    L_0 = INT((K_0−1)/k_x)
    n_y = L_0+1
    n_x = K_0 − L_0 × k_x
endif
```

In a similar way a unique pointer, $L_{link}$ can be assigned to each link. Given the node n and a direction i=1,2,3, a link pointer can be obtained by the following algorithm, since each link is based in some node n, and points in a given positive direction, i.

```
if (i = 1) then
    if (n_x = k_x) then illegal input
    else
        L_link = n_x + (k_x-1) × (n_y-1) + (k_x-1) × k_y × (n_z-1)
    endif
elseif (i = 2) then
    if (n_y = k_y) then illegal input
        L_link = (k_x-1) × k_y × k_z + n_x + (k_x)×(n_y-1) + k_x×(k_y-1)×(n_z-1)
    endif
elsif (i = 3) then
    if (n_z = k_z) then illegal input
    else
        L_link = 2×k_x×k_y×k_z - (k_y+k_x)×k_z + n_z + k_x×(n_y-1)+k_x×k_y×(n_z-1)
    endif
endif
```

Using the INT-function, (n,i) can be extracted from $L_{link}$, as was done for the nodes.

Solver Requirements

Since a large number of equations need to be solved simultaneously, i.e. Poisson's equation, the current-continuity equations, the curl—curl equation and the equation for $\chi$, both the static, real and imaginary parts, a Gummel iterative procedure is followed for solving this system. In particular, since the frequency, $\omega$ is fixed, the problem is still three-dimensional. Whereas the Poisson's equation and the current-continuity equations can be treated similarly as in device simulation programs such as D. L. Scharfetter, H. K. Gummel, Large Scale Analysis of a Silicon Read Diode Oscillator, *IEEE Trans. Elec. Devices*, ED, 16, 64–77, 1969 and E. M. Buturla, P. E. Cottrell, B. M. Grossman and K. A. Salsburg, Finite-Element Analysis of Semiconductor Devices: the FIELDAY program, *IBM Journal on Research and Development*, 25, 218–231, 1981, the equations for A and $\chi$ require a different handling. Furthermore, the largest system that needs to be solved is also the pair of equations for (A, $\chi$). These equations can not be loaded iteratively into the Gummel flow because the $\nabla\times\nabla\times$ operator would lead to a singular algebraic system. However, the simultaneous assembling with the equation for $\chi$, results in an algebraic system having a regular matrix that can be inverted.

After testing a number of different linear solvers with and without pre-conditioning, it turned out that the most robust method was the symmetric successive-over-relaxation (SSOR) pre-conditioner, taking $\omega_{SOR}$=1.2, combined with the conjugate-gradient squared (CGS) iterative solver. The parameter $\gamma$ in equation 110 was taken equal to one.

The memory requirements for the sparse storage of the Newton-Raphson matrix can be obtained as follows. Suppose there are $N_{node}$=$k_x \times k_y \times k_z$ nodes and $N_{link}$=$3 \times k_x \times k_y \times k_z - (k_x \times k_y + k_x \times k_z + k_y \times k_z)$ links. Each (interior) link interacts with 12 neighboring links and 2 nodes in the assembling of the curl—curl equation. This implies that a each link generates 1+12+2=15 non-zero entries in the Newton-Raphson matrix. The scalar equation for the $\chi$-variable in each node interacts with 6 $\chi$'s in the neighboring nodes and with 6 link variables sited at the links connecting the node to the nearest-neighbor points. Therefore, each $\chi$ field induces 1+6+6=13 non-zero entries in the Newton-Raphson matrix. The total number of non-zero entries can be estimated (ignoring surface subtractions) as $N_{non\_zero}$=15×$N_{link}$+13×$N_{node}$. Table II gives a few numerical examples.

TABLE II

Storage requirements for the Newton-Raphson matrix.

| $k_x$ | $k_y$ | $k_z$ | $N_{nodes}$ | $N_{links}$ | $N_{non\_zero}$ |
|---|---|---|---|---|---|
| 10 | 10 | 10 | 1000 | 2700 | 49060 |
| 10 | 10 | 100 | 10.000 | 27900 | 516340 |
| 10 | 100 | 100 | 100.000 | 288.000 | 5.430.520 |
| 100 | 100 | 100 | 1000.000 | 2.970.000 | 57.073.600 |

EXAMPLES

A number of examples are presented demonstrating that the proposed potential formulation in terms of the Poisson field V, the vector field A and the dummy field $\chi$, is a viable method to solve the Maxwell field problem. All subtleties related to that formulation, i.e. the positioning of the vector potential on links, and the introduction of the ghost field $\chi$, have already been described above in constructing the solutions of the static equations. Therefore, a series of examples in the static limit are presented.

Metal Plug on Highly-doped Silicon

The first example concerns the electromagnetic behavior of a metal plug on (highly-doped) silicon. This example addresses all subtleties that are related to metal-semiconductor, metal-insulator and semiconductor-insulator interfaces as well as triple lines. The simulation region (10×10×10 $\mu m^3$) consists of two layers. A layer of the silicon (5 $\mu m$) is highly doped at the top, using a square mask of 4×4 $\mu m^2$ at the center. Above the silicon there is 5 $\mu m$ oxide with a metal plug of 4×4 $\mu m^2$.

Figure 12:
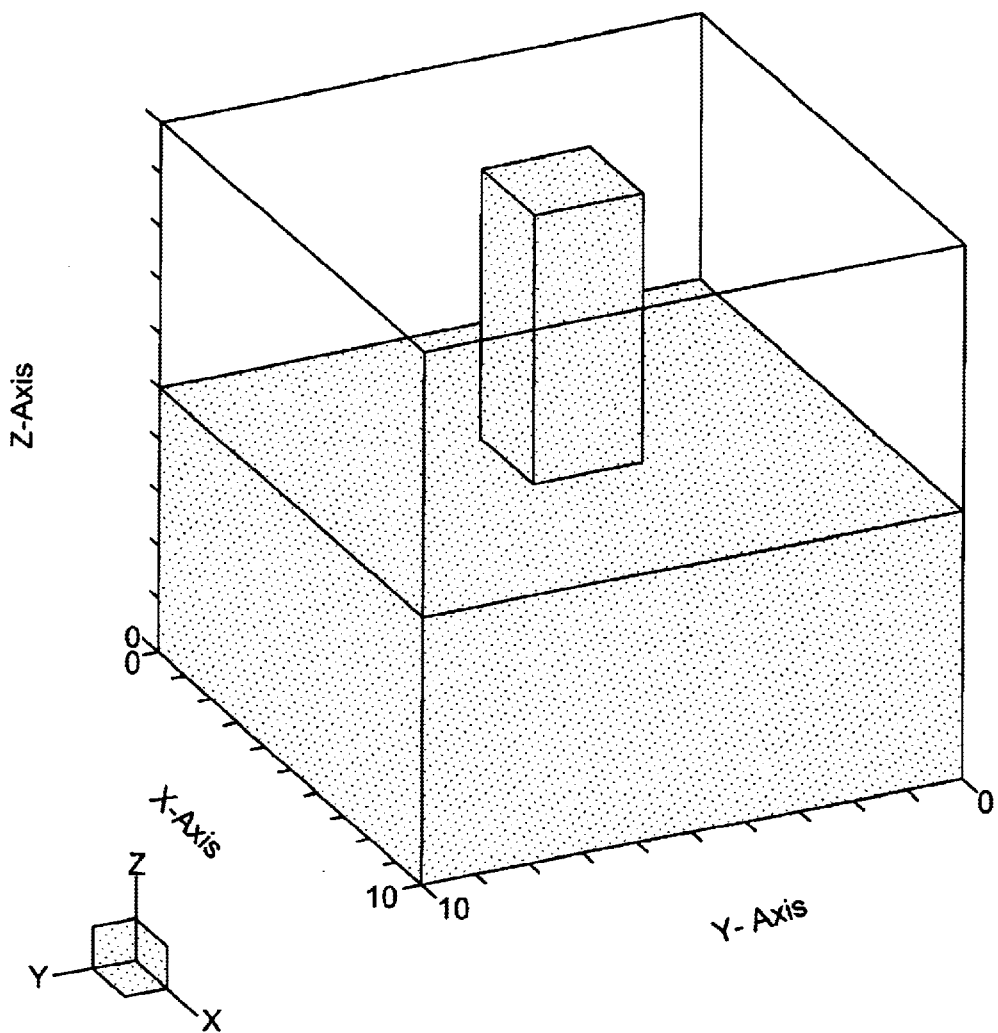
FIG. 12 shows the layout of a metal plug on a highly doped semiconductor used to demonstrate the methods according to the present invention.
Figure 13:
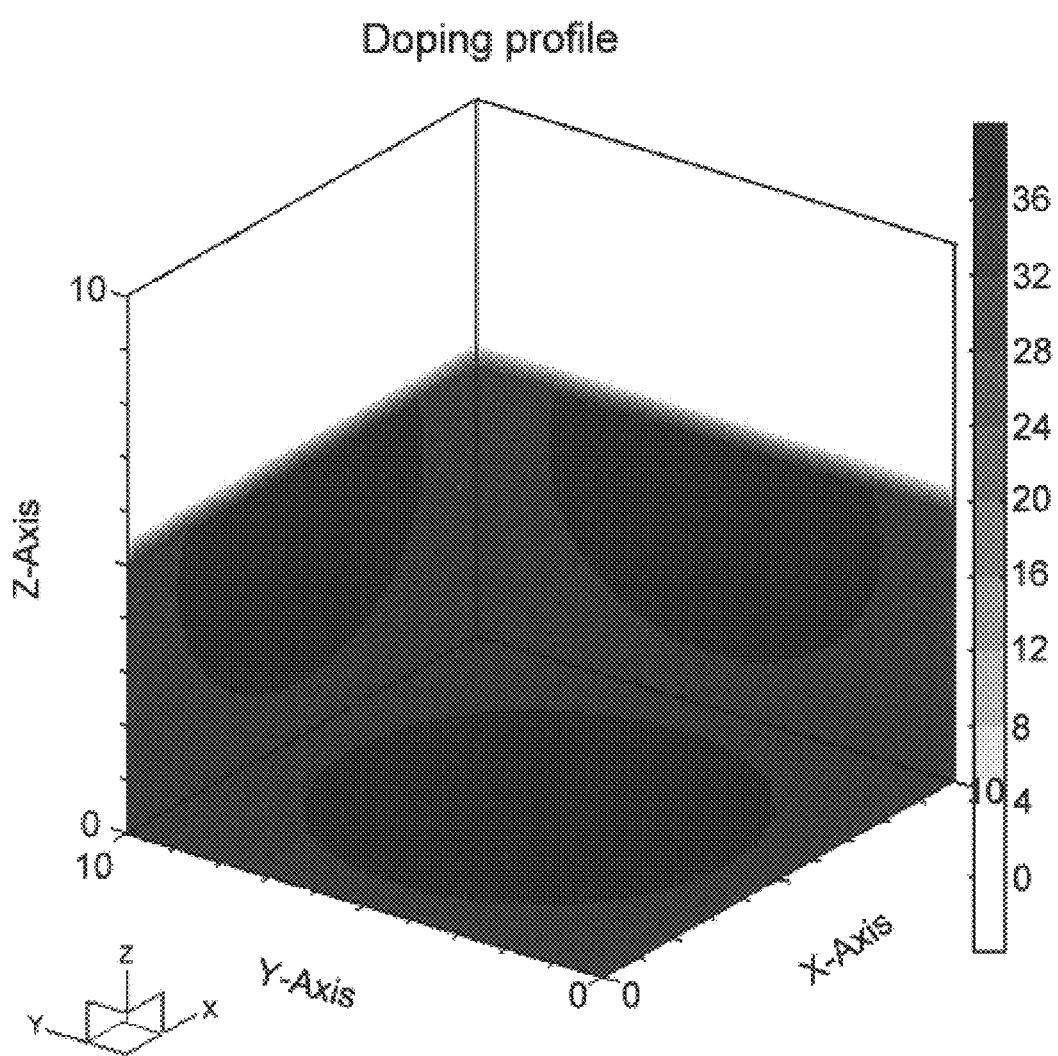
FIG. 13 shows doping in the semiconductor region of the metal on the highly-doped semiconductor plug.
Figure 14:
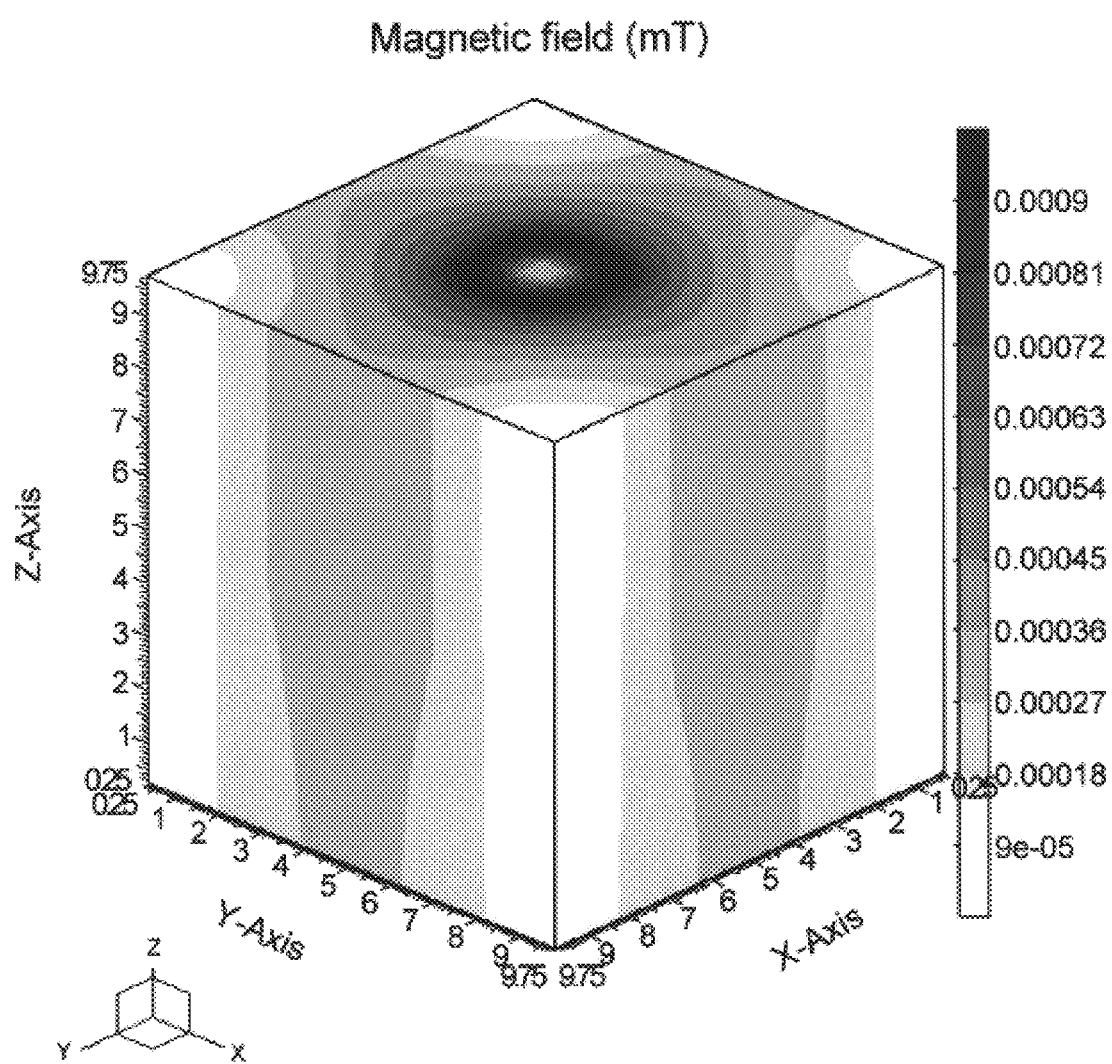
FIGS. 14 and 15 show magnetic field plots of the static solution seen in perspective from the top and bottom plane.
Figure 15:
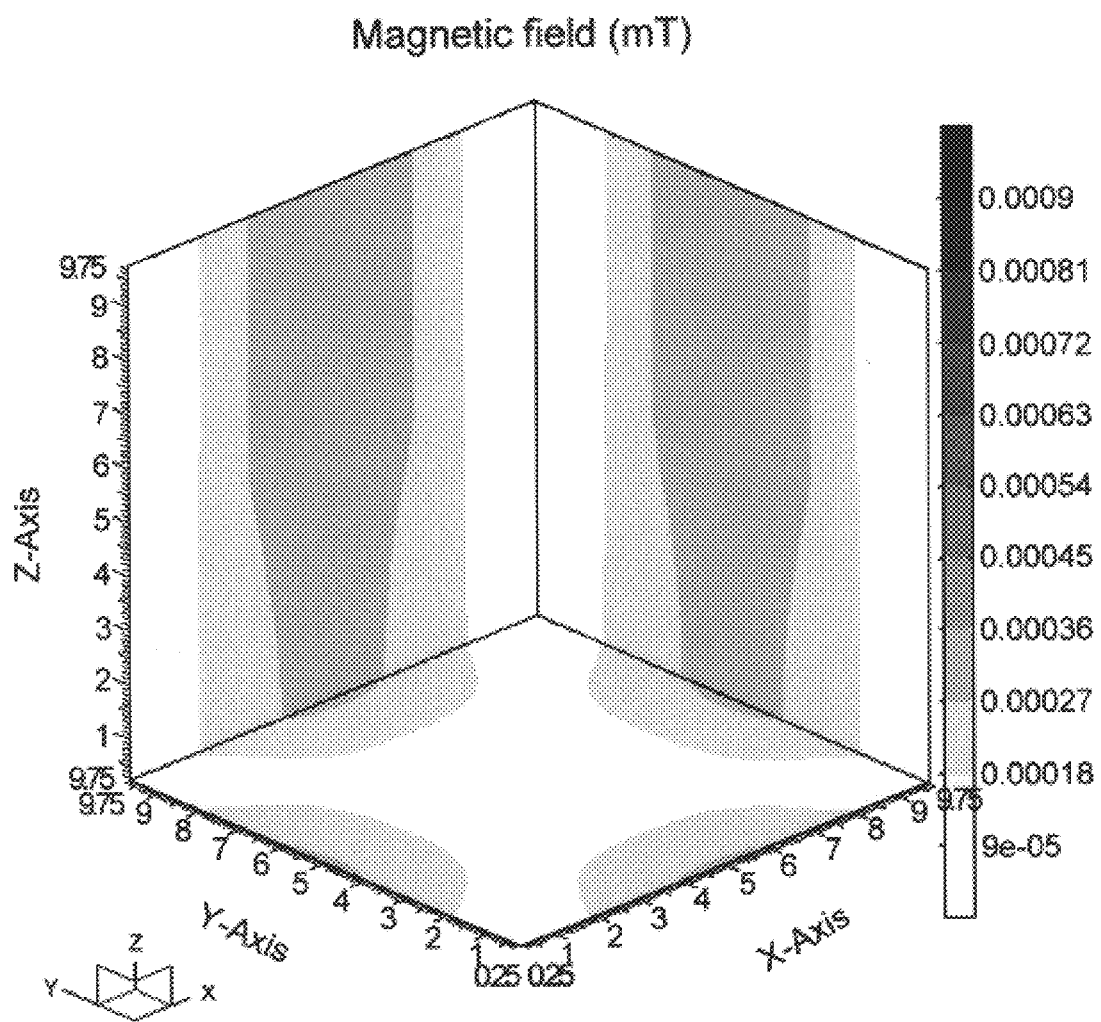

In FIG. 12, the structure is sketched. A Gaussian doping profile is implanted below the metal plug and the concentration (at the surface of the simulation domain) is plotted in FIG. 13. The voltage drop over the plug is 0.2 Volts. The resistivity of the metal is taken $10^{-8}$ $\Omega m$. In FIGS. 14 and 15, the magnetic field is presented. Whereas the metal plug carries the current in the top layer, it is observed that the field has a strength decaying as ~1/r. In the bottom layer the current spreads out and this leads to a flat B-field intensity. In the table III the results are listed of some characteristic parameters of the simulation.

The energies have been calculated in two different ways and good agreement is observed. This confirms that the new methods underlying the field solver are trustworthy. The $\chi$-field is zero within the numerical accuracy, i.e. $\chi$~o($10^{-14}$).

TABLE III

Some characteristic results for the metal/semiconductor plug.

| ELECTRIC ENERGY | |
|---|---|
| $\frac{1}{2}\epsilon_0 \int_\Omega dv E^2$ | 2.41890E–17 J |
| $\frac{1}{2}\int_\Omega dv \rho\phi$ | 2.55777E–17 J |
| MAGNETIC ENERGY | |
| $\frac{1}{2\mu_0}\int_\Omega dv B^2$ | 4.84510E–23 J |

TABLE III-continued

Some characteristic results for the metal/semiconductor plug.

| | |
|---|---|
| $\frac{1}{2}\int_\Omega d v \mathrm{J}, \mathrm{A}$ | 4.90004E−23 J |
| RESISTANCE | |
| Resistance | 1.49831E+4 Ω |

Crossing Wires

Figure 16:
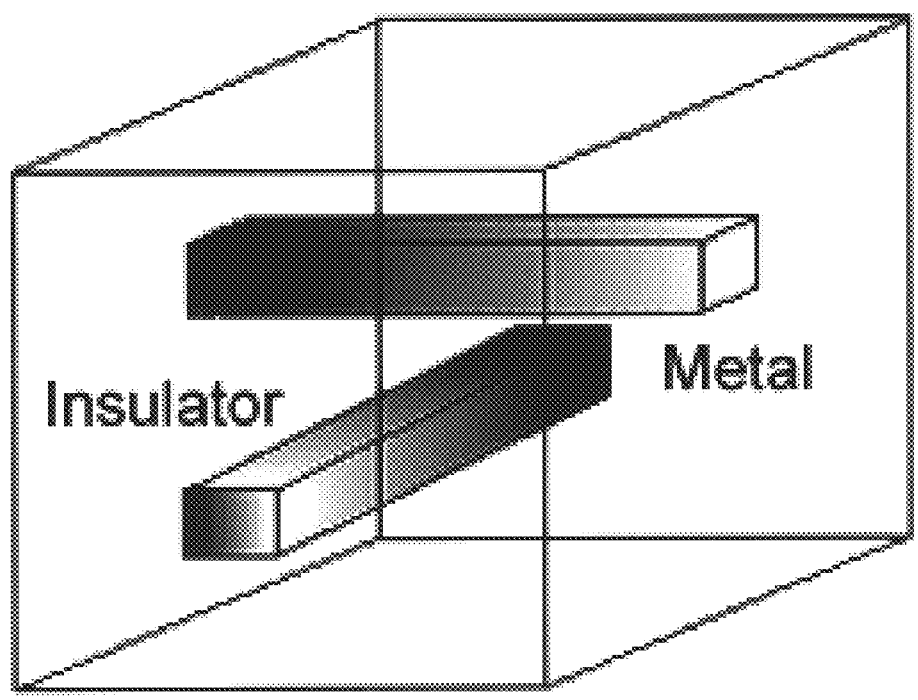
FIG. 16 shows a layout of two crossing wires used to demonstrate the methods of the present invention.

The second example concerns two crossing wires. This example addresses the three-dimensional aspects of the solver. The structure is depicted in FIG. 16 and has four ports. In the simulation one port is placed at 0.1 volt and the other ports are kept at zero volt. The current is 4 Ampere. The simulation domain is 10×10×14 $\mu m^3$. The metal lines have a perpendicular cross section of 2×2 $\mu m^2$. The resistivity is $10^{-8}$ Ωm. In table IV, some typical results are presented.

TABLE IV

Some characteristic results for two crossing wires.

| | |
|---|---|
| ELECTRIC ENERGY | |
| $\frac{1}{2}\epsilon_0 \int_\Omega d v \mathrm{E}^2$ | 1.03984E−18 J |
| $\frac{1}{2}\int_\Omega d v \rho \phi$ | 1.08573E−18 J |
| MAGNETIC ENERGY | |
| $\frac{1}{2\mu_0}\int_\Omega d v \mathrm{B}^2$ | 2.89503E−11 J |
| $\frac{1}{2}\int_\Omega d v \mathrm{J}, \mathrm{A}$ | 2.92924E−11 J |
| RESISTANCE | |
| Resistance | 0.25 Ω |

Square Coaxial Cable

Figure 17:
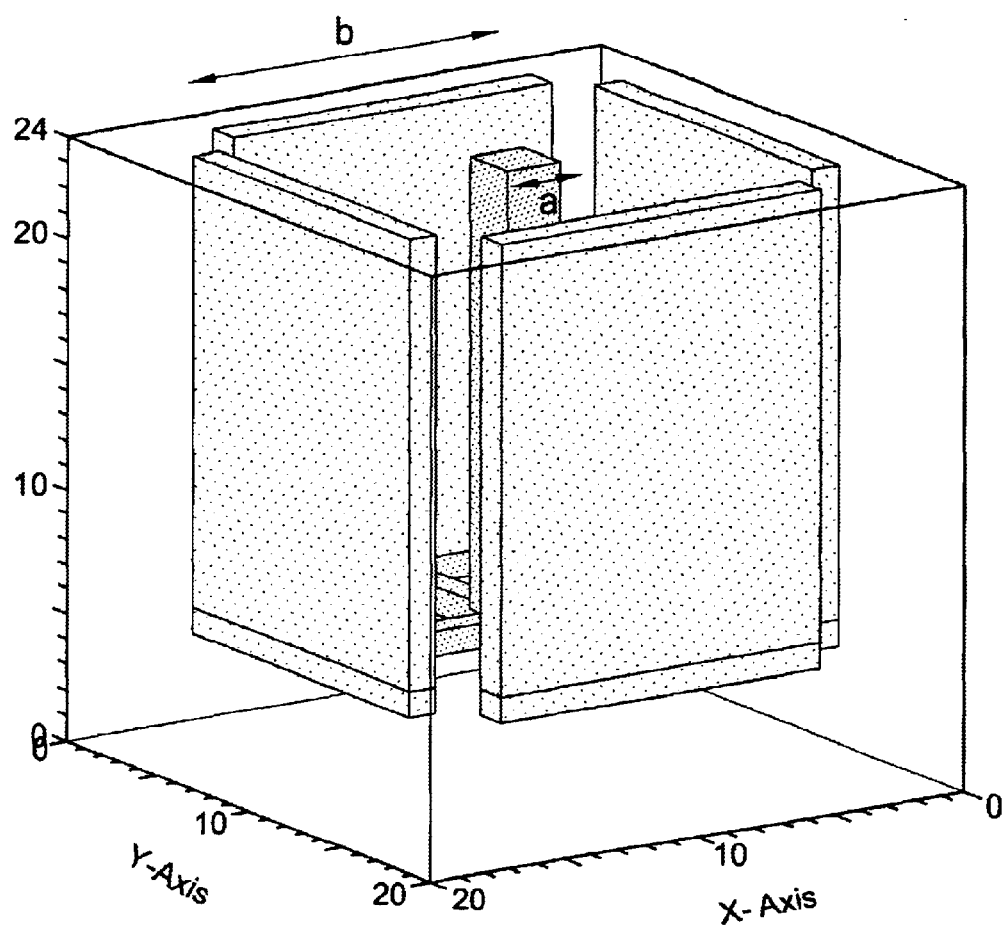
FIG. 17 a layout of a square coax structure used to demonstrate the methods of the present invention.

To show that also inductance calculations are adequately addressed, the inductance per unit length (L) is calculated of a square coaxial cable as depicted in FIG. 17. The inductance of such a system with inner dimension a and outer dimension b, was calculated by:

$$l \times \frac{1}{2} L I^2 = \frac{1}{2\mu_0} \int_\Omega B^2 dv = \frac{1}{2} \int_\Omega dv \mathrm{J} \cdot A \quad (112)$$

with l denoting the length of the cable. As expected, for large values of the ratio r=b/a, the numerical result for the square cable approaches the analytical result for a cylindrical cable, $L=[(\mu_0 \ln(b/a))/(2\pi)]$.

TABLE V

Some characteristic results for a square coaxial cable.

| a μm | b μm | b/a | L (cylindrical) (nH) | L (square) (nH) |
|---|---|---|---|---|
| 2 | 6 | 3 | 220 | 255 |
| 1 | 5 | 5 | 322 | 329 |
| 1 | 7 | 7 | 389 | 390 |
| 1 | 10 | 10 | 461 | 458 |

Spiral Inductor

Figure 18:
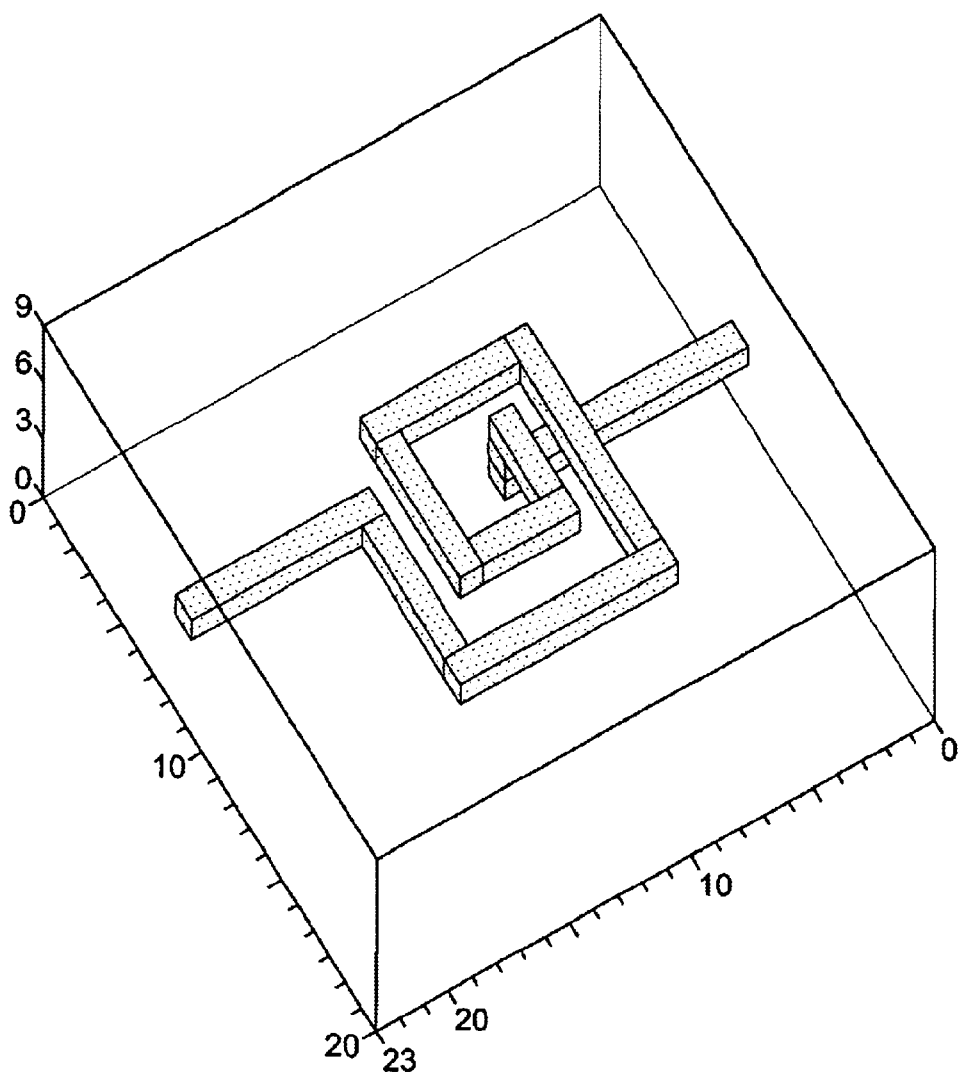
FIG. 18 a layout of a spiral inductor structure used to demonstrate the methods of the present invention.

A spiral inductor, as shown in FIG. 18 was simulated. This structure also addresses the three dimensional aspects of the solver. The cross-section of the different lines is 1 μm×1 μm. The overall size of the structure is 8 μm×8 μm and the simulation domain is 23×20×9 $\mu m^3$.

Figure 19:
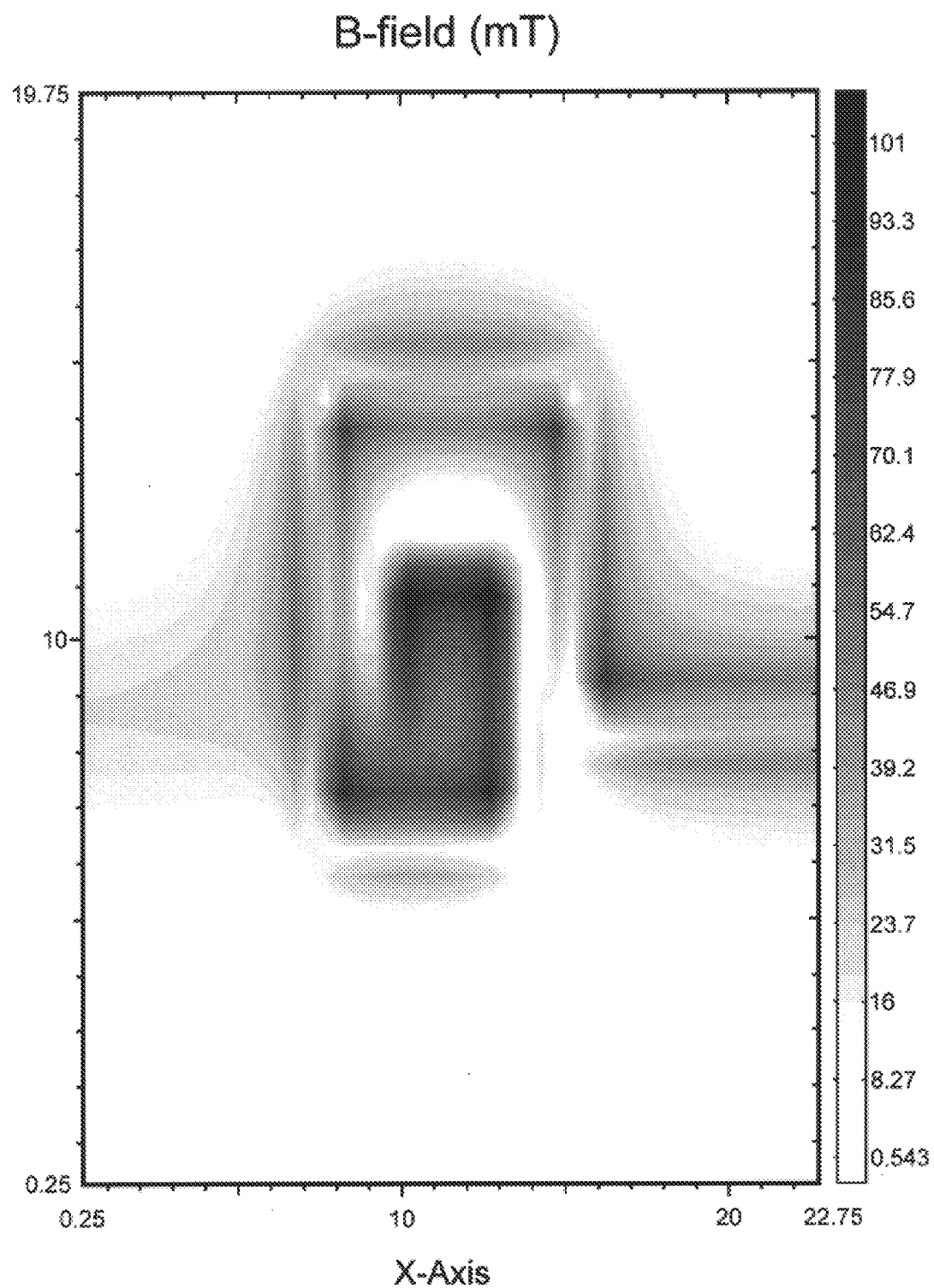
FIG. 19 shows the magnetic field strength in the plane of the spiral conductor of FIG. 18 as calculated by a method of the present invention.

In FIG. 19, the intensity of the magnetic field is shown at height 4.5 μm.

TABLE VI

Some characteristic results for the spiral inductor.

| | |
|---|---|
| ELECTRIC ENERGY | |
| $\frac{1}{2}\epsilon_0 \int_\Omega d v \mathrm{E}^2$ | 2.2202E−18 J |
| $\frac{1}{2}\int_\Omega d v \rho \phi$ | 2.3538E−18 J |
| MAGNETIC ENERGY | |
| $\frac{1}{2\mu_0}\int_\Omega d v \mathrm{B}^2$ | 3.8077E−13 J |
| $\frac{1}{2}\int_\Omega d v \mathrm{J}, \mathrm{A}$ | 3.9072E−13 J |
| RESISTANCE | |
| Resistance | 0.54 Ω |

The above three-dimensional field solution method has been programmed in software for on-chip passive structures. A TCAD software environment was built such that arbitrary Manhattan-like structures can be loaded, calculated and the results can be visualized. The multi-layer stack of a back-end process results in different material interfaces. The inclusion of the interface conditions in the TCAD software was done such that the electromagnetic response is accurately simulated. The treatment of the domain boundaries was done based on the idea that energy should not enter or leave the simulation domain except for the contact ports. The numerical implementation requires that all variables are scaled and the de Mari scaling was extended to include the vector field A and the ghost field $\chi$. Numbering schemes for the nodes and the links were given and the solver requirements have been specified.

In calculating the above examples it is wasteful of nodes to have the same mesh size over the whole of the area/volume of interest. In certain areas/volumes, e.g. where the field intensities change rapidly or in areas/volumes of great importance it is preferred to have a smaller mesh size. However, in other areas it is economical in memory size and computing time to have a wider mesh spacing.

In a further embodiment of the invention a method is disclosed for refining a mesh. This method may be combined advantageously with the previous field calculation methods or may be used in the calculation of field problems by other methods, e.g. in fluid dynamics, mechanics etc. This embodiment is therefore not limited in its use to the above filed calculation methods. As an example the application of the method to a rectangular 2-dimensional mesh in a predetermined domain will be described but the present invention is not limited to this number of dimensions. The rectangular mesh comprises nodes and one-dimensional planes, i.e. lines called links, connecting these nodes. As a result, the domain is divided into 2-dimensional rectangular first elements whereby each element is defined by $2^2$ nodes, i.e. rectangles. The assembling is performed over these rectangles which makes sense despite the fact that the rectangles have four nodes. Indeed, if the solution were modeled as a linear function over a rectangle, the number of conditions for finding the coefficients would result into an overdetermined problem. Therefore, the interpolation is dependent on the purpose for which the interpolation is used. For post-processing one may complete the mesh with a Delaunay tessellation and exploit linear interpolation, however, for solving the system of equations, only the end point values of each link or side enter the equations. A link (see FIG. 20) is a connection between two adjacent nodes and forms a side of a rectangle. In fact such a link is shared by a first and a second rectangle, said first rectangle and said second rectangle being adjacent rectangles, and has a twofold purpose. The link serves as the flux carrier for the first as well as the second rectangle, e.g. the top rectangle and the bottom rectangle. However, the flux of said first rectangle and the flux of said second rectangle are considered to be non-interacting and therefore, they satisfy the superposition principle. This is illustrated in FIG. 20. It is this observation that allows for a stable and correct assembling strategy using rectangles instead of triangles. In this assembling strategy, particularly in two dimensions, each node is connected to at most eight different sites in the lattice, since each rectangle can generate a connection to two different nodes. These nodes may all be different, although this is not a necessity.

Figure 24:
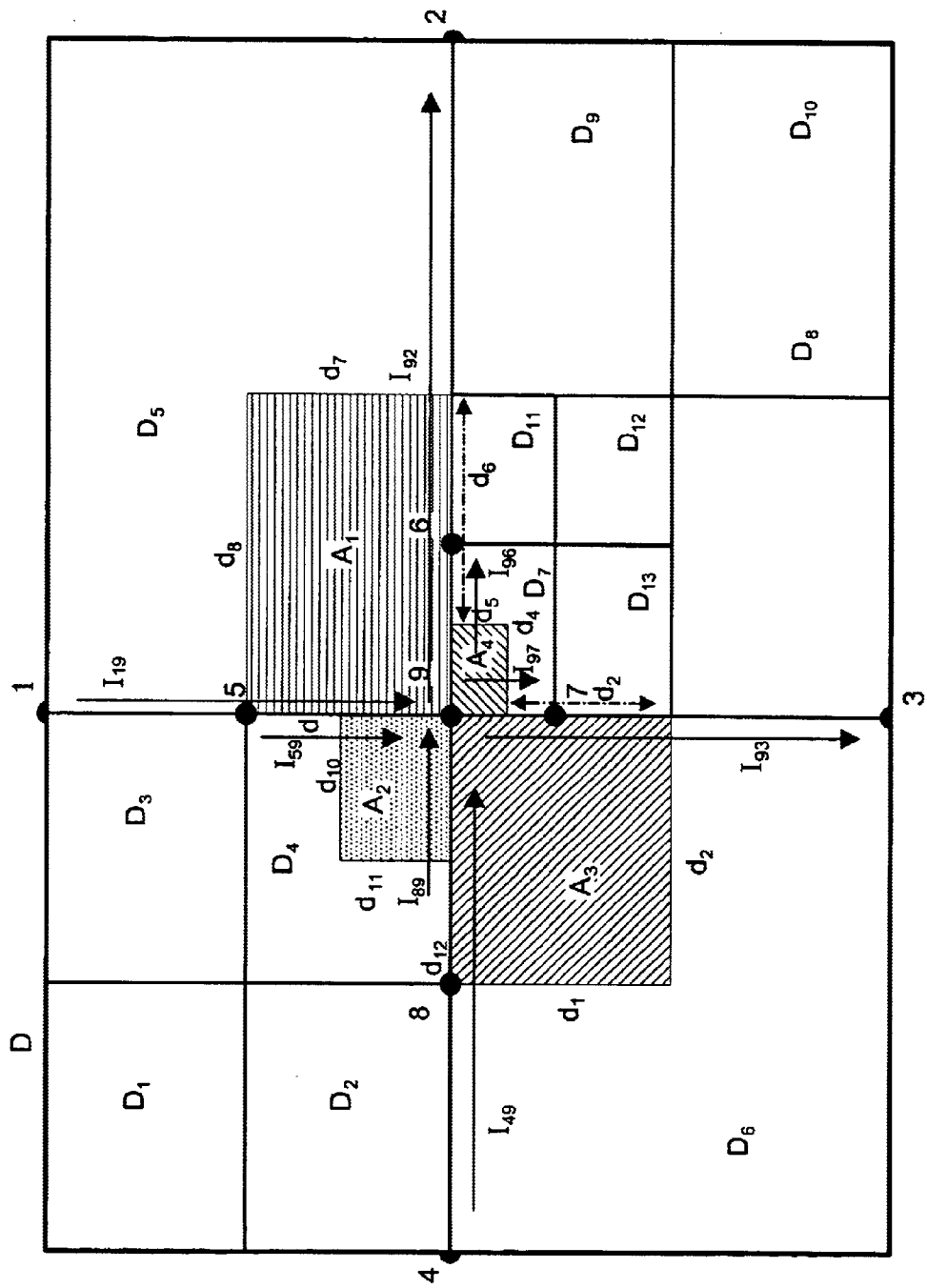
FIG. 24 depicts the node balance assembling technique according to an embodiment of the invention.

The basic features of a CAM algorithm in accordance an embodiment of the present invention are introduced with an example. Suppose one wants to simulate the electrical potential W(x) in a rectangular grid defining some device, given that the electrical system is described by the Poisson equation with $D(x)=\epsilon E(x)$ the electrical field and $\rho(x)$ the electrical charge source and x the place coordinate. The rectangular device is represented by a domain D (FIG. 24). A first relation between the electrical field and the electrical potential is given. A second relation between the electrical charge source and the electrical potential is given. As such the Poisson equation can be expressed in terms of the electrical potential.

$$\nabla \cdot D(x) = \rho(x) \Rightarrow \nabla^2 W(x) = \rho(W(x))$$

For said simulation the above equation is discretized on a rectangular grid or mesh. Said grid divides the domain D in a set of smaller domains $D_i$. The union of said domains $D_i$ ($D_1$–$D_{13}$) gives D. The equation is now written for each node of the grid. This is further illustrated for the node 9, central in the domain D. Around said node, four rectangles $D_5$, $D_7$, $D_6$ and $D_4$ are recognized. In each of said rectangles areas $A_1$, $A_4$, $A_3$ and $A_2$ (shaded in FIG. 24) are defined by taking the middle of the links, defined between the central node and the appropriate nodes of the rectangles. These nodes are denoted in FIG. 24 as black coloured nodes and numbered. Eight such nodes are defined. Said areas together define an overall area $A=A_1+A_2+A_3+A_4$. The above equation is now integrated over said area A and Stokes theorem is applied. The right-hand side is approximated by the electrical charge on said central node. The left-hand side is replaced by a contour-integral of the electrical field along the boundaries of the area A. Said boundaries comprises of twelve lines of length $d_i$ ($d_1$–$d_{12}$). Only the electrical field along the links to the central node can be used. In the invented method the electrical field contributions along each such link are separated in two contributions. For instance the electrical field contribution along the horizontal link at the left side of the central node is defined to comprise of a first contribution $I_{49}$, running from node 4 to the central node and a second contribution $I_{89}$, running from node 8 to the central node. $I_{49}$ is related to the rectangle $D_6$ while $I_{89}$ relates to $D_4$. Said contributions are multiplied with the line length of the appropriate line, being the lines, orthogonal to the electrical field contribution under consideration. For the central node this results in the following equation, denoted the node balance:

$$I_{49} \times d_1 + I_{93} \times d_2 + I_{97} \times d_4 + I_{96} \times d_5 + I_{92} \times d_7 + I_{19} \times d_8 + I_{59} \times d_{10} + I_{89} \times d_{11} - \rho_9 \times A = 0$$

For each of the nodes of the mesh such an equation is written. In each equation the relation between the electrical charge $\rho_i$ and the electrical field $I_{ij}$ with the electrical potential is introduced. As such a set of nonlinear equations ($\rho_i$ will depend itself nonlinearly on $W_i$) in the variables $W_j$, being the electrical potential at each node of the mesh, is obtained. Said set of equations is then solved by using an iterative procedure such as a Newton-Raphson scheme. In more general terms $I_{ij}$ is denoted a link-current and $\rho_i \times A$ is denoted source contribution.

The CAM algorithm can be written schematically in the following form:

```
program flux_solver
       call setup rectangle_init   an initial mesh of rectangles is generated
    1  call solve_on_              the equations are solved on the current
       rectangles                   mesh
       call refine_rectangles      mesh refinement using the CAM method
       if (refinement_need)        the refinement is repeated till a predeter-
       go to 1                      mined refinement criterion is met
       stop
```

The function solve_on_rectangles can be written schematically in the following form:

```
       function solve_on_rectangles
          do for each rectangle
             find_variable_in_nodes
             assemble link_current
             do for each node
                assign link_current to node_balance
                assign source_contribution to node_balance
             enddo
          enddo
          solve_equations
```

Note that other orderings of the do-loops are also possible. The solve_equations routine can be any nonlinear equation solver.

According to this embodiment of the invention, a method is disclosed for locally refining a rectangular 2-dimensional mesh in a predetermined domain, wherein the mesh comprises nodes and lines connecting these nodes thereby dividing said domain in 2-dimensional first elements whereby each element is defined by 4 nodes. Particularly, this method, can locally refine an initial mesh comprising 2-dimensional first elements, i.e. rectangles. This method comprises at least the steps of:

- creating a first additional node inside at least one of said first rectangles by completely splitting said first rectangle in exactly four second rectangles in such a manner that said first additional node forms a corner node of each of said second rectangles which results in the replacement of said first rectangle by said four second rectangles; and
- creating a second additional node inside at least one of said second rectangles by completely splitting said second rectangle in exactly four third rectangles in such a manner that said second additional node forms a corner node of each of said third rectangles which results in the replacement of said second rectangle by said four third rectangle.

This first additional node is created somewhere inside a rectangle. This can be anywhere inside a rectangle and thus not on a link (side) of the rectangle. Particularly, this first additional node can be created in the center of the rectangle. Regardless of the exact location of the first additional node, this first rectangle is split completely in exactly four new rectangles, i.e. second rectangles. In other words, the sum of the areas of these four second rectangles completely coincides with the area of this first rectangle and therefore this first rectangle can be deleted. This also holds in an analogous way for the second additional node.

Figure 22A:
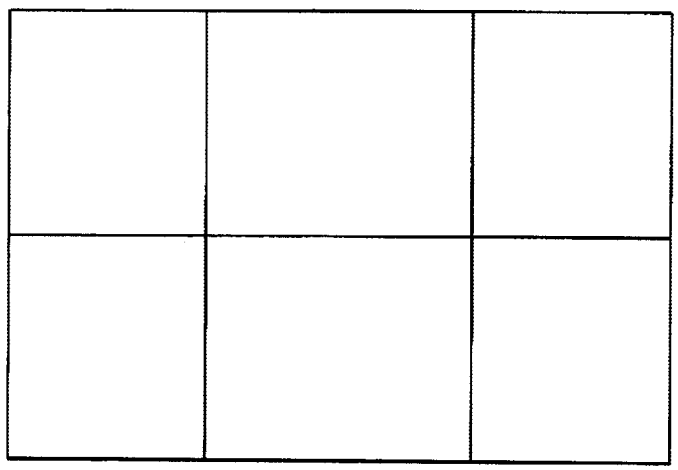
FIG. 22 depicts an initial mesh and this mesh after a first and a second local refinement according to an embodiment of the invention.
Figure 22B:
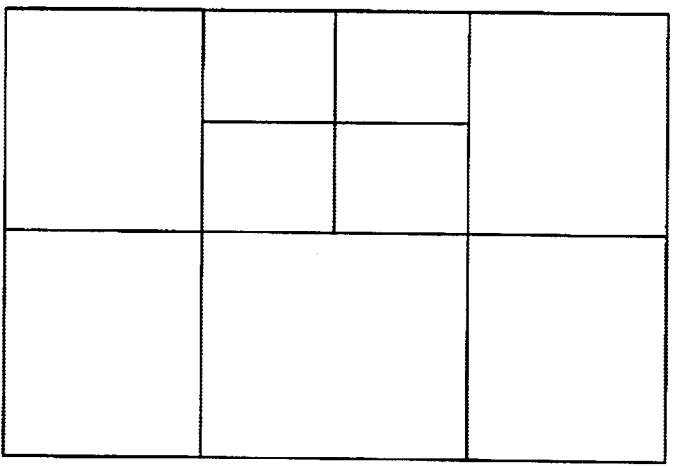
Figure 22C:
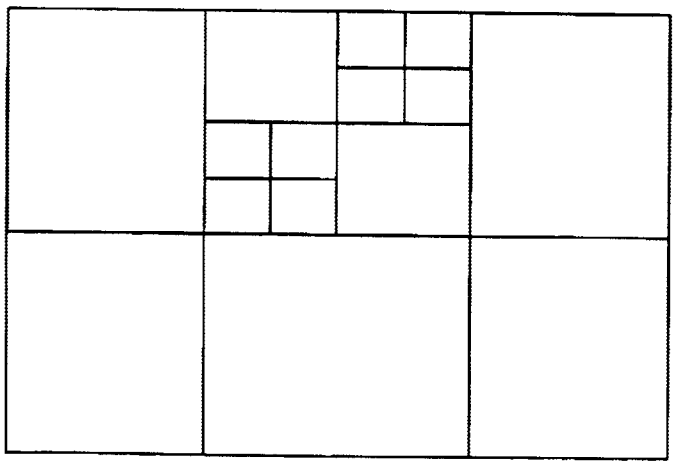

In another embodiment the method of the present invention is embedded in an adaptive meshing strategy. Adaptive meshing is straightforward for n-dimensional meshes comprising n-dimensional elements whereby each element is defined by $2^n$ nodes. Particularly adaptive meshing can be easily implemented for a two-dimensional mesh comprising rectangles. There are no restrictions on the number of links ending on another link as e.g. in the finite-box method. Therefore, extra algorithms for smoothing the mesh after the adaptive meshing are not required because there is no metastasis of spurious nodes into irrelevant regions; in other words the refinement remains locally. In FIG. 22, a possible result of such a meshing strategy is shown after two cycles of adaptation.

An important problem in simulation is the use of different physical models on different length scales, or alternatively, using the same physical models at different scales but with modified model parameters. In the latter case, the model parameters follow renormalization group flows, as in K. Wilson "Confinement of Quarks" Phys. Rev. D10, 2445 (1974). Both scenarios can be applied in restricted domains, without blurred transition regions, because the refinement scheme does not generate extra nodes which necessitate subsequent smoothing steps.

Concerning the issue of numerical stability of the method of the present invention, it is demonstrated that sets of equations of the type $$\vec{\nabla} \cdot \vec{J}^{(k)} + \frac{\partial \rho^{(k)}}{\partial t} = S^{(k)};$$

k being a positive whole number
can be solved on a mesh obtained after a series of iterations. The key observation is that each mesh resembles a Kirchhoff network. Particularly, when considering a 2-dimensional rectangular mesh, each current flows along a side (link) of an element and each side accumulates contributions from two adjacent elements (rectangles) sharing this particular link. Moreover, the currents arising from these two elements do not interact and therefore one may assemble each element independently. One has to keep in mind that the expressions for discretized currents in terms of the end point field values generate semi-definite Newton matrices. An adaptive meshing algorithm according to the method of the present invention, i.e. based on the renormalization group refinement method, is created and tested on a series of devices. No signals revealing instability are detected. The most comprehensive simulation is performed on a MOSFET, using the hydrodynamic model for holes and electrons. Solving five equations with the help of a simultaneous Newton solver for a mesh comprising 2000 nodes, no convergence slow-down was observed. The results agreed within 1% with results obtained with conventional schemes.

General Orthogonal Coordinate Systems

Figure 23:
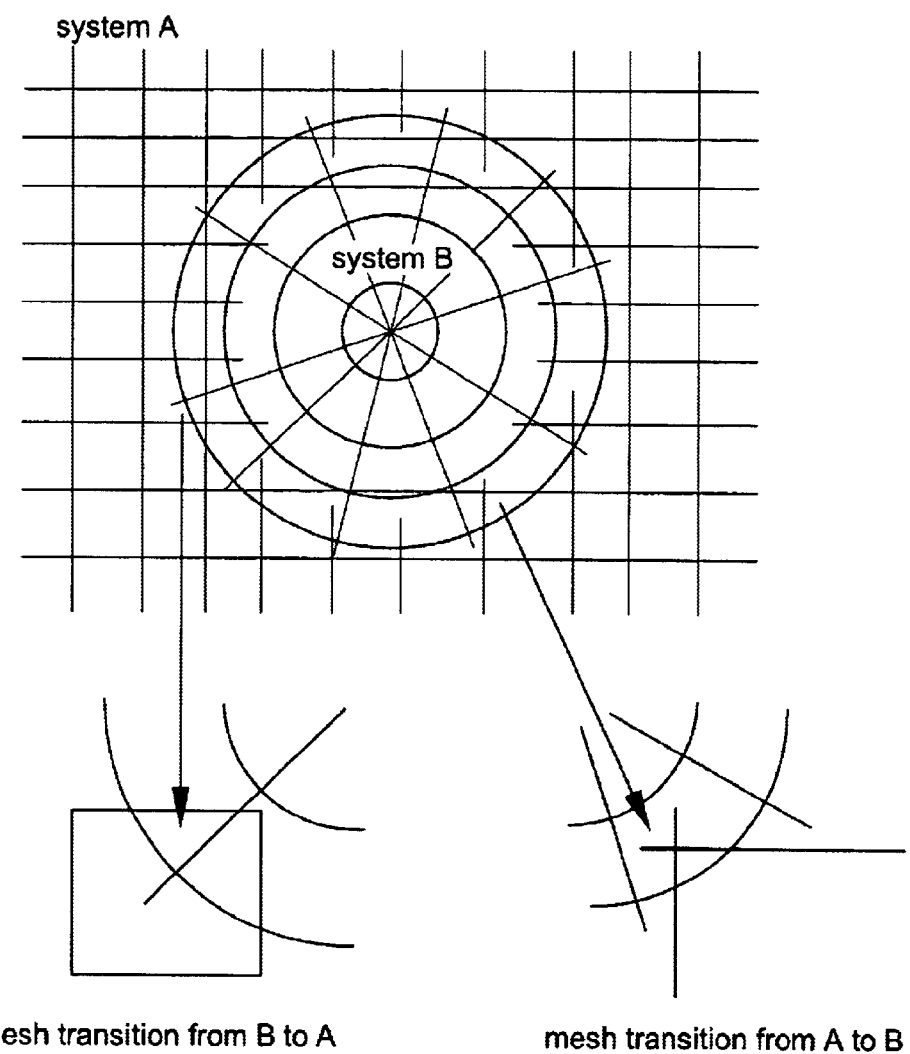
FIG. 23 depicts a transition of a mesh based on a first orthogonal coordinate system to a mesh based on another orthogonal coordinate system using the method of the present invention.

In three dimensions there exists 12 different classes of orthogonal coordinate systems. The orthogonality allows for applying the subdivision of any cell in 4 subcells by taking the mean of the minimum and maximum of the coordinate variables. The orthogonality is a sufficient reason for the guaranty that one does not have to include smoothing nodes. Another interesting application concerns the transition from one coordinate system to another. When using the method of the present invention, there are no restrictions on the number of links ending on another link. Therefore, the absence of smoothing nodes implies that only transition nodes have to be generated at the pre selected interval region. This is done by detecting the nodes in coordinate system A and in the transition region and by assigning refinement nodes to the coordinate system B. In the same way the nodes of coordinate system B lying in the transition region become new nodes for coordinate system A. This is illustrated in FIG. 23. An interpolation function needs to be chosen in order to avoid overdetermination of the system of nodal equations. In other words: The coordinate systems A and B are matched by transition boundary conditions.

In another embodiment of the present invention, a mesh is created using the locally refinement method of the present invention. Thereafter the mesh can be locally coarsened. When solving systems of partial differential equations of the type $$\vec{\nabla} \cdot \vec{J}^{(k)} + \frac{\partial \rho^{(k)}}{\partial t} = S^{(k)};$$

k being a positive whole number
it is often observed that nodes are generated in the adaptive meshing strategy, during the iteration process towards the finally solution, whose existence becomes obsolete, when arriving at the final solution. These nodes are artifacts of the solution procedure and not relevant for describing the final solution with sufficient degree of accuracy. With the method presented here it becomes rather straightforward to clean up the final mesh from these nodes. For this task it is necessary to assign to each node its hierarchy during the generation of the mesh. The initial mesh comprises nodes and first elements and all these nodes obtain generation index 0, i.e. so-called parent nodes. The additional first nodes, which are obtained in the first generation, are given the index 1. These are children nodes. The process is continued by the generation of grandchildren and after X iterations, nodes from the X-th generation are obtained. Mesh coarsening can now be easily executed by deleting the nodes from the last generation and check for sustained accuracy. All parent nodes of a child node, which has been deleted, may now be checked for obsoleteness, and so on.

The Cube-Assembling Meshing method is now demonstrated with the simulation of a microelectronic structure. A detailed exposure of the adaptive meshing strategy in a realistic application is presented. The selected structure is an implanted diode with side contact. The purpose of this example is two-fold: (1) to demonstrate that the new method gives acceptable results, (2) to demonstrate that the method has been implemented in a two-dimensional device simulator, which has served as a research tool for predicting highly unconventional devices, such as hetero-junction type vertical transistors, multi layer HEMTS as well as more conventional structures, such as CMOS devices in operation points where effects are present which are very difficult to simulate, such as carrier heating.

All these structures have in common that commercial software tools do not provide sufficient reliable data for the parameters which are of interest to the process engineer. This situation is due to the fact that software development progresses in parallel with technology development. Having available a source code for the simulation of the internal dynamics inside devices, an ongoing activity has been to improve the algorithms which are exploited in solving the equations underlying the device dynamics. Although many code improvements deal with a gradual extension towards more accurate models to be implemented, occasionally dramatic jumps in code improvements are realized by implementing pieces of code which involve a new understanding of the mathematical machinery which applied.

In the past decade it is observed three instances of major breakthrough events in solving the semi-conductor device equations on the computer. In 1988, a method for simulating abrupt hetero structures, by programming finite jumps in the matching conditions of the nodal values of the scalar functions in the finite-element method. In 1993, a method was constructed for obtaining smooth solutions as well as a robust iterative scheme for finding the solutions of the energy-balance equations by realizing that CGS solvers require a semi-definite Newton-Raphson Jacobian matrix. The third 'quantum leap' in improving the algorithm for finding the solutions of the semiconductor device equations was invented in 1998.

With decreasing device dimensions, there is an increasing need for the inclusion of quantum effects in the simulation method. The laws of quantum-mechanics are of a substantially different character as the laws of classical physics, e.g. even in first order quantization, wave-like equations need to be incorporated, which are very different from Poisson equation and balance equations in general which are of the diffusive type. This situation leads to reconsideration of the discretization schemes, with having in mind a method which decouples the macroscopic physics from the microscopic physics. The underlying idea is that quantum effects are important in particular regions of the device but that other parts the device could be described by the classical methods. Furthermore the quantum regime should be entered by locally refining the mesh in order to take into account the fact that the quantum effect are dominate on a small distance scale. A renormalization group transformation should realize the connection between the macroscopic and microscopic domains. Unfortunately, local mesh refinements in adaptive meshing schemes are always accompanied by spurious nodes which take care of a smooth transition between the fine and the coarse mesh. Such spurious nodes are lethal to the developed ideas for incorporating the quantum physics in the simulation method. Therefore, the question, whether it would be possible to incorporate a discretization scheme for the classical device equations, which may be submitted to local refinement without generating a metastasis of the spurious refinement nodes, has raised and been solved by the development of the CAM-scheme. The method combines the finite-element method with the box-integration method and is applicable in an arbitrary number of dimensions. The method is limited to meshes consisting of the union of patches of orthogonal coordinate frames.

Figure 25:
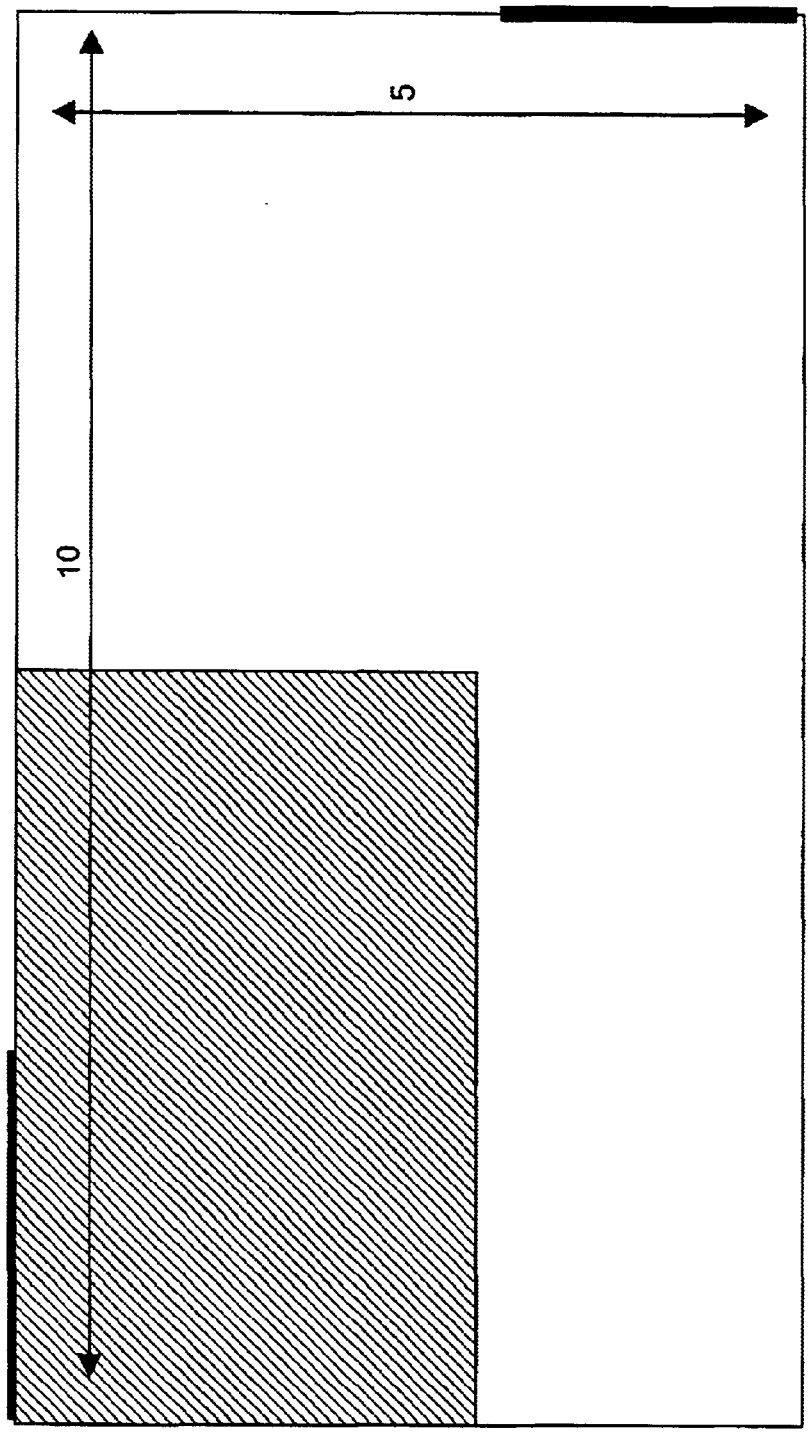
FIG. 25 depicts the structure lay-out of the diode.

The device under consideration consists of a np-diode, whose third dimension is much larger as the first and the second dimension. Therefore, a two-dimensional cross section suffices for the determination of the diode characteristics. In a perpendicular plane, the diode has dimensions 10 times 5 $\mu$m squared. A p-type doped region of size 5 times 2.5 $\mu$m squared is allocated in the upper left corner with a contact named top, and the remaining region is n-typed doped. There is a side-wall contact named side connected to the n-type region. When the diode is forward biased, a current flow is expected from the side-wall contact to the top contact. This current is not expected to be one-dimensional due to the perpendicular orientation of the contacts. The adaptive meshing algorithm is expected to allocate refinement nodes such that the current paths can be accurately traced. In FIG. 25 the device lay-out is presented as it is drawn by the PRISM structure generator. The PRISM structure generator is a pre-processor which allows the user to design the geometric aspects as well as other issues, such as material selection, contact positioning and interface positioning.

The input file diode.dat for the simulator PRISM is presented below.

```
TITLE simulation of 5 x 10 diode structure with adaptive meshing
MESH diode.str
SQUARE
*=========doping-profiles======
UNIFORM -1.00E19 0.0 2.5001 5.0 5.0
UNIFORM 1.00E19 0.0 0.0 5.0 2.5
UNIFORM 1.00E19 5.0001 0.0 10.0 5.0
*===============
DIEL_CON sili 1 11.9
DIEL_CON oxid 1 3.8
*intrinsic concentration of Si:
INTR_CAR sili 1 1.3E10
TEMP 26.0
MOB sili 11 400. 1500.0
GF sili 03 f
RECOM sili 1 5000.0 5000.0
BIAS top 0.0 side 0.0
ANAL BIHT
CPUTIM 600.0
*max no newton loops
LOOPS 100
$ solver accuracy:
ACC 1.0d-14 1.0d-14 1.0d-30 1.0d-30 1 500 1.0d-30 1.0d-35
NORM 1.0d-3 1.0d-2 5.0d-2 1.0d-2 5.0d-2
PRINT diode.out 3
PLOT doping 6 doping
SOLVE
```

At the first run of a new structure the output of the PRISM structure generator is loaded into the PRISM simulation. This is the file diode.str as indicated in the the second line. The file diode.str is printed below. In the section STRUCTURE-LINES for each line the fourth parameter gives the number of line divisions. With this parameter a crude initial mesh for performing initial calculations towards the final solution are generated. These number can be provided interactively with the structure generator.

```
                            <PRIMI>
<TITLE> <none>
<GRID> 1.000000e+01 5.0000Q0e+00 2.500000e-01 2.500000e-01
<GE0METRY> 1
<Points>
0.000000e+00 1.250000e+00 1
1.000000e+01 1.250000e+00 1
2.500000e+00 5.000000e+00 1
2.500000e+00 0.000000e+00 1
0.000000e+00 2.500000e+00 1
1.000000e+01 2.500000e+00 1
5.000000e+00 5.000000e+00 1
5.000000e+00 0.000000e+00 1
0.000000e+00 0.000000e+00 1
1.000000e+01 0.000000e+00 1
1.000000e+01 5.000000e+00 1
0.000000e+00 5.000000e+00 1
<Lines>
0.000000e+00 1.250000e+00 0.000000e+00 2.500000e+00 1
1.000000e+01 1.250000e+00 1.000000e+01 0.000000e+00 1
2.500000e+00 5.000000e+00 5.000000e+00 5.000000e+00 1
2.500000e+00 0.000000e+00 0.000000e+00 0.000000e+00 1
0.000000e+00 2.500000e+00 0.000000e+00 5.000000e+00 1
1.000000e+01 2.500000e-00 1.000000e+01 1.250000e+00 1
5.000000e+00 5.000000e+00 1.000000e+01 5.000000e+00 1
5.000000e+00 0.000000e+00 2.500000e+00 0.000000e+00 1
1.000000e+01 0.000000e+00 5.000000e+00 0.000000e+00 1
1.000000e+01 5.000000e+00 1.000000e+01 2.500000e+00 1
0.000000e+00 5.000000e+00 2.500000e+00 5.000000e+00 1
0.000000e+00 0.000000e+00 0.000000e+00 1.250000e+00 1
<EXTEND> 0.000000e+00
<STRUCTURE>
<Points> 16
1 2.500000e+00 5.000000e+00
2 0.000000e+00 2.500000e+00
3 2.500000e+00 2.500000e+00
. . .
. . .
<Lines> 24
1 1 3 5 0 0 0
2 2 3 5 0 0 0
3 2 4 5 0 0 0
. . .
. . .
<Areas> 9
1 3 4 1 2 1 1
2 1 5 6 7 1 1
. . .
. . .
<MIC>
<Materials> 1
1 sili
<Contacts> 2
7 top
9 side
<Interfaces> 0
<END>
```

The execution of PRISM with the input file diode.dat generates two files related to the mesh construction. The first file diode.sqr is a detailed description which contains all structure information for applying the cube assemble method. Part of the file diode.sqr is printed below.

```
                            TITLE
                            <none>
                            NODE
                            256
                            2.50000000E+00 5.00000000E+00
                            .00000000E+00 2.50000000E+00
                            2.50000000E+00 2.50000000E+00
                            .00000000E+00 5.00000000E+00
                            . . .
```

-continued

```
. . .
SQUARES
225
  19 131 132  20 1 1
212 216  50  49 1 1
128  20   1  32 1 1
245 249 250 246 1 1
. . .
. . .
INTERFACE
0
CONTACT
17
 4 1
 1
 7 2
. . .
. . .
LOG_NAMES
2 0 1
C 1 1top
C 2 1side
M 1 1sili
END
```

Figure 26:
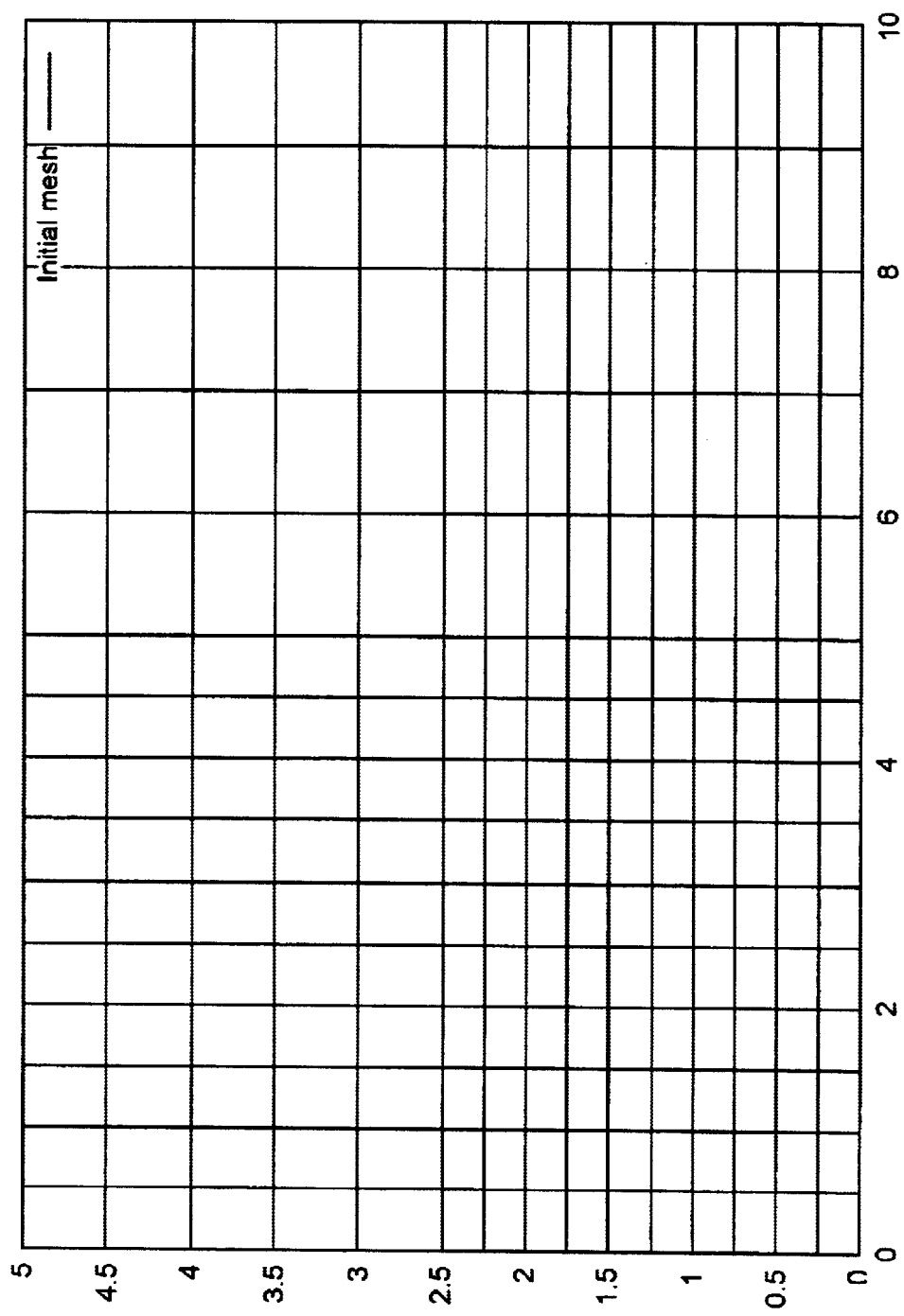
FIG. 26 depicts the initial square mesh of the diode.
Figure 27:
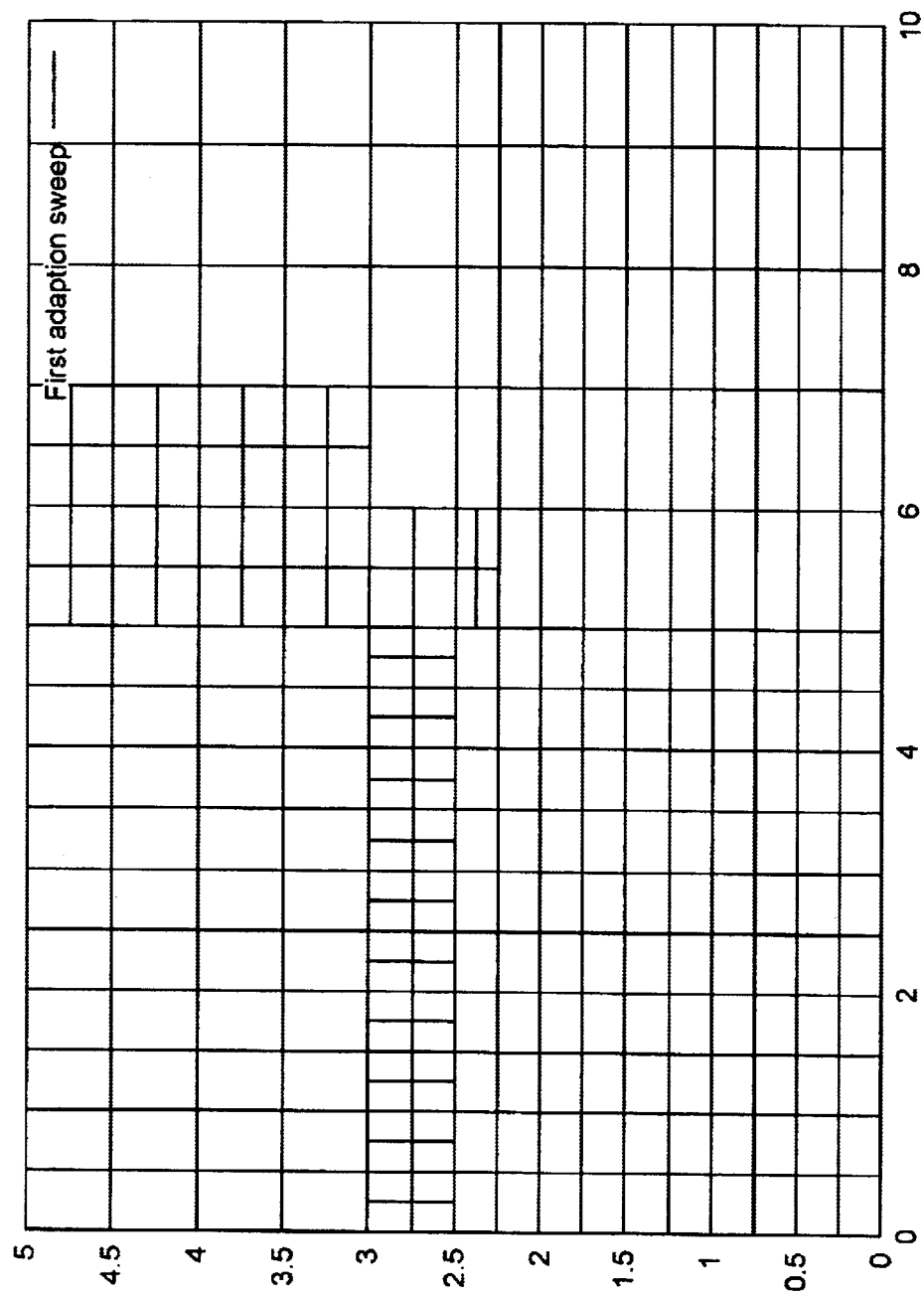
FIG. 27 depicts the square mesh after 1 adaption sweep.
Figure 28:
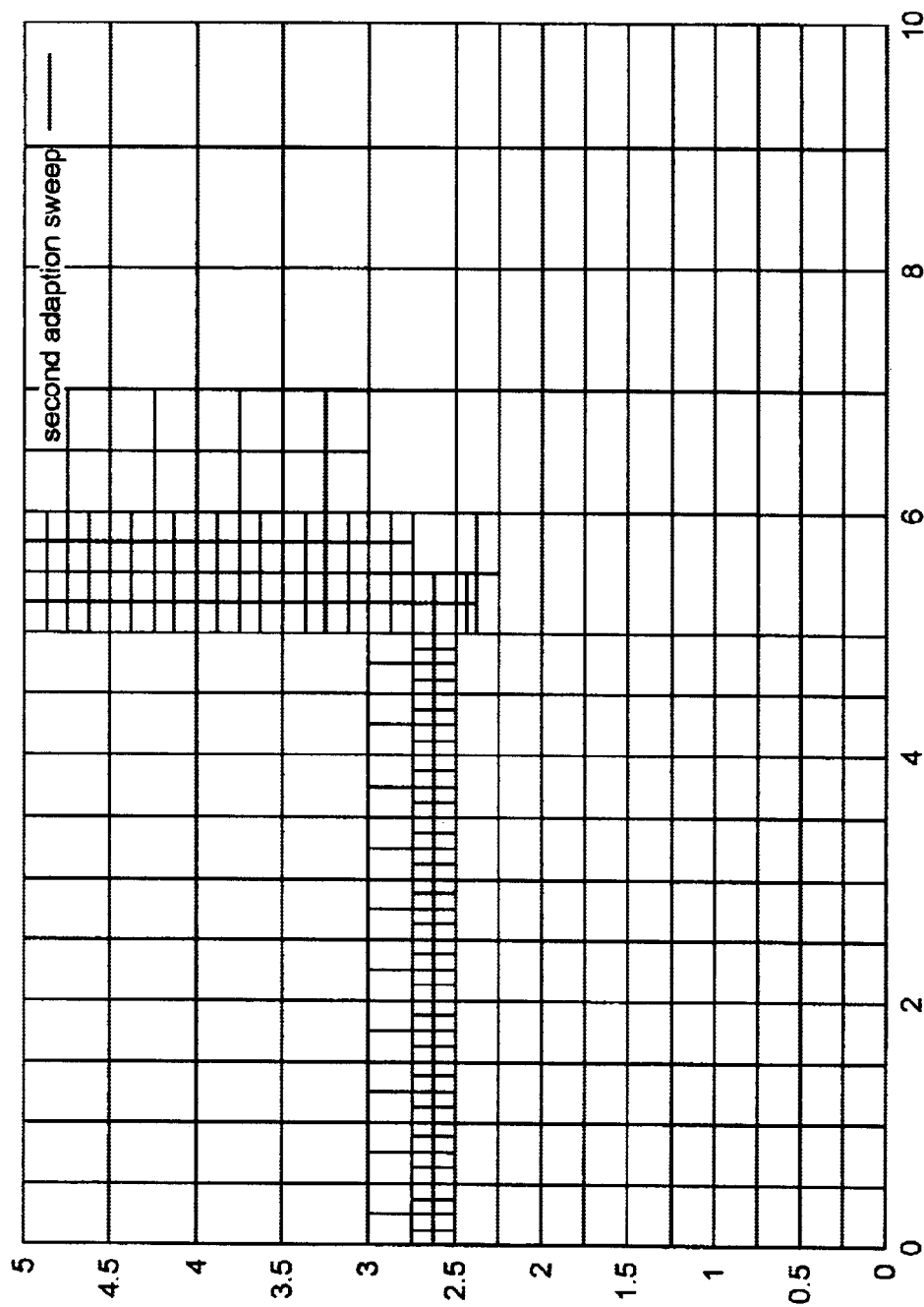
FIG. 28 depicts the square mesh after 2 adaption sweep.
Figure 29:
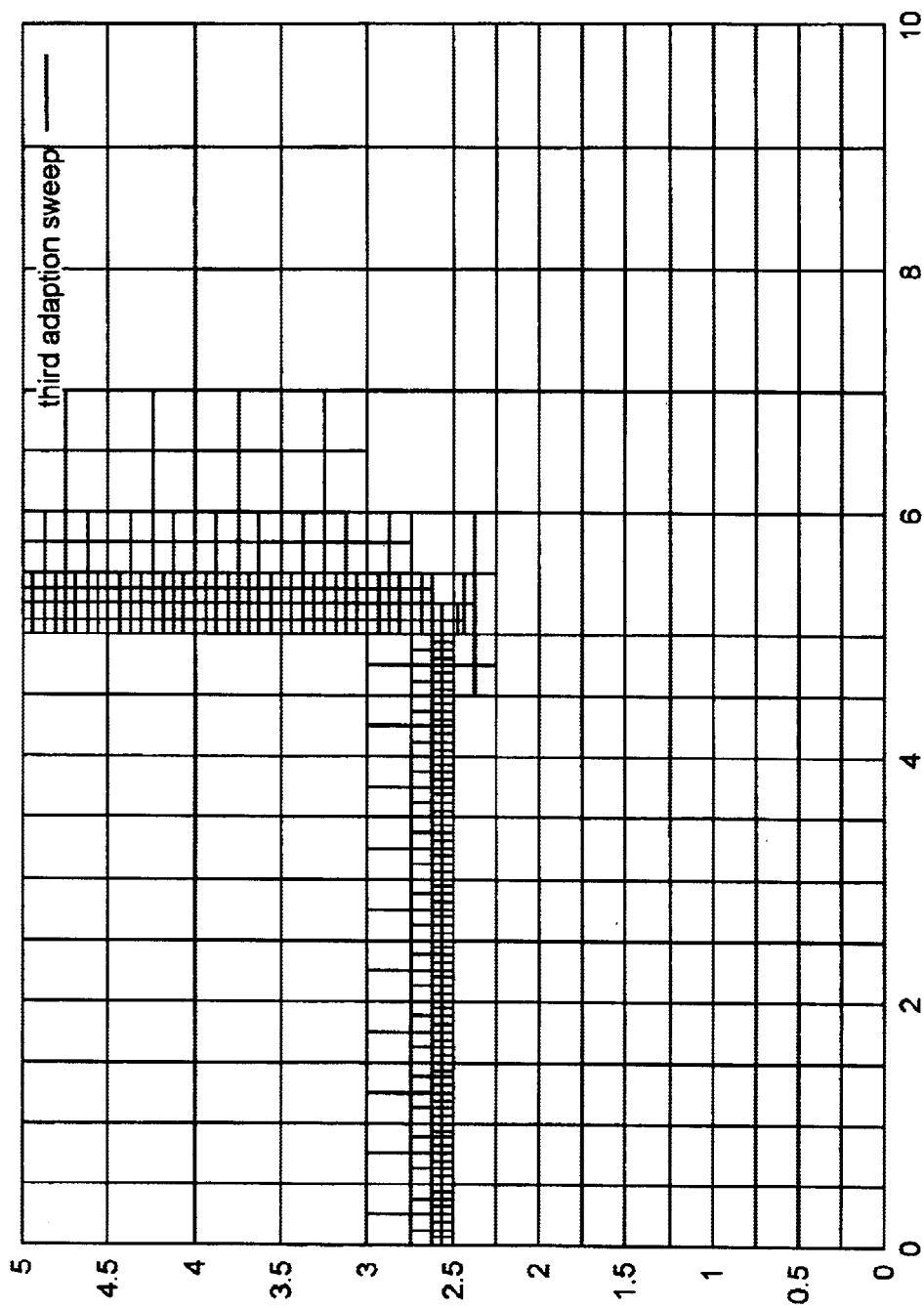
FIG. 29 depicts the square mesh after 3 adaption sweep.
Figure 30:
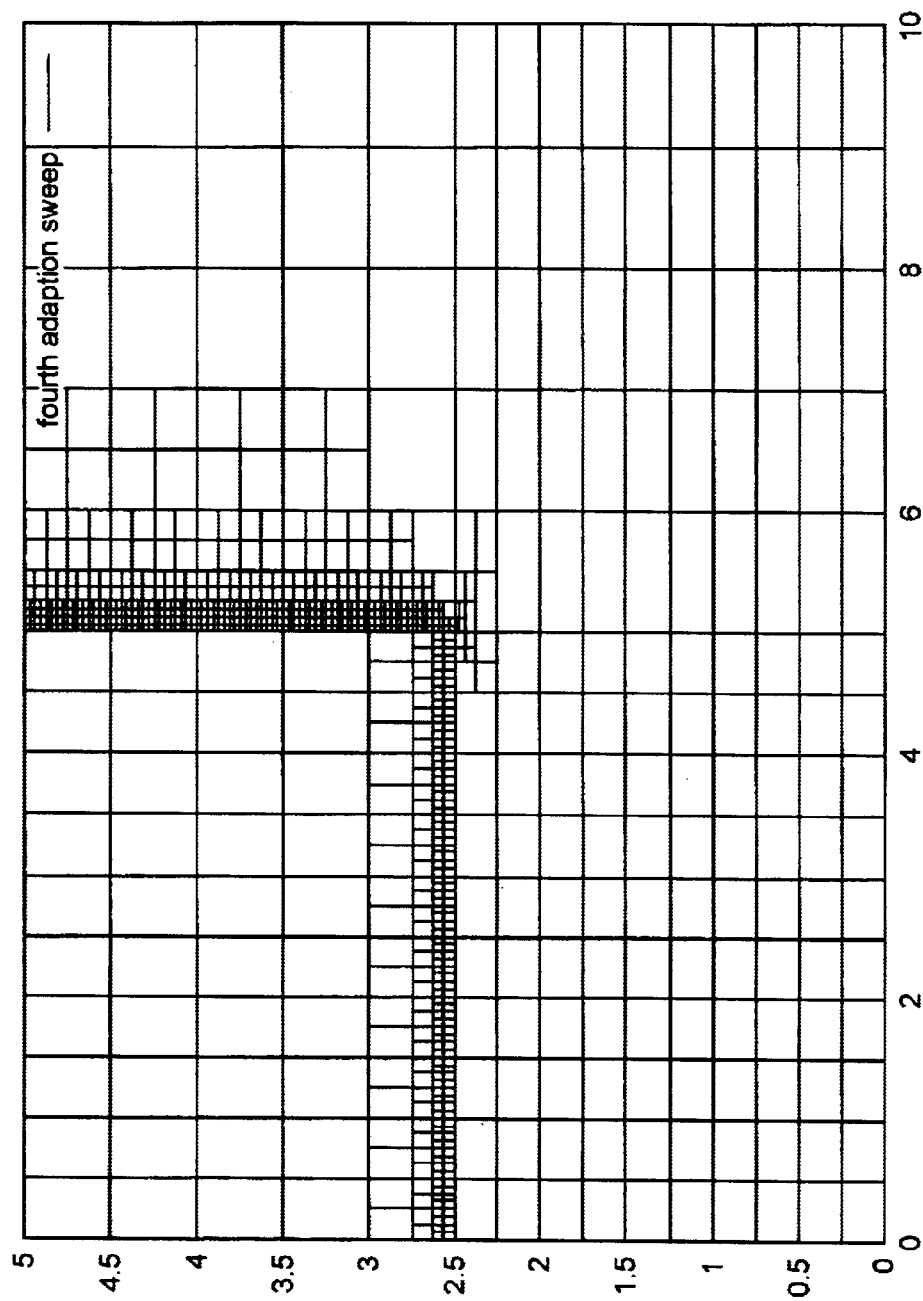
FIG. 30 depicts the square mesh after 4 adaption sweep.
Figure 31:
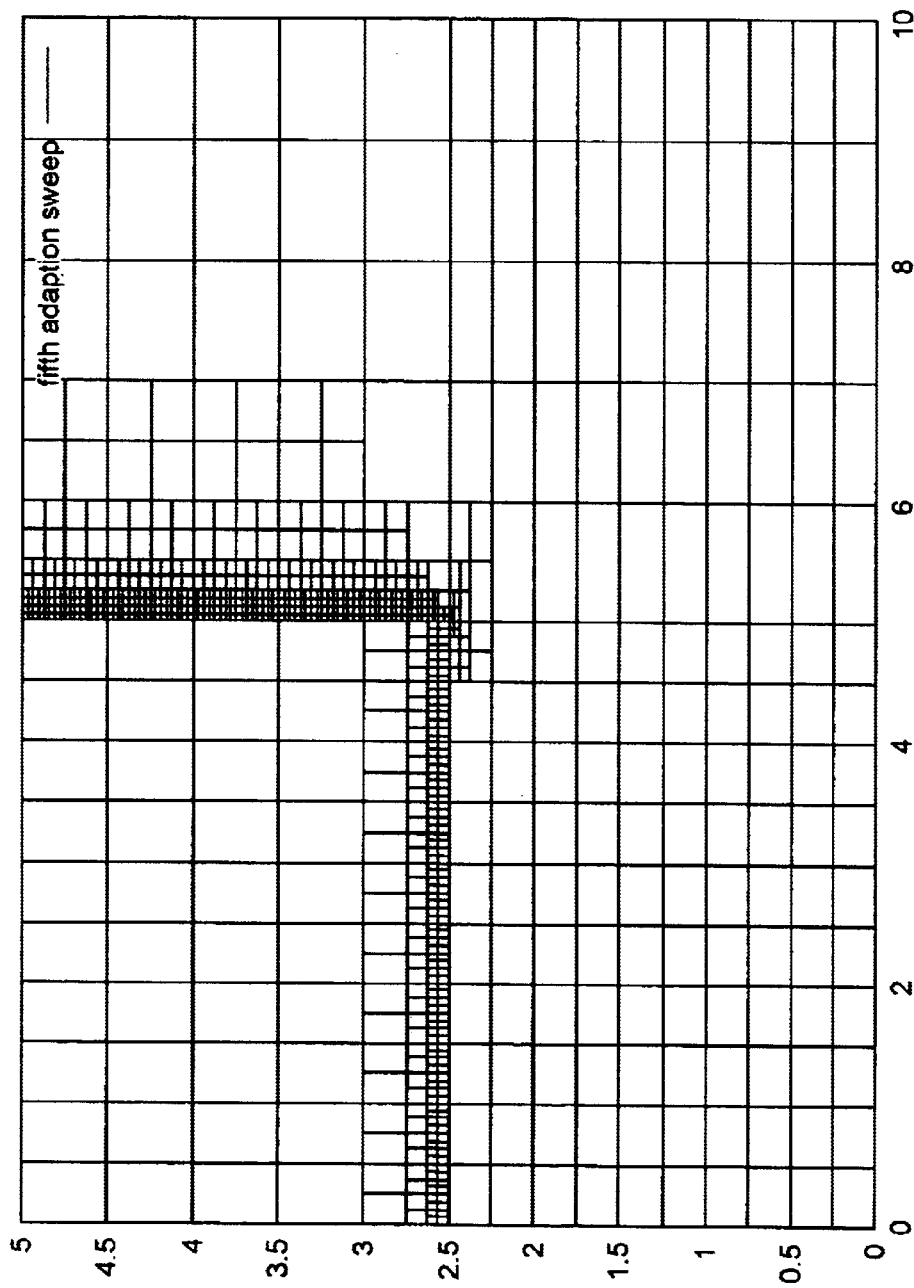
FIG. 31 depicts the square mesh after 5 adaption sweep.
Figure 32:
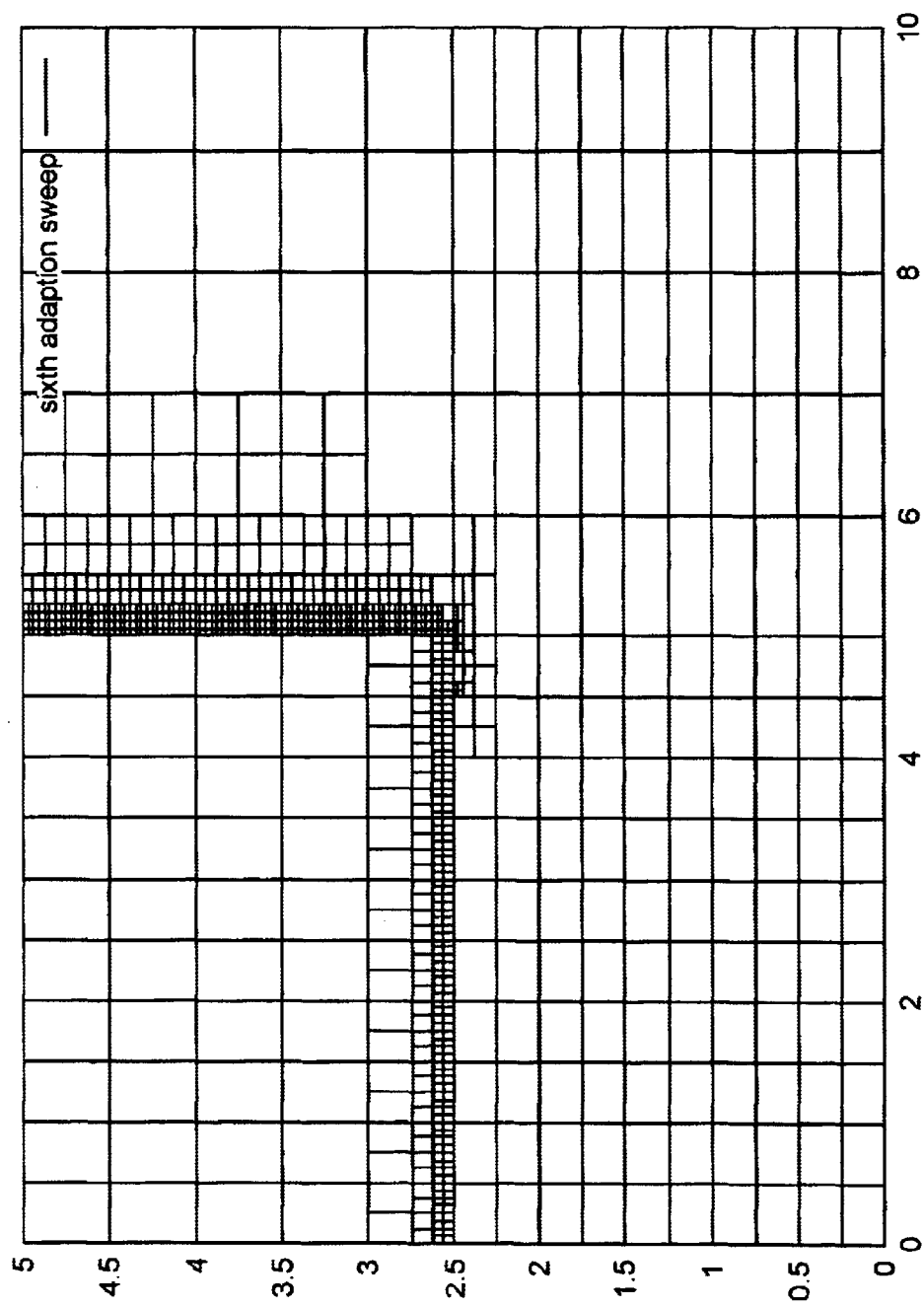
FIG. 32 depicts the square mesh after 6 adaption sweep.

Furthermore, there is printed a file diode.gpt, which is suitable for drawing the initial mesh using xgnuplot. The plotting is presented in FIG. 26. In order to set up the initial square mesh from the structure file the initial run of the simulation is done without putting bias on the contacts. The BIAS card in the diode.dat file takes care of this aspect. A run without bias usually is fast and is suitable for a syntax analysis and name matching of the input files diode.dat and diode.str. Errors are reported in the output file diode.err. The initial solution should also be quickly obtained (i.e. a limited number of iterations should be used) otherwise there is likely a problem with the doping conditions. Part of the error file diode.err is presented below.

```
Section TITL has been read in.
Section NODE has been read in.
Section ELEM has been read in.
Section CONT has been read in.
Section LOG_ has been read in.
CONTACT information:
contact #1: length = .2500E+01 um
contact #2: length = .2500E+01 um
PRISM Version 4.0 rev 0, File run of: 1-Dec-98 15:43
<none>
DIEL_CON SILI 1 11.9
DIEL_CON OXID 1 3.8
INTR_CAR sili 1 1.3E10
TEMP 26.0
MOB SILI 11 400. 1500.0
Energy balance mobility model E-> T (Si)
GE SILI 03 f
No surface scattering included
Field dependent mobility: Arora
RECOM SILI 1 5000.0 5000.0
Shockley-Read-Hall Recombination
ANAL BIHT
CPUTIM 600.0
LOOPS 100
ACC 1.0d-14 1.0d-14 1.0d-30 1.0d-30 1 500 1.0d-30 1.0d-35
NORM 1.0d-3 1.0d-2 5.0d-2 1.0d-2 5.0d-2
PRINT diode.out 3
```

```
DATA
contact nos units    1    2
contact name         top  side
This mesh contains: 256 nodes, 225 squares.
L2 norms :- Poisson 2.5127E+03
RESOUT: #loops, ERR1, ERR3, ALPHA, BETA, <r0,C.p(k)>
|| 0 | 2.51E+03 | .00E+00 || .00E+00 .00E+00 .00E+00||
|| 2 | 7.01E-20 | .00E+00 || 1.00E+00 4.55E-20 7.01E-20||
dpsi 3.70E-04 at node 37 Time is .02
UPDATE1: loop iij= 0 damp TK= .10000E+01 Time is .02
applied bias V .00000E+00 .00000E+00
L2 norms:- Poisson 4.1071E-01
RESOUT: #loops, ERR1, ERR3, ALPHA, BETA, <r0,C.p(k)>
|| 0 | 4.11E-01 | .00E+00 || 1.00E+00 4.55E-20 7.01E-20||
|| 2 | 2.41E-27 | .00E+00 || 1.00E+00 4.57E-20 2.41E-27||
dpsi 6.85E-08 at node 37 Time is .02
UPDATE1: loop iij= 0 damp TK .10000E+01 Time is .02
THE CGS-PC METHOD
STOPPED DYNAMICALLY.ALFA= -.244083E-30
NO OF ITERATIONS = 18
DAMP1: damping factors TK,TK1 = .10000E+01 .10000E+01
UPDATE dpsi= 1.57E-10 d0p= 1.11E-10 d0n= 1.87E-14
at nodes (40) (71) (113)
L2 norms:- Poisson 2.1668E-08
L2 norms: Hole eqn 1.5673E-08
L2 norms: Hole temp 1.5482E-07
L2 norms: Elec eqn 2.4257E-08
L2 norms: Elec temp 2.2549E-07
Total 2.7590E-07 Time is .07
CONVERGED: Current imbalance 7.0425D-12
ICLU:
maximum |dii|_LU = .58987E+05 minimum |dii|_LU = .96854E-05
ICLU:
maximum |dii|_AN = .10000E+01 minimum |dii|_AN = .16953E-04
at A row 3 at A row 6
ICLU: Number of corrected entries = 4
RESOUT: #loops, ERR1, ERR3, ALPHA, BETA, <r0,C.p(k)>
|| 0 | 5.38E-10 | 6.47E-10 || -5.29E-02 -1.28E+00 -8.27E-27||
THE CGS-PC METHOD
STOPPED DYNAMICALLY.ALFA= -.534617E-30
NO OF ITERATIONS = 31
DAMP1: damping factors TK,TK1 = .10000E+01 .10000E+01
UPDATE dpsi= 1.25E-10 d0p= 1.28E-10 d0n= 1.04E-10
at nodes (69) (6) (39)
dtemp= 1.44E-17 dtemn= 1.94E-17
at nodes (178) (38)
16 16
Creating file doping.ddca
Creating file doping.ddca
New mesh: Ny = 16Nx = 16
with 0 interpolated values
```

A summary file of the results is also produced which provides the biases at the contact and the resulting currents. The file is printed below.

```
PRISM Version 4.0 rev 0, File run of: 1-Dec-98 15:43
DIEL_CON SILI 1 111.9
DIEL_CON OXID 1 3.8
INTR_CAR sili 1 1.3E10
TEMP 26.0
MOB SILI 11 400. 1500.0
Energy balance mobility model E -> T (Si)
GE SILI 03 f
No surface scattering included
Field dependent mobility: Arora
RECOM SILI 1 5000.0 5000.0
Shockley-Read-Hall Recombination
ANAL BIHT
CPUTIM 600.0
LOOPS 100
ACC 1.0d-14 1.0d-14 1.0d-30 1.0d-30 1 500 1.0d-30 1.0d-35
NORM 1.0d-3 1.0d-2 5.0d-2 1.0d-2 5.0d-2
PRINT diode.out 3
```

| DATA | |
|---|---|
| contact nos units | 1    2 |
| contact name | top    side |
| CONVERGED: | Current imbalance 9.56430-15 |
| CONVERGED: | Current imbalance 7.04250-12 |
| applied bias V | .00000E + 00 .00000E + 00 |
| Sheet charge Ccm-1 | -6.19394E - 23 1.32711E - 22 |
| Hole current Acm-1 | 6.26567E - 10 5.57167E - 31 |
| Elec current Acm-1 | 1.72112E - 27 -6.19524E - 10 |
| Integrated electron conc | 3.7624E+12 cm-1 |
| Integrated hole conc | 1.2374E+12 cm-1 |
| Total run time > | .917E-01 mins |

Having obtained an initial mesh as well as a zero bias solution, one may proceed along different tracks. First a mesh refinement according to doping criteria and/or electric field criteria may be done. Other criteria do not make much sense at zero bias. One may also first ramp up the bias to some particular value and apply mesh adaption at the final stage. Which method is selected is not relevant for demonstrating the feasibility of the Cube-Assembling Method, since in both cases the method should final mesh should result into a stable and convergent solution scheme. Which new nodes are ultimately participating depends on the history of the application of the refinement criteria and the order of applying first adaption and then refinement or first ramping and then adaption may effect the presence of final nodes.

Following the first option, i.e. applying adaption on the zero-bias solution, refinement according to the doping and electric-field profile is obtained. In FIG. 27 to FIG. 32 six succesive meshes are obtained by resubmitting the zero-bias solution to the refinement tests based on the doping profile. In the following table the number of new nodes is given.

| Cycle | New nodes | Total |
|---|---|---|
| 0 | 0 | 256 |
| 1 | 78 | 334 |
| 2 | 153 | 487 |
| 3 | 306 | 793 |
| 4 | 286 | 1079 |
| 5 | 6 | 1085 |
| 6 | 7 | 1092 |

Figure 33:
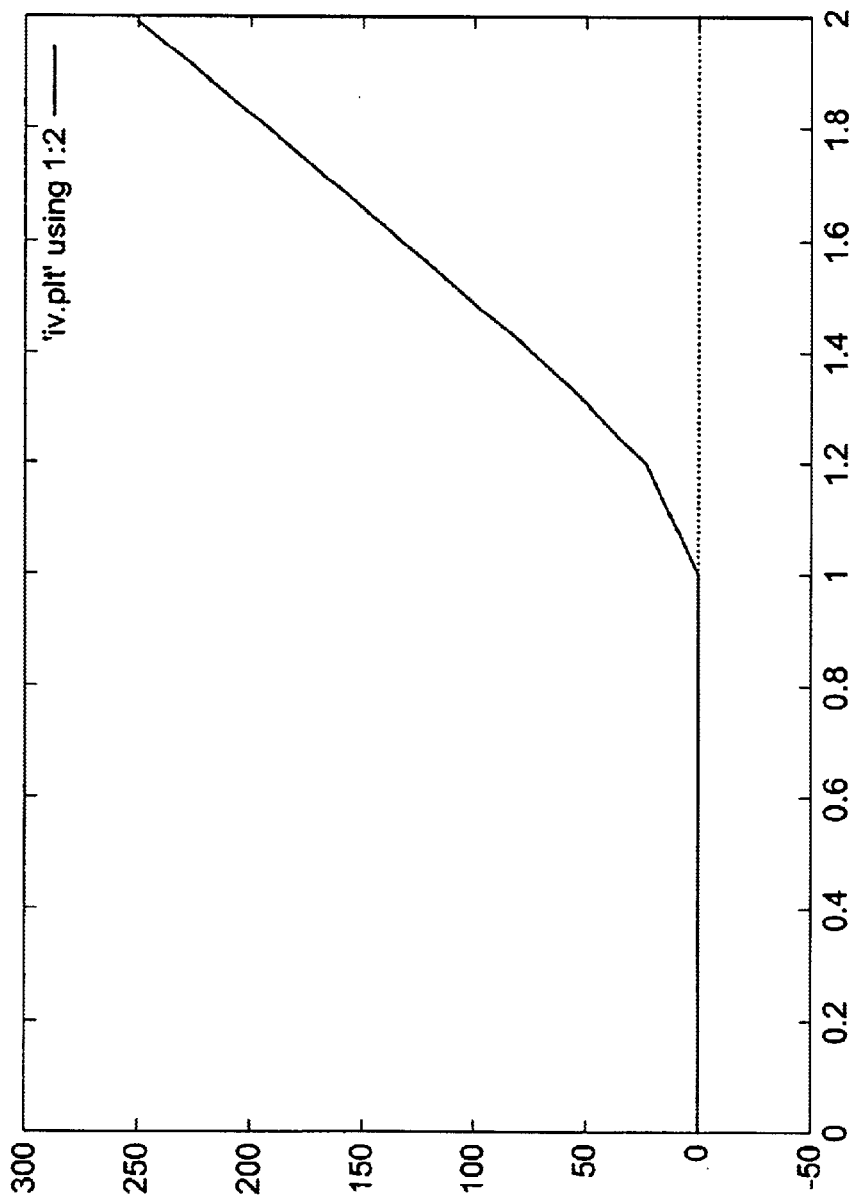
FIG. 33 depicts the current-Voltage plot.

A current-voltage plot is presented in FIG. 33. The convergence speed is similar to the zero-bias case, which demonstrates that the cube-assembling method works properly. As such, it was demonstrated that a new assembling strategy based on a synthesis of the finite-element method and the box-integration method which allows mesh refinement without spurious nodes, does give a algorithm which is stable, robust and convergent.

While the invention has been shown and described with reference to preferred embodiments, it will be understood by those skilled in the art that various changes or modifications in form and detail may be made without departing from the scope and spirit of this invention. For example, although the embodiments of the present invention have been described generally with reference to Cartesian grids, the present invention may be applied to any form of grid used in numerical analysis. Further, although the present invention has been described with reference to the numerical analysis of Maxwell's equations it applies equally well to the solution of partial differential equations, including the refinement of the mesh used in such solutions.

We claim:

1. A method of numerical analysis of a simulation of a physical system, the physical system being describable by Maxwell's field equations of which the following is a representation:

$$\nabla \times \left(\frac{1}{\mu}\nabla \times A\right) = J - \epsilon\frac{\partial}{\partial t}\left(\nabla V + \frac{\partial A}{\partial t}\right)$$

$$\nabla \cdot A = 0$$

$$-\nabla(\epsilon\nabla V) = \rho$$

$$E = -\nabla V - \frac{\partial A}{\partial t}$$

$$B = \nabla \times A$$

where $$J=J(E,B,t)$$

$$\rho=\rho(E,B,t)$$

the method comprising:
  directly solving the field equations modified by addition of a dummy field by numerical analysis, and
  outputting at least one parameter relating to a physical property of the system.

2. A method of claim 1, wherein the modified field equations are given by:

$$\nabla \times \left(\frac{1}{\mu}\nabla \times A\right) - \gamma\nabla\chi = J - \epsilon\frac{\partial}{\partial t}\left(\nabla V + \frac{\partial A}{\partial t} + \frac{\partial \nabla\chi}{\partial t}\right)$$

$$\nabla \cdot A + \nabla^2\chi = 0$$

$$-\nabla(\epsilon\nabla V) = \rho$$

$$E = -\nabla\left(V + \frac{\partial \chi}{\partial t}\right) - \frac{\partial A}{\partial t}$$

$$B = \nabla \times (A + \nabla\chi)$$

where $\chi$ represents the dummy field and $\gamma$ is non-zero.

3. A method of claim 2, wherein the representation of the physical system is a representation of an n-dimensional mesh in a predetermined domain of the physical system, the mesh comprising nodes and links connecting these nodes thereby dividing said domain in n-dimensional first elements whereby each element is defined by $2^n$ nodes, a representation of the mesh being stored in a memory of a computer system as nodes and links between nodes, the vector potential A being defined on the links of the mesh.

4. A method of claim 2, wherein the representation of the physical system is a representation of an n-dimensional mesh in a predetermined domain of the physical system, the mesh comprising nodes and links connecting these nodes thereby dividing said domain in n-dimensional first elements whereby each element is defined by $2^n$ nodes, a representation of the mesh being stored in a memory of a computer system as nodes and links between nodes, wherein the dummy field $\chi$ is defined on the nodes.

5. A method of claim 1 further comprising:
  creating a first additional node inside at least one of said first elements by completely splitting said first element into exactly $2^n$ n-dimensional second elements in such a manner that said first additional node forms a corner node of each of said second elements which results in the replacement of said first element by said $2^n$ n-dimensional second elements;

creating a second additional node inside at least one of said second elements by completely splitting said second element in exactly $2^n$ n-dimensional third elements in such a manner that said second additional node forms a corner node of each of said third elements which results in the replacement of said second element by said $2^n$ n-dimensional third elements, and storing representations of the first and second additional nodes in the memory of the computer system.

6. An apparatus for numerical analysis of a simulation of a physical system, the physical system being describable by Maxwell's field equations of which the following is a representation:

$$\nabla \times \left(\frac{1}{\mu}\nabla \times A\right) = J - \epsilon\frac{\partial}{\partial t}\left(\nabla V + \frac{\partial A}{\partial t}\right)$$

$$\nabla \cdot A = 0$$

$$-\nabla(\epsilon\nabla V) = \rho$$

$$E = -\nabla V - \frac{\partial A}{\partial t}$$

$$B = \nabla \times A$$

where $$J=J(E,B,t)$$

$$\rho=\rho(E,B,t)$$

the apparatus comprising:
  means for directly solving the field equations modified by addition of a dummy field by numerical analysis, and
  means for outputting at least one parameter relating to a physical property of the system.

7. A apparatus according to claim 6, wherein the modified field equations are given by:

$$\nabla \times \left(\frac{1}{\mu}\nabla \times A\right) - \gamma\nabla\chi = J - \epsilon\frac{\partial}{\partial t}\left(\nabla V + \frac{\partial A}{\partial t} + \frac{\partial \nabla\chi}{\partial t}\right)$$

$$\nabla \cdot A + \nabla^2\chi = 0$$

$$-\nabla(\epsilon\nabla V) = \rho$$

$$E = -\nabla\left(V + \frac{\partial \chi}{\partial t}\right) - \frac{\partial A}{\partial t}$$

$$B = \nabla \times (A + \nabla\chi)$$

where $\chi$ represents the dummy field and $\gamma$ is non-zero.

8. An apparatus according to claim 7, wherein the representation of the physical system is a representation of an n-dimensional mesh in a predetermined domain of the physical system, the mesh comprising nodes and n-1 planes connecting these nodes thereby dividing said domain in n-dimensional first elements whereby each element is defined by $2^n$ nodes, a representation of the mesh being stored in a memory of a computer system as a data structure comprising nodes and links between nodes, the data structure also including definitions of the vector potential A associated with the links of the mesh.

9. An apparatus according to claim 7, wherein the representation of the physical system is a representation of an n-dimensional mesh in a predetermined domain of the physical system, the mesh comprising nodes and links connecting these nodes thereby dividing said domain in n-dimensional first elements whereby each element is defined by $2^n$ nodes, a representation of the mesh being stored in a memory of a computer system as a data structure comprising nodes and links between nodes, the data structure also including definitions of the dummy field $\chi$ associated with the nodes.

10. An apparatus according to claim 6 further comprising:

means for creating a first additional node inside at least one of said first elements by completely splitting said first element into exactly $2^n$ n-dimensional second elements in such a manner that said first additional node forms a corner node of each of said second elements which results in the replacement of said first element by said $2^n$ n-dimensional second elements;

means for creating a second additional node inside at least one of said second elements by completely splitting said second element in exactly $2^n$ n-dimensional third elements in such a manner that said second additional node forms a corner node of each of said third elements which results in the replacement of said second element by said $2^n$ n-dimensional third elements, and means for storing representations of the first and second additional nodes in the memory of the computer system.

11. A method of numerical analysis of a simulation of a physical system, comprising:

transmitting from a near location a description of the physical system to a remote location where a processing engine carries out a method of numerically analyzing a simulation of a physical system, the physical system being describable by Maxwell's field equations of which the following is a representation:

$$\nabla \times \left(\frac{1}{\mu} \nabla \times A\right) = J - \epsilon \frac{\partial}{\partial t}\left(\nabla V + \frac{\partial A}{\partial t}\right)$$

$$\nabla \cdot A = 0$$

$$-\nabla(\epsilon \nabla V) = \rho$$

$$E = -\nabla V - \frac{\partial A}{\partial t}$$

$$B = \nabla \times A$$

where $$J=J(E,B,t)$$

$$\rho=\rho(E,B,t)$$

the method comprising:

receiving at a near location at least one physical parameter related to the physical system;

directly solving the field equations modified by addition of a dummy field by numerical analysis, and outputting at least one parameter relating to a physical property of the system.

* * * * *